United States Patent [19]

Kondo

[11] Patent Number: 5,612,751
[45] Date of Patent: Mar. 18, 1997

[54] IMAGE COLLATING METHOD AND APPARATUS

[75] Inventor: Tetsujiro Kondo, Kanagawa, Japan

[73] Assignee: Sony Corporation, Tokyo, Japan

[21] Appl. No.: 380,392

[22] Filed: Jan. 30, 1995

[30] Foreign Application Priority Data

| | | | |
|---|---|---|---|
| Jan. 31, 1994 | [JP] | Japan | 6-027457 |
| Jan. 31, 1994 | [JP] | Japan | 6-027458 |
| Feb. 4, 1994 | [JP] | Japan | 6-033174 |
| Feb. 4, 1994 | [JP] | Japan | 6-033175 |

[51] Int. Cl.$^6$ ............................................. H04N 7/34
[52] U.S. Cl. ...................... 348/699; 348/402; 348/407; 348/413; 348/416
[58] Field of Search .................... 348/699, 402, 348/407, 413, 416; H04N 7/34, 7/36

[56] References Cited

U.S. PATENT DOCUMENTS

| | | | |
|---|---|---|---|
| 5,157,743 | 10/1992 | Meada | 348/403 |
| 5,278,915 | 1/1994 | Chupeau | 348/413 |
| 5,530,789 | 6/1996 | Miyazaki | 382/173 |

*Primary Examiner*—Howard W. Britton
*Attorney, Agent, or Firm*—William S. Frommer; Alvin Sinderbrand

[57] ABSTRACT

To reduce the number of calculations and prevent an error from being detected due to a phase deviation when detecting a motion vector corresponding to the block matching method. A representative pixel value x of a base block composed of (3×3) pixels is detected by a representative value extracting circuit 37. A maximum value and a minimum value of a verification block that has the same size as the base block are detected by a MAX/MIN detecting circuit 38. A comparing circuit 39 compares and determines whether or not the representative pixel value x is in the range from the MAX to the MIN. An evaluated value calculating circuit 40 calculates an evaluated value Δ corresponding to the compared result. When x is included in the range from the MAX to the MIN, Δ is 0. An evaluated value is calculated in the vicinity of the position corresponding to the representative pixel of the reference frame. Corresponding to the evaluated value, a motion vector is detected.

60 Claims, 33 Drawing Sheets

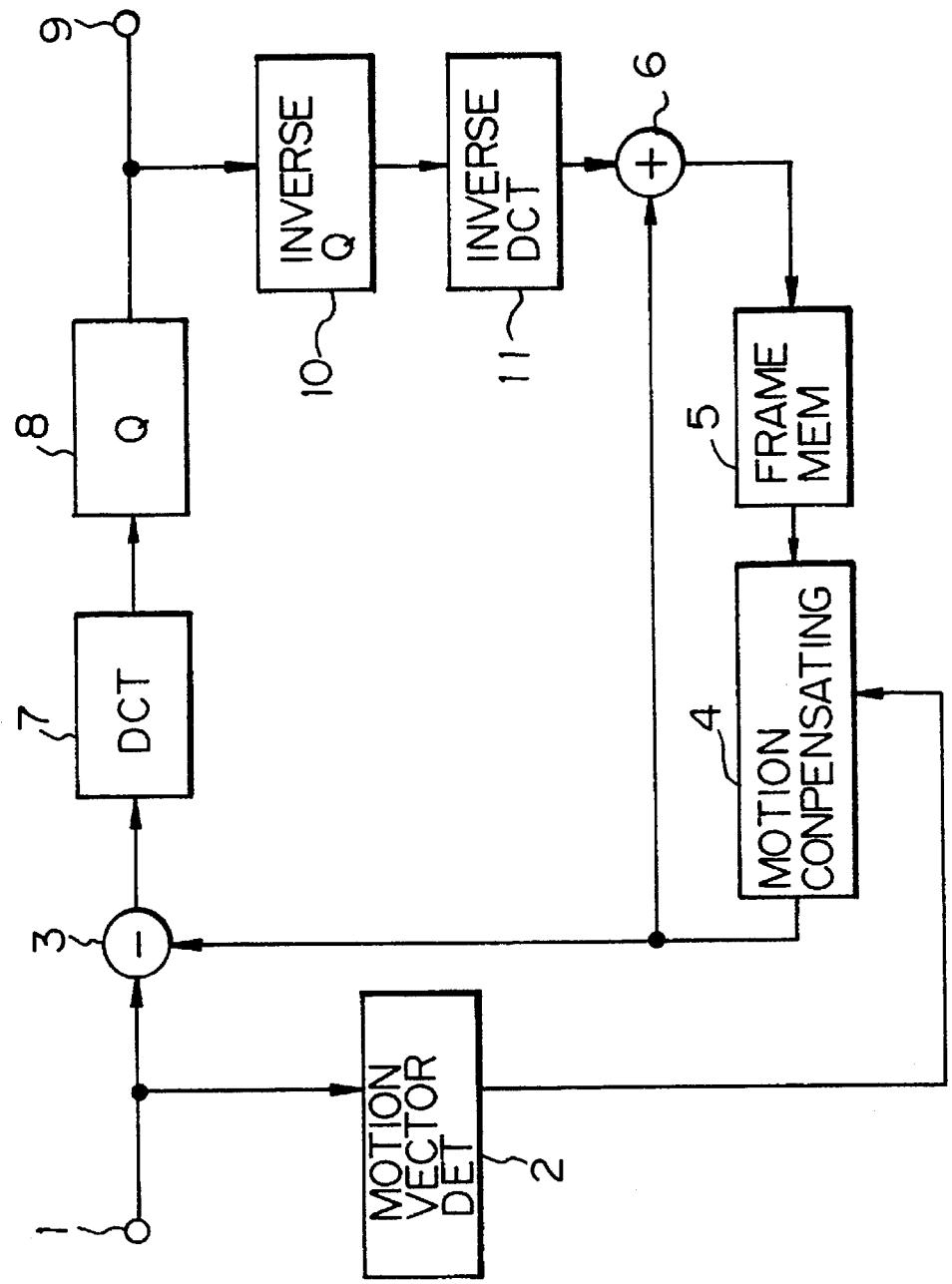

BASE BLOCK   VERIFICATION BLOCK

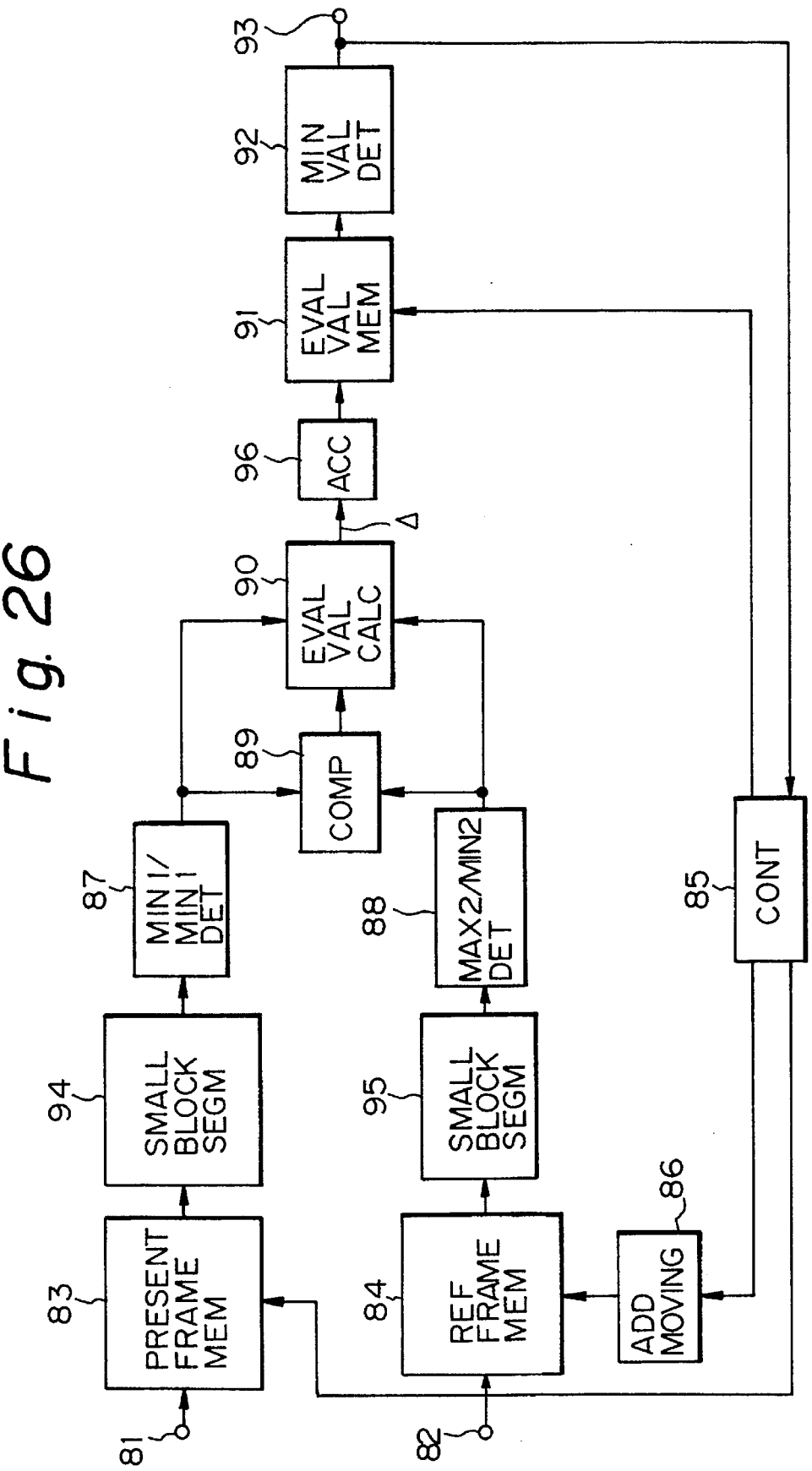

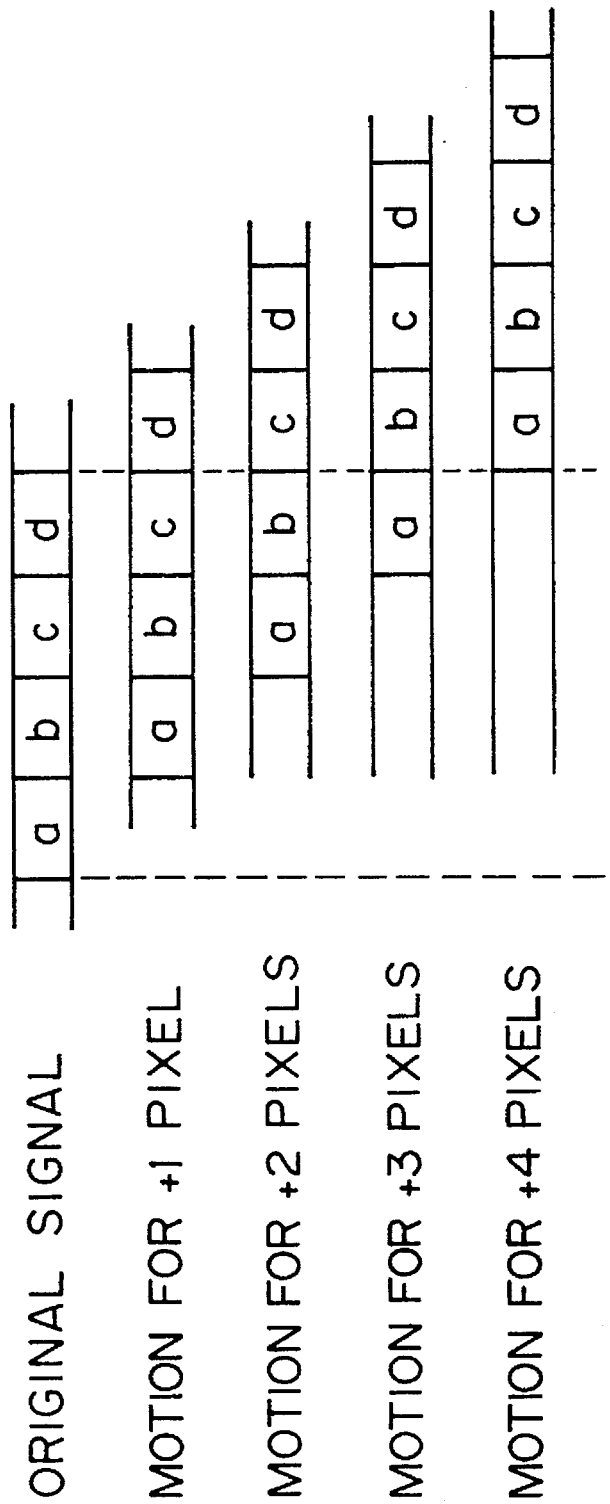

Fig. 30
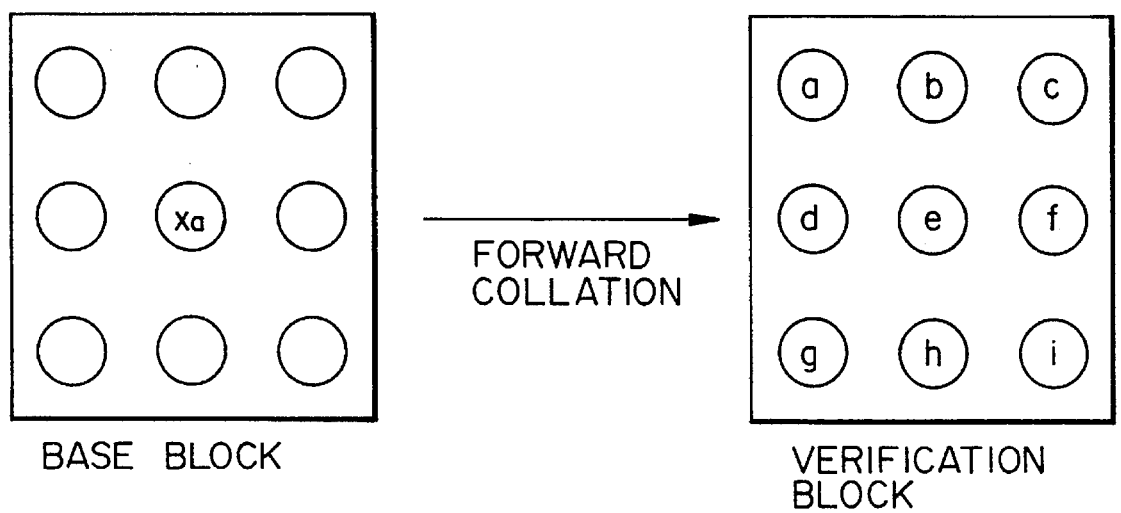
BASE BLOCK → FORWARD COLLATION → VERIFICATION BLOCK
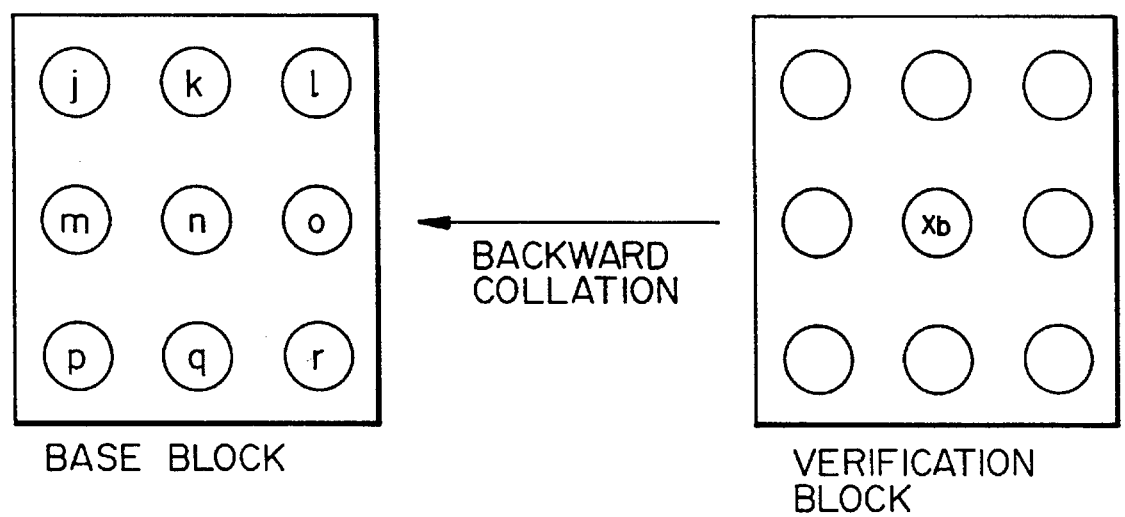
BASE BLOCK ← BACKWARD COLLATION ← VERIFICATION BLOCK

Fig. 33
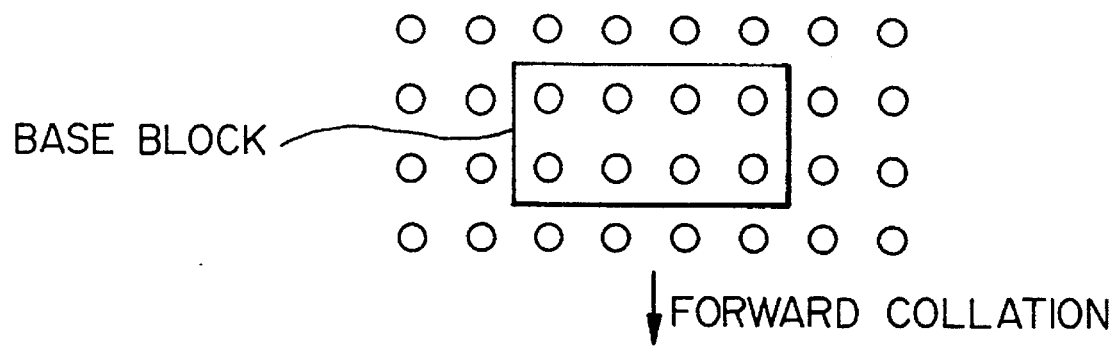
BASE BLOCK
↓ FORWARD COLLATION
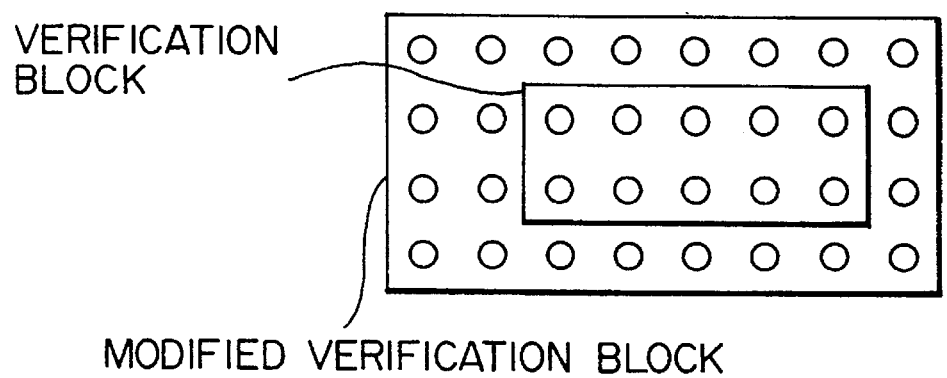
VERIFICATION BLOCK
MODIFIED VERIFICATION BLOCK
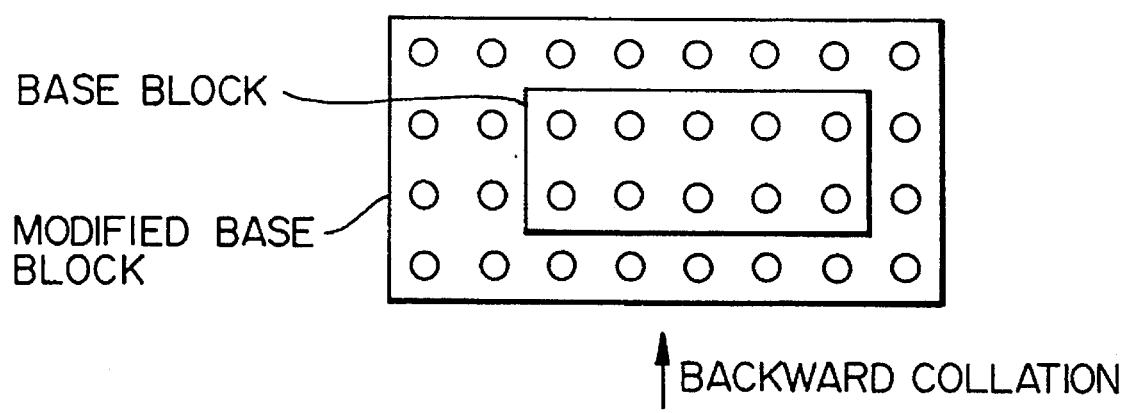
BASE BLOCK
MODIFIED BASE BLOCK
↑ BACKWARD COLLATION
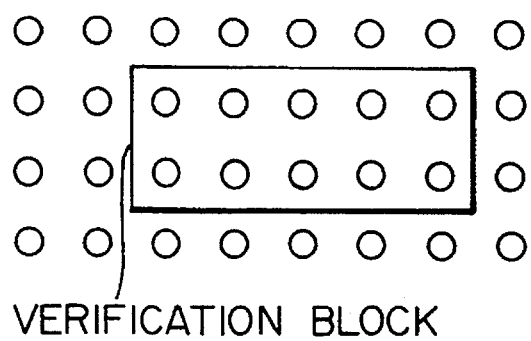
VERIFICATION BLOCK

Fig. 39
BASE BLOCK   SUB BLOCK
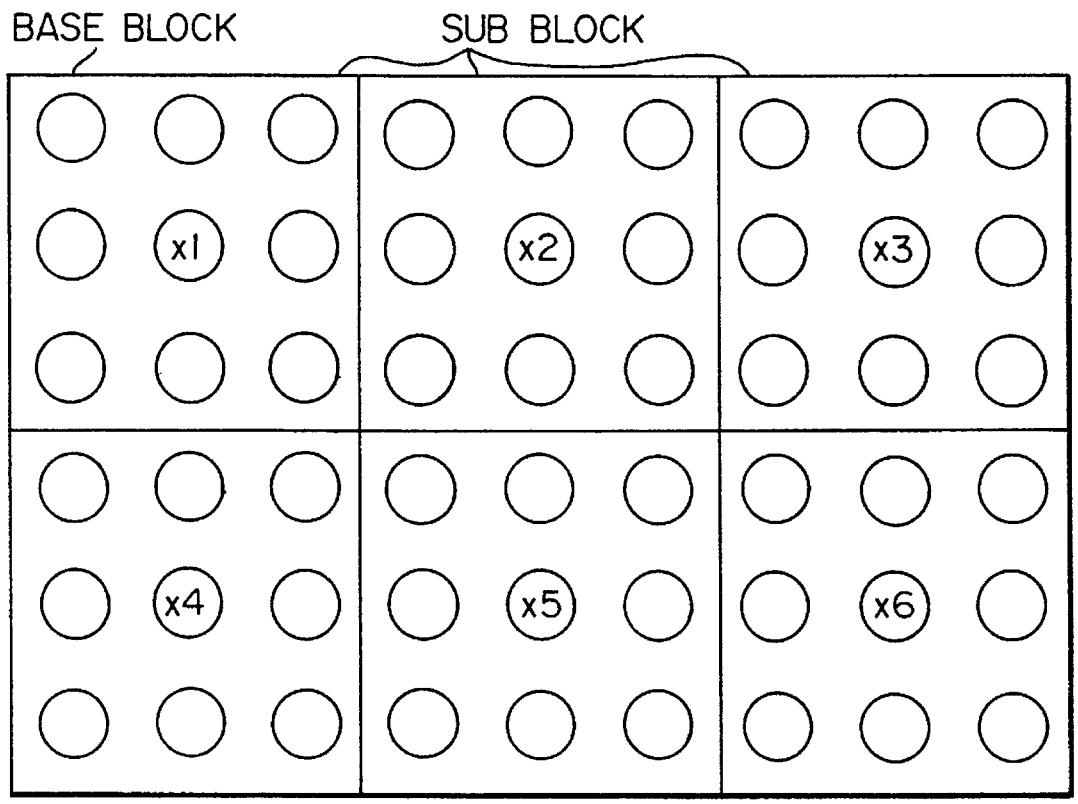
VERIFICATION BLOCK
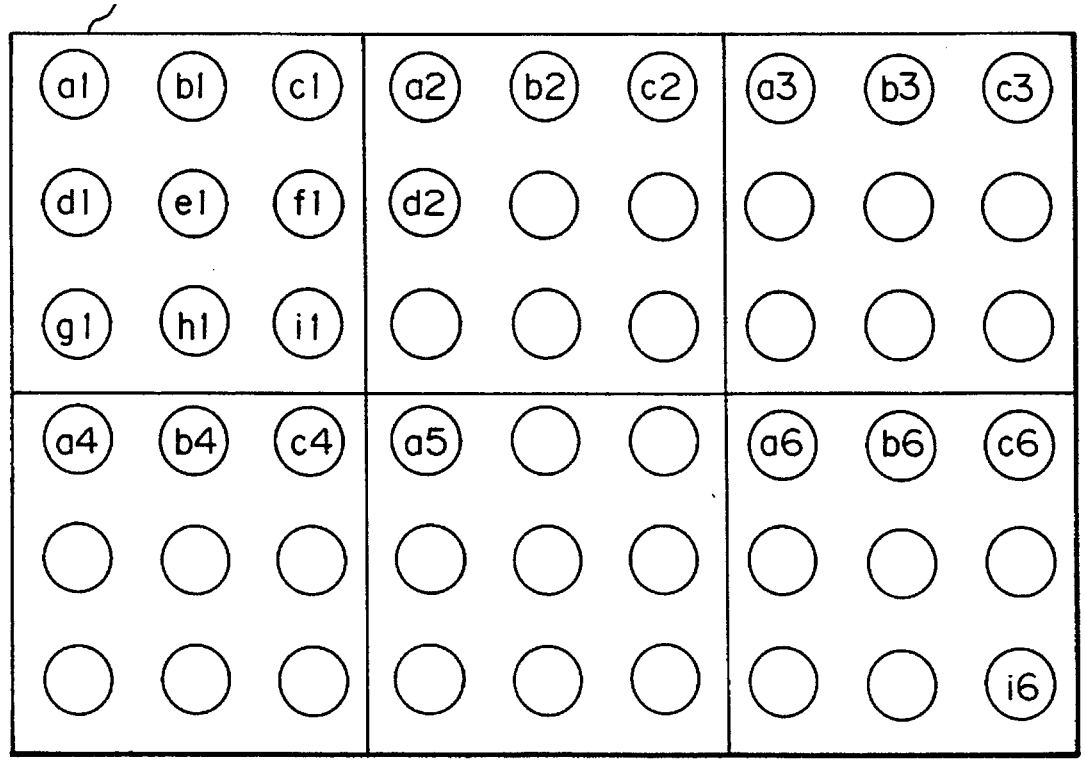

IMAGE COLLATING METHOD AND APPARATUS

BACKGROUND OF THE INVENTION

1. Field of the Invention

The present invention relates to a method and an apparatus for partially collating two digital images, in particular, to an image collating method and an apparatus for detecting a motion vector that represents the moving direction and amount of an image corresponding to block matching method.

2. Description of the Related Art

An application of the motion vector is compensation for a motion in predicted encoding of digital image data. As an example, MPEG (Moving Picture Coding Experts Group) system, which is an international standard system of highly efficient encoding of a moving picture, has been proposed. the MPEG system is a combination of DCT (Discrete Cosine Transform) system and motion compensation predicted encoding system.

FIG. 1 shows an example of a motion compensation predicted encoding apparatus. In FIG. 1, digital video data is received from an input terminal 1. The digital video data is supplied to a motion vector detecting circuit 2 and a subtracting circuit 3. The motion vector detecting circuit 2 detects a motion vector between a present frame and a reference frame (for example, a frame chronologically followed by the present frame). The motion vector is supplied to a motion compensating circuit 4.

An image that is stored in the frame memory 5 is supplied to the motion compensating circuit 4. The motion compensating circuit 4 compensates the motion of the image corresponding to the motion vector. The compensated data is supplied to the subtracting circuit 3 and an adding circuit 6. The subtracting circuit 3 subtracts video data of the preceding frame received from the motion compensating circuit 4 from video data of the present frame for each pixel and supplies the differential data to a DCT circuit 7. The DCT circuit 7 performs DCT process for the differential data and supplies the coefficient data to a quantizing circuit 8. The quantizing circuit 8 re-quantizes the coefficient data. The output data of the quantizing circuit 8 is supplied to an output terminal 9 and an inverse quantizing circuit 10.

The inverse quantizing circuit 10 is connected to an inverse DCT circuit 11. The inverse quantizing circuit 10 and the inverse DCT circuit 11 construct a local decoding circuit that performs the inverse processes of the DCT circuit 7 and the quantizing circuit 8. The inverse DCT circuit 11 supplies the decoded differential data to the adding circuit 6. Output data of the adding circuit 6 is supplied to the motion compensating circuit 4 through the frame memory 5. The decoded data of the preceding frame is supplied from the motion compensating circuit 4 to the adding circuit 6. Thus, decoded data is formed and stored in the frame memory 5.

The motion vector detecting circuit 2 detects a motion vector corresponding to the block matching method. In the block matching method, a verification block of a reference frame is moved in a predetermined searching range and a block that most accords with a base block of the present frame is detected so as to obtain a motion vector. Thus, the motion vector can be obtained for each block. A relatively large motion vector with the size of the entire screen or ¼ thereof may be obtained (as in Japanese Patent Laid-Open Publication No. 61-105178).

In the block matching method, as shown in FIG. 2A, one image, for example an image of one frame composed of H horizontal pixels ×V vertical lines, is segmented into blocks. Each of the blocks is composed of P pixels ×Q pixels as shown in FIG. 2B. In FIG. 2B, P=5 and Q=5. In addition, c is the position of the center pixel of the block.

FIGS. 3A, 3B and 3C show the relation of positions of a base block and a verification block. In FIGS. 3A, 3B and 3C, the center position of the base block is c and the center position of the verification block is c'. The base block with the center pixel c is a particular base block of the present frame. The verification block of the reference frame that accords with the image of the base block is present at the block with the center position c'. In the block matching method, in a predetermined search range, a verification block that most accords with to a base block is detected so as to detect a motion vector.

In FIG. 3A, a motion vector (−1, −1) that is −1 pixel in horizontal direction and −1 line in vertical direction is detected. In FIG. 3B, a motion vector (−3, −3) is detected. In FIG. 3C, a motion vector (−2, +1) is detected. The motion vector is detected for each base block. As the polarity of the motion vector, the direction that accords with the raster scanning direction is "+".

When the search range of the motion vector is ±S pixels in the horizontal direction and ±T lines in the vertical direction, the base block should be compared with the verification block with the center c' that deviates from the center c of the base block for ±S pixels in the horizontal direction and for ±T lines in the vertical direction. In FIG. 4, when the position of the center c of the base block of the present frame is R, the base block should be compared with (2S+1)×(2T+1) verification blocks of the reference frame. In other words, all verification blocks in which the center c' is present should be compared. In FIG. 4, S=4 and T=3.

From evaluated values of comparisons in the search range (namely, the sum of absolute values of frame differences, the sum of square of the frame differences, the sum of n-th power of absolute values of the frame differences), the minimum value is detected so as to detect motion vectors. The search range of FIG. 4 is an area where the center of the verification blocks is present. The search range that includes all the verification blocks is (2S+P)×(2T+Q).

FIG. 5 shows a construction of a conventional motion vector detecting apparatus. In FIG. 5, reference numeral 21 is an input terminal to which image data of a present frame is input. The image data is stored in a present frame memory 23. Reference numeral 22 is an input terminal to which image data of a reference frame is input. The image data is stored in a reference frame memory 24.

The reading operation and the writing operation of the present frame memory 23 and the reference frame memory 24 are controlled by a controller 25. Pixel data of base blocks of the present frame is read from the present frame memory 23. Pixel data of verification blocks of the reference frame is read from the reference frame memory 24. In association with the reference frame memory 24, an address moving circuit 26 is provided. The controller 25 causes the address moving circuit 26 to move the center position of each of the verification blocks in the search range, pixel by pixel.

Output data of the present frame memory 23 and output data of the reference frame memory 24 are supplied to a difference detecting circuit 27. The difference detecting circuit 27 detects the difference between both the input data, pixel by pixel. Output data of the difference detecting circuit 27 is supplied to an absolute value calculating circuit 28 that converts the input signal into an absolute value. The absolute value is supplied to a cumulating circuit 29 that cumulates the absolute values of the differences for each block and supplies the cumulated value as an evaluated value to a determining circuit 30. The determining circuit 30 detects a motion vector corresponding to the sum of the absolute values of the differences that take place when each of the verification blocks is moved in the search range. In other words, the position of the verification block that generates the minimum sum of the absolute values of the differences is detected as a motion vector.

In the conventional block matching method, the process for obtaining the sum of absolute values of frame differences between base blocks and verification blocks should be performed in the search range. In the example shown in FIGS. 2A, 2B, 3A, 3B, 3C and 4, (P×Q) absolute values of the differences should be cumulated for all the search points, namely (2S+1)×(2T+1) times. Thus, the number of calculations can be expressed as (P×Q)×(2S+1)×(2T+1). Consequently, in the block matching method, the hardware scale and the number of calculations become large.

As a practical example, as shown in FIG. 6, assume that P=16, Q=16, S=2, and T=2. In this example, for simple description and illustration, the values of S and T are very small. In reality, a more large search range is set. In FIG. 6, a base block and a verification block that moves for (+2, +2) therefrom are illustrated. In this example, the search range in the horizontal and vertical directions is ±2. The number of search points is (5×5=25).

For one search point, subtractions for calculating differences of (16×16) pixels, subtractions for calculating the absolute values thereof, and additions of the absolute values should be performed. In addition, this operation should be performed for all search points (25 search points). Thus, it is clear that the number of calculations depends on the number of pixels to be collated times the number of search points. Consequently, the number of calculations becomes large. In a conventional system, a pixel of a base block is treated as a representative point pixel and the differences between the representative point data and data of the verification block are calculated as in Japanese Patent Laid-Open Publication No. 62-25587. In this system, although the hardware can be simplified or the process time can be shortened to some extent, the number of calculations cannot be remarkably reduced.

As the countermeasures, a method for simplifying the search system and a method for simplifying the collating system have been proposed. As the former method, when a verification block is moved in a search range, the verification block is moved for every several pixels so as to coarsely detect a motion vector. Thereafter, the verification block is moved in the vicinity of the detected position for each pixel so as to precisely obtain a motion vector. This method is known as two-step method. In addition, three-step method in which the number of steps is three is also known. According to these methods, the number of calculations necessary for all search points can be reduced to the number of search points in the vicinity of motion vectors detected in each step.

Moreover, a method for simplifying both the collating system and the search system is known. In this method, the number of pixels of a block is decreased by thin-out process (namely, sampled). For example, as shown in FIG. 7, a block composed of (16× 16) pixels is thinned out by ¼ in each of horizontal and vertical directions. Thus, the number of pixels in the block is reduced to ¹/₁₆. Search points are present for every four pixels. Consequently, the number of pixels to be collated and the number of search points can be reduced.

As another method for simplifying both the collating system and the search system, a system using hierarchical construction has been proposed. As an example of the system, an original image (referred to as first hierarchical level), a second hierarchical level in which the number of pixels in the first hierarchical level is thinned out by ½ in each of the horizontal and vertical directions with low-pass filter and/or sampling process, and a third hierarchical level in which the number of pixels of the second hierarchical level is thinned out by ½ in each of the horizontal and vertical directions with low-pass filter and/or sampling process are defined.

In the third hierarchical level, the block matching is performed. The origin of a block is moved to the position at which the minimum value is detected. At this position, in the second hierarchical level, the block matching is performed. The origin is moved to the position at which the minimum value is detected. At this position, in the first hierarchical level, the block matching is performed. Last, the block matching is performed for each pixel so as to detect a motion vector.

A further method for simplifying both the collating system and the search system is known. In this method, each of a base block and a verification block is further segmented into small blocks in each of horizontal and vertical directions and a feature amount for each small block is extracted. In other words, a feature amount in each of horizontal and vertical directions of each of small blocks of a base block is compared with that of a verification block. The absolute values of the compared results are cumulated. The weighted average of the cumulated results is used as the compared result of the blocks. The feature amount of each small block is for example the cumulated result of pixel data of the small block. In this method, the number of calculations necessary for all pixels in one block can be reduced to the number of small blocks in the horizontal and vertical directions.

In the above-described various modifications for the block matching, although the number of calculations can be reduced, an error may be detected when a motion vector is obtained. In other words, since the collating method and the search method are simplified, the amount of information of the original image is lost.

More practically, in the simplification of the collating system that decreases the number of elements (that are pixels to be collated) in a block, the detail of the image data of the block is lost. Thus, an error is detected. Now assume the case that a base block and a verification block (that are one-dimensional blocks) are collated as shown in FIG. 8. The waveform of the average for every four pixels of the base block data is the same as that of the verification block data. Although the original waveforms of the these two block data are different, as the result of the comparison, it is determined that they accord with each other. Thus, an error is detected.

The inventor of the present invention has proposed a method for solving the above-described problem (as Japanese Patent Laid-Open Publication No. 5-248813). In this method, when a base block and a verification block are compared, constant components and transient components are extracted therefrom. By comparing the constant component of the base block with the constant component of the verification block and the transient component of the base block with the transient component of the verification block, an error detection is prevented. In the method shown in FIG.

8, as an example of the transient component, when the absolute value of the difference of average values is obtained, the base block data remarkably differs from the verification block. Thus, when the transient components are referenced, an error detection can be prevented.

In the method for simplifying the search system that decreases the number of search points, when a motion vector is coarsely detected, since the accuracy is low, an error may be detected. In the method for simplifying both the collating system and the search system, when a motion vector is detected corresponding to an image that has been thinned out or passed through a low-pass filter, an error may be detected.

When the number of search points is reduced, a phase deviation takes place between the phases of the search points and the motion of the image. The phase deviation will be described with reference to FIG. 9. In FIG. 9, search points are set for every four pixels of a one-dimensional block. Below the waveform of an original signal, waveforms of which the original signal is moved for one pixel, two pixels, three pixels, and four pixels are illustrated in the order. In the case that the phase at the beginning of the base block is the same as that of the verification block, these blocks match with each other when the verification block is stopped and moved for any multiple of four pixels. In this case, the motion vector can be detected. Otherwise, the motion vector cannot be detected.

In particular, when an image remarkably moves, even if the real motion of the image is for three pixels or less, the cumulated value of the absolute values of the differences of the search points that are spaced by four pixels may become very large. When this cumulated value is smaller than the cumulated value of the absolute values of the differences at other search points, the detected motion differs from the real motion.

OBJECTS AND SUMMARY OF THE INVENTION

Therefore, an object of the present invention is to provide an image collating method and an apparatus that can reduce the number of calculations and the hardware scale, prevent an error from being detected, and compensate a phase deviation.

Therefore, an object of the present invention is to provide an image collating method and an apparatus that can reduce the number of calculations and the hardware scale, prevent an error from being detected, and compensate a phase deviation.

Therefore, an object of the present invention is to provide an image collating method and an apparatus that can reduce the number of calculations and the hardware scale, prevent an error from being detected, compensate a phase deviation, and improve detection accuracy.

Therefore, an object of the present invention is to provide an image collating method and an apparatus that can reduce the number of calculations and the hardware scale, prevent an error from being detected, compensate a phase deviation, and improve detection accuracy.

According to the first aspect of the invention to provide an image collating method, comprising the steps of:

segmenting first image data into a plurality of base blocks;

segmenting second pixel data into a plurality of verification blocks;

extracting representative pixel data from each of the base blocks;

extracting feature amount data from each of the verification blocks that contains pixel data corresponding to the representative pixel data, the feature amount data representing a feature amount of the verification block; and comparing the representative pixel data with the feature amount data and partially collating the base block with the verification block.

According to the second aspect of the invention to provide an image collating apparatus, comprising:

means for segmenting first image data into a plurality of base blocks;

means for segmenting second pixel data into a plurality of verification blocks;

means for extracting representative pixel data from each of the base blocks;

means for extracting feature amount data from each of the verification blocks that contains pixel data corresponding to the representative pixel data, the feature amount data representing a feature amount of the verification block; and means for comparing the representative pixel data with the feature amount data and partially collating the base block with the verification block.

According to the third aspect of the invention to provide a motion vector detecting method, comprising the steps of:

segmenting first image data into a plurality of base blocks;

segmenting second pixel data into a plurality of verification blocks;

extracting representative pixel data from each of the base blocks;

extracting feature amount data from each of the verification blocks that contains pixel data corresponding to the representative pixel data, the feature amount data representing a feature amount of the verification block;

comparing the representative pixel data with the feature amount data and generating an evaluated value that represents a matching degree of the base block and the verification block corresponding to the compared result; and detecting a motion vector corresponding to the position of the verification block that most accords with the base block based on the evaluated value that is generated by moving the verification block in a predetermined search range.

Accordint to the fourth aspect ot the invention to provide a motion vector detecting apparatus, comprising:

means for segmenting first image data into a plurality of base blocks;

means for segmenting second pixel data into a plurality of verification blocks;

means for extracting representative pixel data from each of the base blocks;

means for extracting feature amount data from each of the verification blocks that contains pixel data corresponding to the representative pixel data, the feature amount data representing a feature amount of the verification block;

means for comparing the representative pixel data with the feature amount data and generating an evaluated value that represents a matching degree of the base block and the verification block corresponding to the compared result; and means for detecting a motion vector corresponding to the position of the verification block that most accords with the base block based on the evaluated value that is generated by moving the verification block in a predetermined search range.

Pixel data at for example center position of a base block is extracted as representative pixel data. The representative pixel data is compared with a feature amount of a verification block. For example, a maximum value MAX and a minimum value MIN of the verification block are detected. It is determined whether or not the value of the representative pixel data is included in the range from the MAX to the MIN. Corresponding to the compared result, an evaluated value is generated. Thus, the number of calculations can be reduced and the phase deviation can be solved.

Accordint to the fifth aspect of the invention to provide an image collating method, comprising the steps of:

- segmenting first image data into a plurality of base blocks;
- segmenting second image data into a plurality of verification blocks and generating a modified verification block containing pixels in the vicinity of each of the verification blocks necessary for a phase compensation;
- extracting first feature amount data from each of the base blocks, the first feature amount data representing the range of all pixels thereof;
- extracting second feature amount data from the modified verification block, the second feature amount data representing the range of all pixels of the modified verification block; and
- comparing the first feature amount data with the second feature amount data and to partially collating the base block with the verification block.

Accordint to the sixth aspect of the invention to provide an image collating apparatus, comprising:

- means for segmenting first image data into a plurality of base blocks;
- means for segmenting second image data into a plurality of verification blocks and generating a modified verification block containing pixels in the vicinity of each of the verification blocks necessary for a phase compensation;
- means for extracting first feature amount data from each of the base blocks, the first feature amount data representing the range of all pixels thereof;
- means for extracting second feature amount data from the modified verification block, the second feature amount data representing the range of all pixels of the modified verification block; and
- means for comparing the first feature amount data with the second feature amount data and to partially collating the base block with the verification block.

Accordint to the seventh aspect of the invention to provide a motion vector detecting method, comprising the steps of:

- segmenting first image data into a plurality of base blocks;
- segmenting second image data into a plurality of verification blocks and generating a modified verification block containing pixels in the vicinity of each of the verification blocks necessary for a phase compensation;
- extracting first feature amount data from each of the base blocks, the first feature amount data representing the range of all pixels thereof;
- extracting second feature amount data from the modified verification block, the second feature amount data representing the range of all pixels of the modified verification block;
- comparing the first feature amount data with the second feature amount data and generating an evaluated value representing a matching degree of the base block and the verification block corresponding to the compared result; and
- detecting a motion vector corresponding to the position of the verification block that most accords with the base block based on the evaluated value, the evaluated value being generated by moving the verification block in a predetermined search range.

According to the eighth aspect of the invention to provide a motion vector detecting apparatus, comprising:

- means for segmenting first image data into a plurality of base blocks;
- means for segmenting second image data into a plurality of verification blocks and a generating modified verification block containing pixels in the vicinity of each of the verification blocks necessary for a phase compensation;
- means for extracting first feature amount data from each of the base blocks, the first feature amount data representing the range of all pixels thereof;
- means for extracting second feature amount data from the modified verification block, the second feature amount data representing the range of all pixels of the modified verification block;
- means for comparing the first feature amount data with the second feature amount data and generating an evaluated value representing a matching degree of the base block and the verification block corresponding to the compared result; and
- means for detecting a motion vector corresponding to the position of the verification block that most accords with the base block based on the evaluated value, the evaluated value being generated by moving the verification block in a predetermined search range.

For example, a maximum value MAX 1 and a minimum value MIN 1 of a base block are extracted as first feature amount data. A maximum value MAX 2 and a minimum value MIN 2 are extracted as second feature amount data from an extended modified verification block so as to compensate a phase of a verification block. Thereafter, the first feature amount data is compared with the second feature amount data. When $MAX\ 2 \geq MAX\ 1$ and $MIN\ 1 \geq MIN\ 2$, evaluated values $\Delta 1=0$ and $\Delta 2=0$ are generated. When $MAX\ 1 \geq MAX\ 2$, evaluated values $\Delta 1=MAX\ 1-MAX\ 2$ and $\Delta 2=0$ are generated. When $MIN\ 2 \geq MIN\ 1$, evaluated values $\Delta 1=0$ and $\Delta 2=MIN\ 2-MIN\ 1$ are generated. Thus, the number of calculations can be reduced and the phase compensation can be performed.

According to the ninth aspect of the invention to provide an image collating method, comprising the steps of:

- segmenting first image data into a plurality of base blocks;
- segmenting second image data into a plurality of verification blocks;
- extracting first representative pixel data from each of the base blocks;
- extracting first feature amount data from each of the verification blocks containing pixel data corresponding to the first representative data, the first feature amount representing a feature amount of the verification block;
- comparing the first representative pixel data with the first feature amount data so as to generate a first evaluated value corresponding to the base block;
- extracting second representative pixel data from the verification block;
- extracting second feature amount data from the base block containing pixel data corresponding to the second representative data, the second feature amount representing a feature amount of the base block;

comparing the second representative pixel data with the second feature amount data so as to generate a second evaluated value corresponding to the verification block; and generating a totally evaluated value corresponding to the first evaluated value and the second evaluated value and partially collating the first image data with the second image data corresponding to the totally evaluated value.

According to the tenth aspect of the invention to provide an image collating apparatus, comprising:

means for segmenting first image data into a plurality of base blocks;

means for segmenting second image data into a plurality of verification blocks;

means for extracting first representative pixel data from each of the base blocks;

means for extracting first feature amount data from each of the verification blocks containing pixel data corresponding to the first representative data, the first feature amount representing a feature amount of the verification block;

means for comparing the first representative pixel data with the first feature amount data so as to generate a first evaluated value corresponding to the base block;

means for extracting second representative pixel data from the verification block;

means for extracting second feature amount data from the base block containing pixel data corresponding to the second representative data, the second feature amount representing a feature amount of the base block;

means for comparing the second representative pixel data with the second feature amount data so as to generate a second evaluated value corresponding to the verification block; and means for generating a totally evaluated value corresponding to the first evaluated value and the second evaluated value and partially collating the first image data with the second image data corresponding to the totally evaluated value.

Accordint to the eleventh aspect of the invention to provide an image collating method, comprising the steps of:

segmenting first image data into a plurality of base blocks;

segmenting second image data into a plurality of verification blocks and generating a modified verification block containing pixels in the vicinity of the verification block necessary for a phase compensation;

extracting first feature amount data from the base block, the first feature amount data representing the range of all pixels thereof;

extracting second feature amount data from the modified verification block, the second feature amount representing the range of all pixels thereof;

comparing the first feature among data with the second feature amount data so as to generate a first evaluated value corresponding to the base block;

generating a modified base block containing pixels in the vicinity of the base block necessary for a phase compensation;

extracting third feature amount data from the verification block, the third feature amount data representing the range of all pixels thereof;

extracting fourth feature amount data from the modified base block, the fourth feature amount data representing the range of all pixels thereof;

comparing the third feature amount data with the fourth feature amount data so as to generate a second evaluated value corresponding to the verification block; and generating a totally evaluated value corresponding to the first evaluated value and the second evaluated value and partially collating the first image data with the second image data corresponding to the totally evaluated value.

Accordint to the twelfth aspect of the invention to provide an image collating apparatus, comprising:

means for segmenting first image data into a plurality of base blocks;

means for segmenting second image data into a plurality of verification blocks and generating a modified verification block containing pixels in the vicinity of the verification block necessary for a phase compensation;

means for extracting first feature amount data from the base block, the first feature amount data representing the range of all pixels thereof;

means for extracting second feature amount data from the modified verification block, the second feature amount representing the range of all pixels thereof;

means for comparing the first feature among data with the second feature amount data so as to generate a first evaluated value corresponding to the base block;

means for generating a modified base block containing pixels in the vicinity of the base blocks necessary for a phase compensation;

means for extracting third feature amount data from the verification block, the third feature amount data representing the range of all pixels thereof;

means for extracting fourth feature amount data from the modified base block, the fourth feature amount data representing the range of all pixels thereof;

means for comparing the third feature amount data with the fourth feature amount data so as to generate a second evaluated value corresponding to the verification block; and means for generating a totally evaluated value corresponding to the first evaluated value and the second evaluated value and partially collating the first image data with the second image data corresponding to the totally evaluated value.

Pixel data at for example center position of a base block is extracted as representative pixel data $x_a$. The representative pixel data $x_a$ is compared with a feature amount of a verification block. For example, a maximum value MAX 2 and a minimum value MIN 2 of the verification block are detected. It is determined whether or not the value of the representative pixel data $x_a$ is included in the range from the MAX 2 to the MIN 2. This operation is a forward collation. The backward collation is performed by using representative pixel data $x_b$ that is extracted from a verification block, and a maximum value MAX 1 and a minimum value MIN 1 of a base block. Corresponding to the collated results in the forward direction and the backward direction, a totally evaluated value is generated. Corresponding to the totally evaluated value, the degree of the collation is determined. Thus, the number of calculations can be reduced and the phase deviation can be prevented. In addition, the accuracy of the collation can be improved.

In addition to comparing the representative pixel data and the feature amount for collation, the base block and the verification block are collated for each area thereof. In this case, since the collation is performed in both the forward and backward directions, the accuracy of the collation is improved.

According to the thirteenth aspect of the invention to provide an image collating method, comprising the steps of:

segmenting first image data into a plurality of base blocks and segmenting each of the base blocks into a plurality of base sub-blocks;

segmenting second image data into a plurality of verification blocks and segmenting each of the verification blocks into a plurality of verification sub-blocks;

extracting first representative pixel data from each of the base sub-blocks;

generating first representing data that represents first representative pixel data group of the base sub-block and second representing data that represents a pixel group at a position corresponding to each of the verification sub-block, comparing the first representing data with the second representing data, and selecting pixel data used for the collation;

extracting feature amount data that represents the range of the selected pixels of the verification sub-block;

extracting second representative pixel data from the base sub-block; and comparing the second representative pixel data with the feature amount data, generating an evaluated value for the sub-block, generating a totally evaluated value corresponding to the evaluated value for the sub-block, and partially collating the first image data with the second image data corresponding to the totally evaluated value.

According to the fourteenth aspect of the invention to provide an image collating apparatus, comprising:

means for segmenting first image data into a plurality of base blocks and segmenting each of the base blocks into a plurality of base sub-blocks;

means for segmenting second image data into a plurality of verification blocks and segmenting each of the verification blocks into a plurality of verification sub-blocks;

means for extracting first representative pixel data from each of the base sub-blocks;

means for generating first representing data that represents first representative pixel data group of the base sub-block and second representing data that represents a pixel group at a position corresponding to each of the verification sub-blocks, comparing the first representing data with the second representing data, and selecting pixel data used for the collation;

means for extracting feature amount data that represents the range of the selected pixels of the verification sub-block;

means for extracting second representative pixel data from the base sub-block; and means for comparing the second representative pixel data with the feature amount data, generating an evaluated value for the sub-block, generating a totally evaluated value corresponding to the evaluated value for the sub-block, and partially collating the first image data with the second image data corresponding to the totally evaluated value.

According to the fifteenth aspect of the invention to provide an image collating method, comprising the steps of:

segmenting first image data into a plurality of base blocks and segmenting each of the base blocks into a plurality of base sub-blocks;

segmenting second image data into a plurality of verification blocks, segmenting each of the verification blocks into a plurality of verification sub-blocks, and generating a modified verification sub-block that contains pixels in the vicinity of the verification sub-block necessary for a phase compensation;

extracting first representative pixel data from the base sub-block;

generating first representing data that represents first representative pixel data group of the base sub-block and second representing data that represents a pixel group at a position corresponding to the verification sub-block, comparing the first representing data with the second representing data, and selecting pixel data used for the collation;

extracting first feature amount data from the base sub-block, the first feature amount data representing the range of all pixels thereof;

extracting second feature amount data from the modified verification sub-block, the second feature amount data representing the range of all pixels of the modified verification sub-block, the all pixels being selected pixels; and comparing the first feature amount data with the second feature amount data, generating an evaluated value for the sub-block, generating a totally evaluated value corresponding to the evaluated value for the sub-block, and partially collating the first image data with the second image data corresponding to the totally evaluated value.

According to the sixteenth aspect of the invention to provide an image collating apparatus, comprising:

means for segmenting first image data into a plurality of base blocks and segmenting each of the base blocks into a plurality of base sub-blocks;

means for segmenting second image data into a plurality of verification blocks, segmenting each of the verification blocks into a plurality of verification sub-blocks, and generating a modified verification sub-block that contains pixels in the vicinity of the verification sub-block necessary for a phase compensation;

means for extracting first representative pixel data from the base sub-block;

means for generating first representing data that represents first representative pixel data group of the base sub-block and second representing data that represents a pixel group at a position corresponding to the verification sub-block, comparing the first representing data with the second representing data, and selecting pixel data used for the collation;

means for extracting first feature amount data from the base sub-block, the first feature amount data representing the range of all pixels thereof;

means for extracting second feature amount data from the modified verification sub-block, the second feature amount data representing the range of all pixels of the modified verification sub-block, the all pixels being selected pixels; and means for comparing the first feature amount data with the second feature amount data, generating an evaluated value for the sub-block, generating a totally evaluated value corresponding to the evaluated value for the sub-block, and partially collating the first image data with the second image data corresponding to the totally evaluated value.

A base block is segmented into a plurality of base sub-blocks. Pixel data at for example center position of each base sub-block is extracted as first representative pixel data. An average value as first representing data that represents a first representative pixel group is generated. A verification block is segmented into a plurality of verification sub-blocks. An average value as second representing data that represents a pixel group at positions corresponding to the verification sub-blocks is generated. These average values are compared and pixel data used for a collation is selected. Feature amount data (MAX, MIN) that represents the range of the selected pixel data is extracted for each verification sub-block. It is determined whether or not the second representative pixel data extracted from each base sub-block is included in the range from the MAX to the MIN. Corresponding to the compared result, an evaluated value is generated. Thus, the number of calculations can be reduced and the phase difference can be prevented.

In addition to comparing the representative pixel data and the feature amount for a collation, areas of each of the base sub-blocks and each of the verification sub-blocks can be collated. In this case, pixels used in each of the verification sub-blocks are selected. In other words, for example, the maximum value MAX 1 and the minimum value MIN 1 of each of the base sub-block are extracted as first feature amount data. A maximum value MAX 2 and a minimum value MIN 2 of a modified verification block that is extended for phase compensation are extracted as second feature amount data. Thereafter, the first feature amount data and the second feature amount data are compared. When MAX $2 \geq$ MAX 1 and MIN $1 \geq$ MIN 2, evaluated values $\Delta 1=0$ and $\Delta 2=0$ are generated. When MAX $1 \geq$ MAX 2, evaluated values $\Delta 1=$ MAX 1–MAX 2 and $\Delta 2=2$ are generated. When MIN $2 \geq$ MIN 1, evaluated values $\Delta 1=0$ and $\Delta 2=$ MIN 2–MIN 1 are generated. Thus, the number of calculations can be reduced and phase compensation can be performed.

The above, and other, objects, features and advantage of the present invention will become readily apparent from the following detailed description thereof which is to be read in connection with the accompanying drawings.

BRIEF DESCRIPTION OF THE DRAWINGS

FIG. 1 is a block diagram showing an example of a motion compensation predicted encoding apparatus according to the present invention;

FIG. 26 is a block diagram according to the fourth embodiment of the present invention;

FIG. 28 is a schematic diagram for explaining a phase compensation according to the present invention;

FIG. 30 is a block diagram showing the construction of the fifth embodiment of the present invention;

FIG. 33 is a schematic diagram showing the construction of blocks of the seventh embodiment of the present invention;

FIG. 39 is a schematic diagram showing the construction of blocks according to the ninth embodiment of the present invention;

DETAILED DESCRIPTION OF THE PREFERRED EMBODIMENTS

Figure 2A:
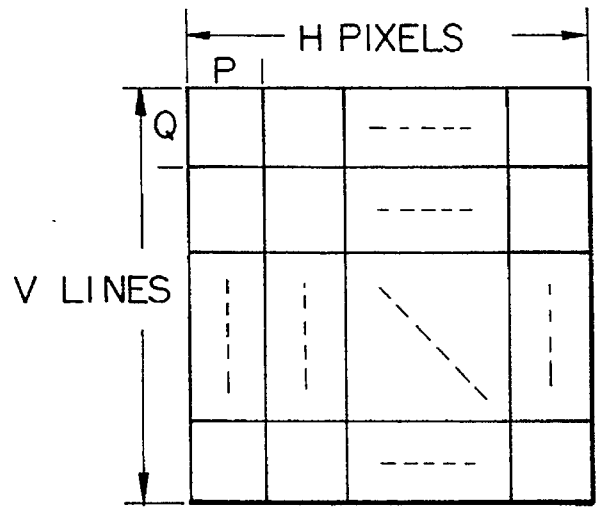
FIGS. 2A and 2B are schematic diagrams for explaining a motion vector detecting method according to a conventional block matching method.
Figure 2B:
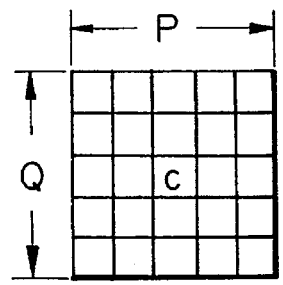
Figure 3A:
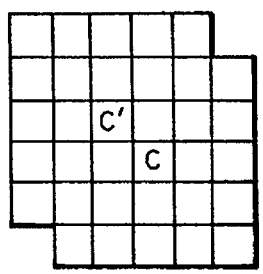
FIGS. 3A, 3B and 3C are schematic diagrams for explaining the motion vector detecting method according to the conventional block matching method.
Figure 3B:
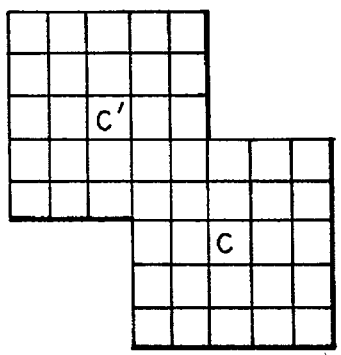
Figure 3C:
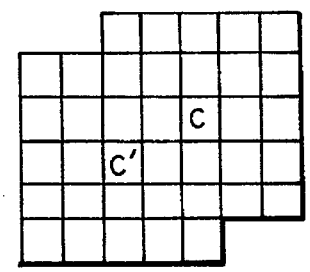
Figure 4:
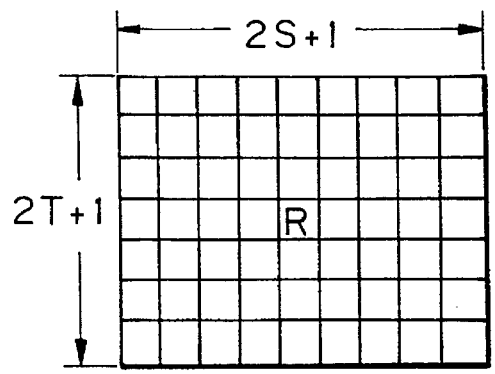
FIG. 4 is a schematic diagram for explaining a search range of the motion vector detecting method according to the conventional block matching method.
Figure 5:
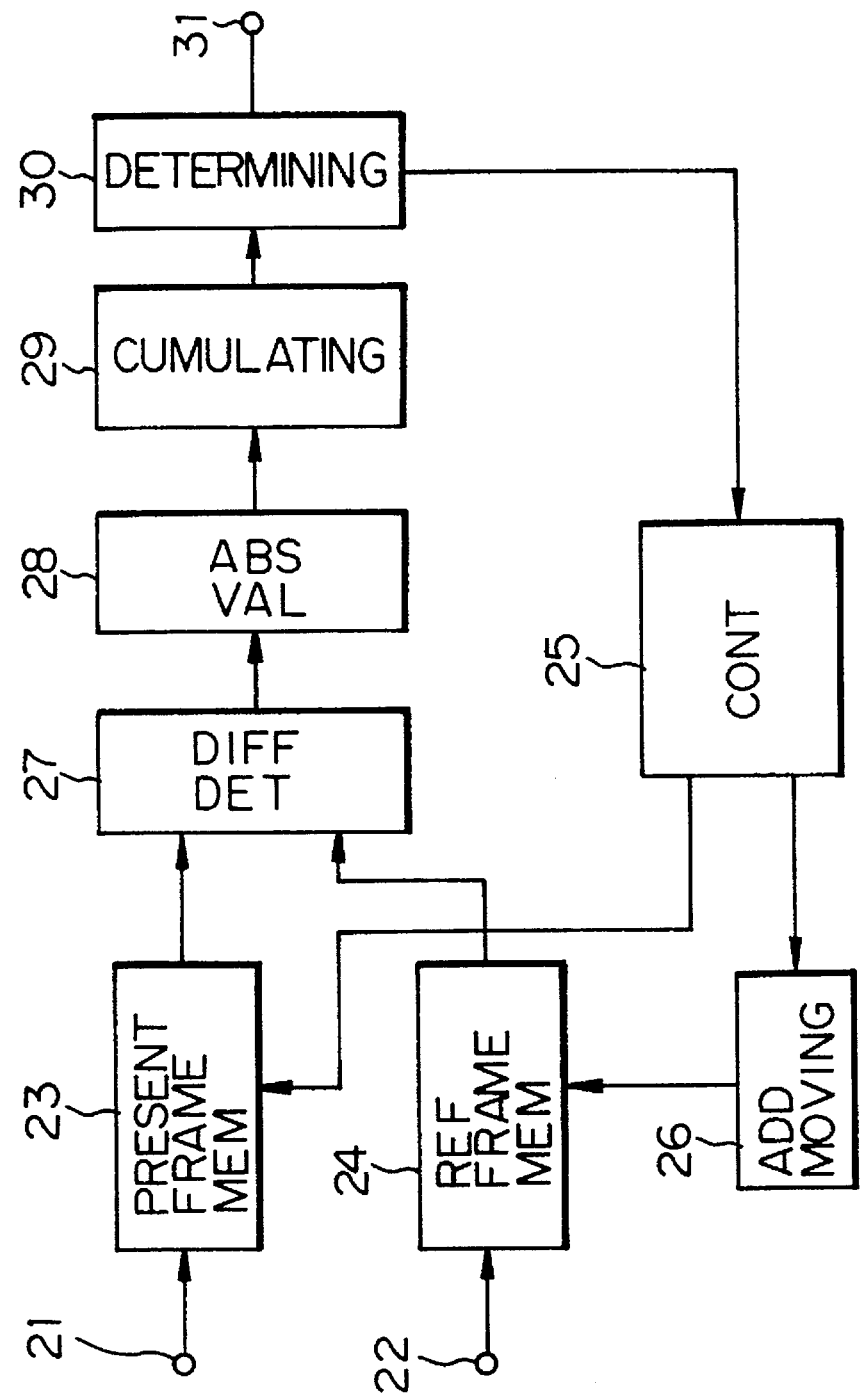
FIG. 5 is a block diagram showing a motion vector detecting apparatus according to the conventional block matching method.
Figure 6:
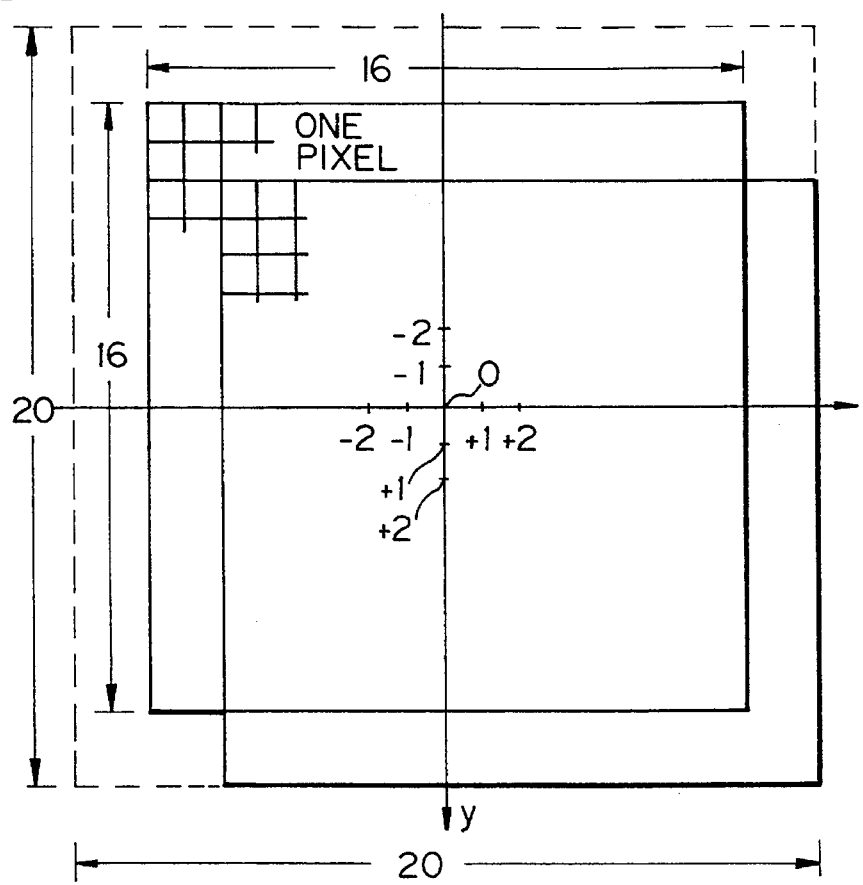
FIG. 6 is a schematic diagram for explaining a motion vector detection corresponding to the conventional block matching method.
Figure 7:
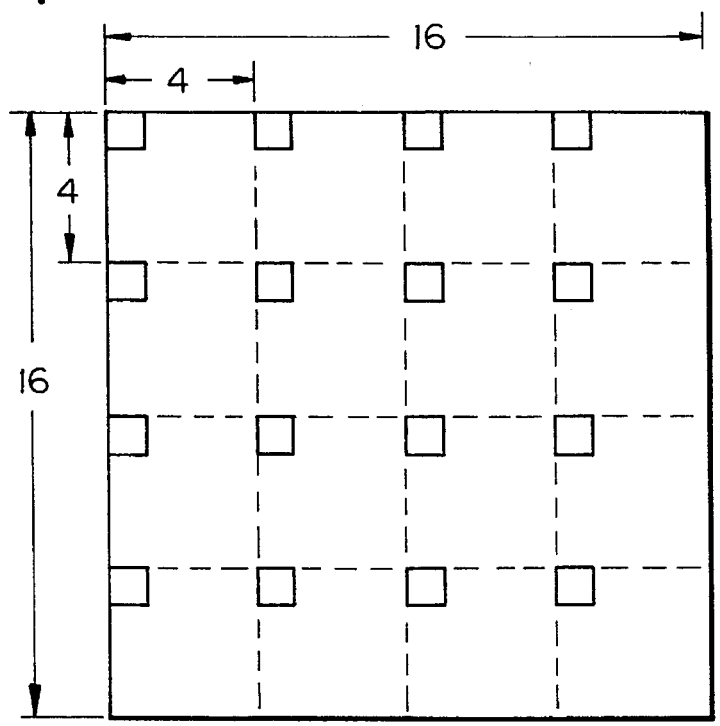
FIG. 7 is a schematic diagram for explaining a block matching method corresponding to a conventional thin-out method.
Figure 8:
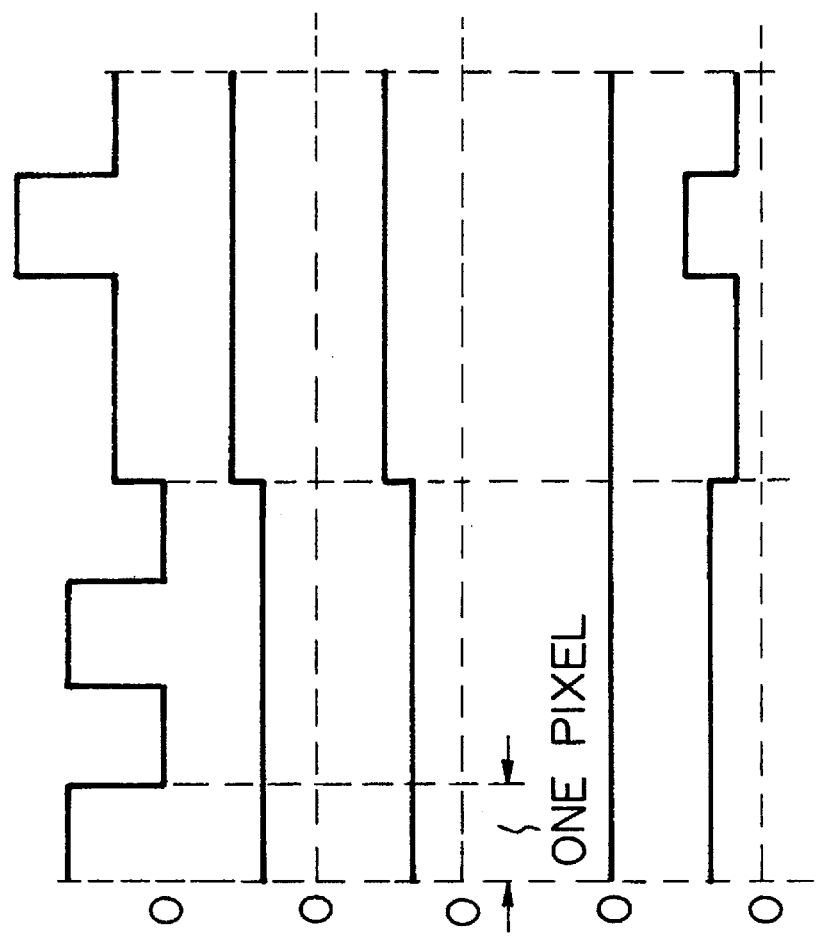
FIG. 8 is a schematic diagram for explaining an error collation preventing technique that has been proposed.
Figure 9:
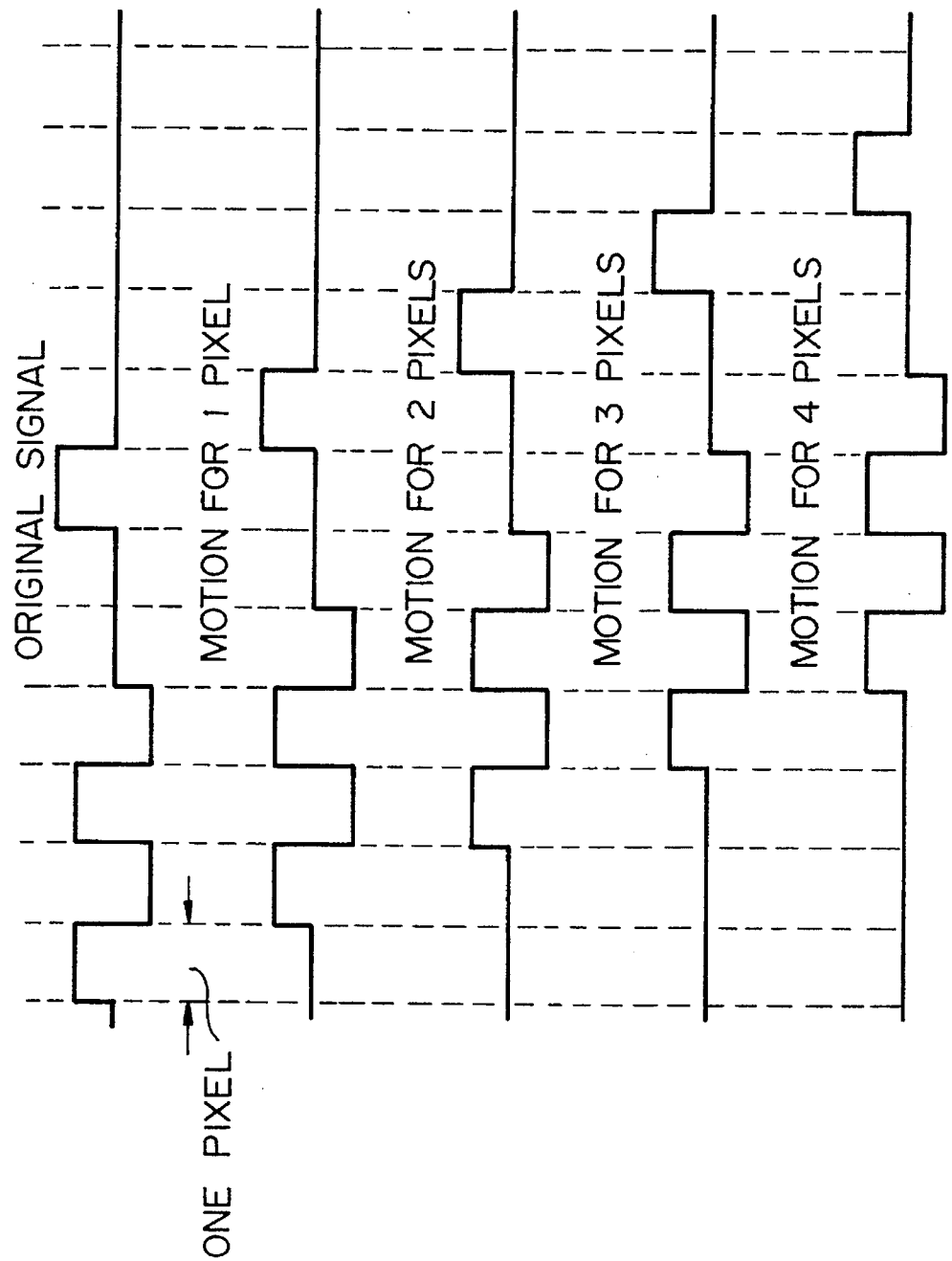
FIG. 9 is a schematic diagram for explaining problems of a conventional simplified block matching system.
Figure 10:
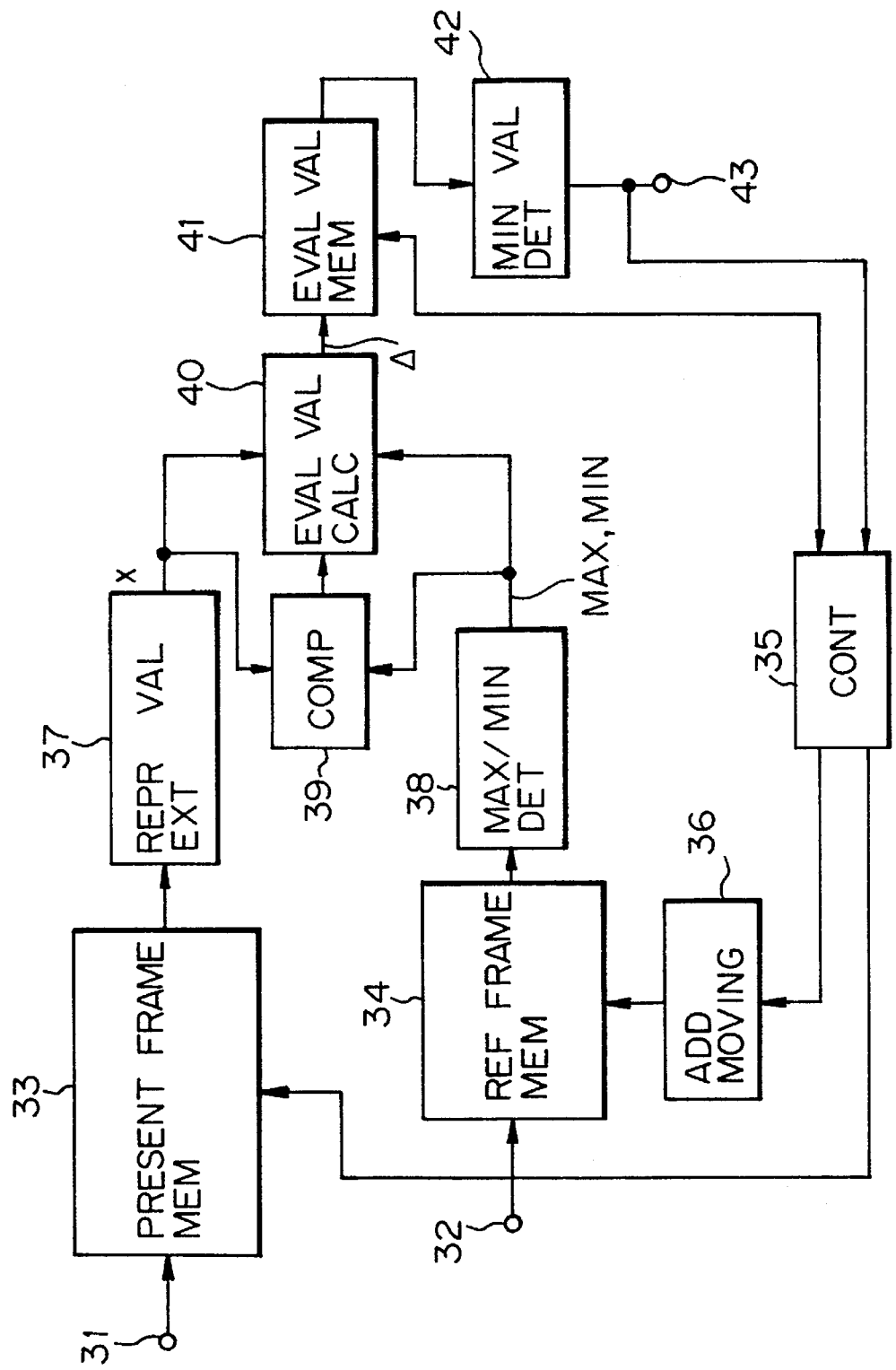
FIG. 10 is a block diagram showing the construction of the first embodiment of the present invention.

Next, with reference to the accompanying drawings, a motion vector detecting apparatus according to the first embodiment of the present invention will be described. FIG. 10 is a block diagram showing the embodiment. In FIG. 10, reference numeral 31 is an input terminal of image data of a present frame. Reference numeral 32 is an input terminal of image data of a reference frame. Reference numeral 33 is a present frame memory that stores image data of the present frame. Reference numeral 34 is a reference frame memory that stores image data of the reference frame. Reading operation and writing operation of the present frame memory 33 and the reference frame memory 34 are controlled by a controller 35. An address moving circuit 36 is provided in association with the reference frame memory 34. The address moving circuit 6 is controlled by the controller 35. Thus, the verification block is moved in the reference frame.

Figure 11:
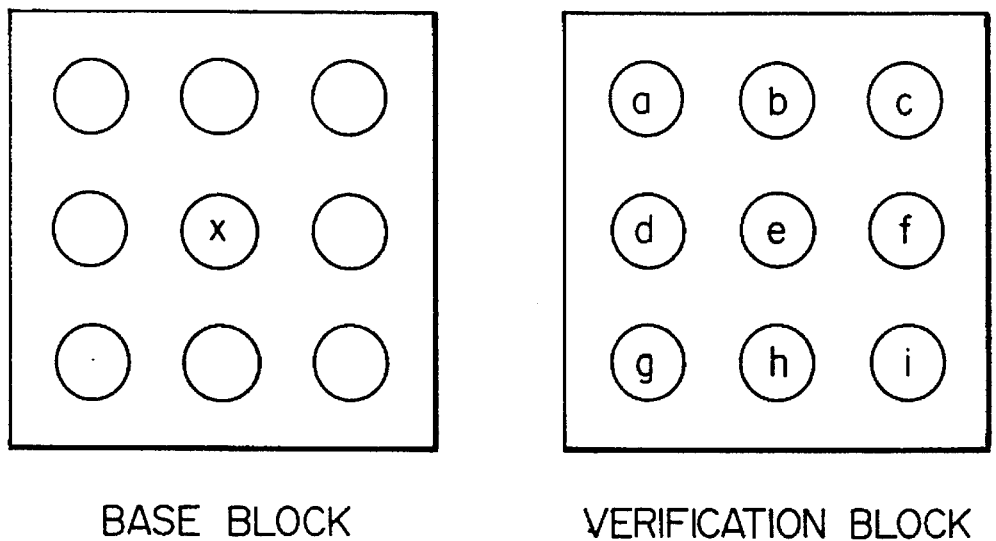
FIG. 11 is a schematic diagram showing the construction of blocks according to the first embodiment of the present invention.

The present frame memory 33 outputs base block data under the control of the controller 35. The base block data is supplied to a representative value extracting circuit 37. The representative value extracting circuit 37 extracts a representative value for each base block. The representative value represents the value of a representative pixel. For example, as shown in FIG. 11, the representative value is a value x of the pixel at the center position of a base block composed of (3×3) pixels. The representative value may be the value of the pixel at another position of the base block. Alternatively, the representative value may be the maximum value, the minimum value, or the extreme value of the base block.

The reference frame memory 34 outputs verification block data under the control of the controller 35. As with the base blocks, as shown in FIG. 11, each of the verification blocks has a two-dimensional area that is composed of (3×3) pixels. The values of nine pixels of each of the verification blocks are denoted by a, b, c, . . . , and i. The output is supplied to a maximum value/minimum value (MAX/MIN) detecting circuit 38. The MAX/MIN detecting circuit 38 detects a maximum value MAX and a minimum value MIN as feature amounts of the verification block. As the feature amounts, two values out of the MAX, the MIN, and the dynamic range DR (=MAX−MIN) can be used. Alternatively, the feature amounts may be (Av+σ) and (Av−σ), where Av is the average value of the verification block and σ is the standard deviation thereof.

An objective of the block matching is not limited to the present frame and the reference frame (that is chronologically followed or preceded by the present frame). For example, when a motion vector is detected between two still images or when a motion vector is detected between images with different resolutions, the present invention can be applied. In addition to detecting a motion vector, when two still images are collated, the present invention can be applied. In other words, when a still image that is for example a group photograph is treated as a reference image and a photograph of a particular person is treated as a considered image, these images are collated so as to detect at which position the considered image is present in the reference image. In this example, the entire reference image becomes the search range.

Figure 12:
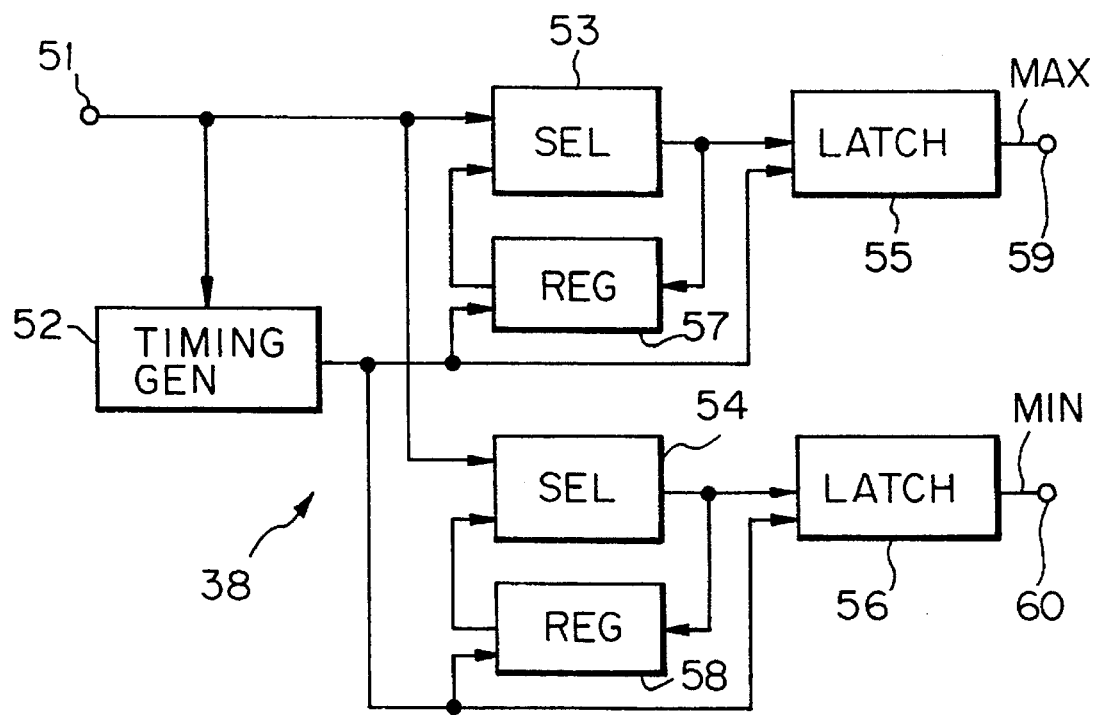
FIG. 12 is a block diagram showing a maximum value/ minimum value detecting circuit according to the first embodiment of the present invention.

FIG. 12 shows an example of the MAX/MIN detecting circuit 38. Referring to FIG. 12, in the detecting circuit MAX/MIN 38, pixel data of a verification block is supplied from an input terminal 51. The input data is supplied to a timing generating circuit 52 and selecting circuits 53 and 54. The timing generating circuit 52 generates a sample clock and a block timing signal. The sample clock synchronizes with the pixel data. The block timing signal represents the delimitation of a block.

The selecting circuit 53 selectively outputs larger one out of two pixels. The selecting circuit 54 selectively outputs smaller one out of the two pixels. Output data of the selecting circuit 53 is supplied to a latch 55 and a register 57. Output data of the selecting circuit 54 is supplied to a latch 56 and a register 58. Output data of the registers 57 and 58 are supplied to the selecting circuits 53 and 54, respectively. A maximum value MAX is supplied from the latch 55 to an output terminal 59. A minimum value MIN is supplied from the latch 56 to an output terminal 60.

In an initial state of the register 57 in which data of one verification block has not been input, the register 57 has been cleared to zero. Output data of the selecting circuit 53 is stored in the register 57. A larger value of the output data of the register 57 and the input pixel data is selected by the selecting circuit 53. Thus, when next pixel data is received, the maximum value of the former pixel data has been stored in the register 57. When nine pixels a to i of one verification block is received, the selecting circuit 53 outputs the maximum value MAX of the verification block. The maximum value MAX is latched by the latch 55. The minimum value MIN of the verification block is detected and supplied to the output terminal 60 in the same manner of the maximum value MAX.

Figure 13:
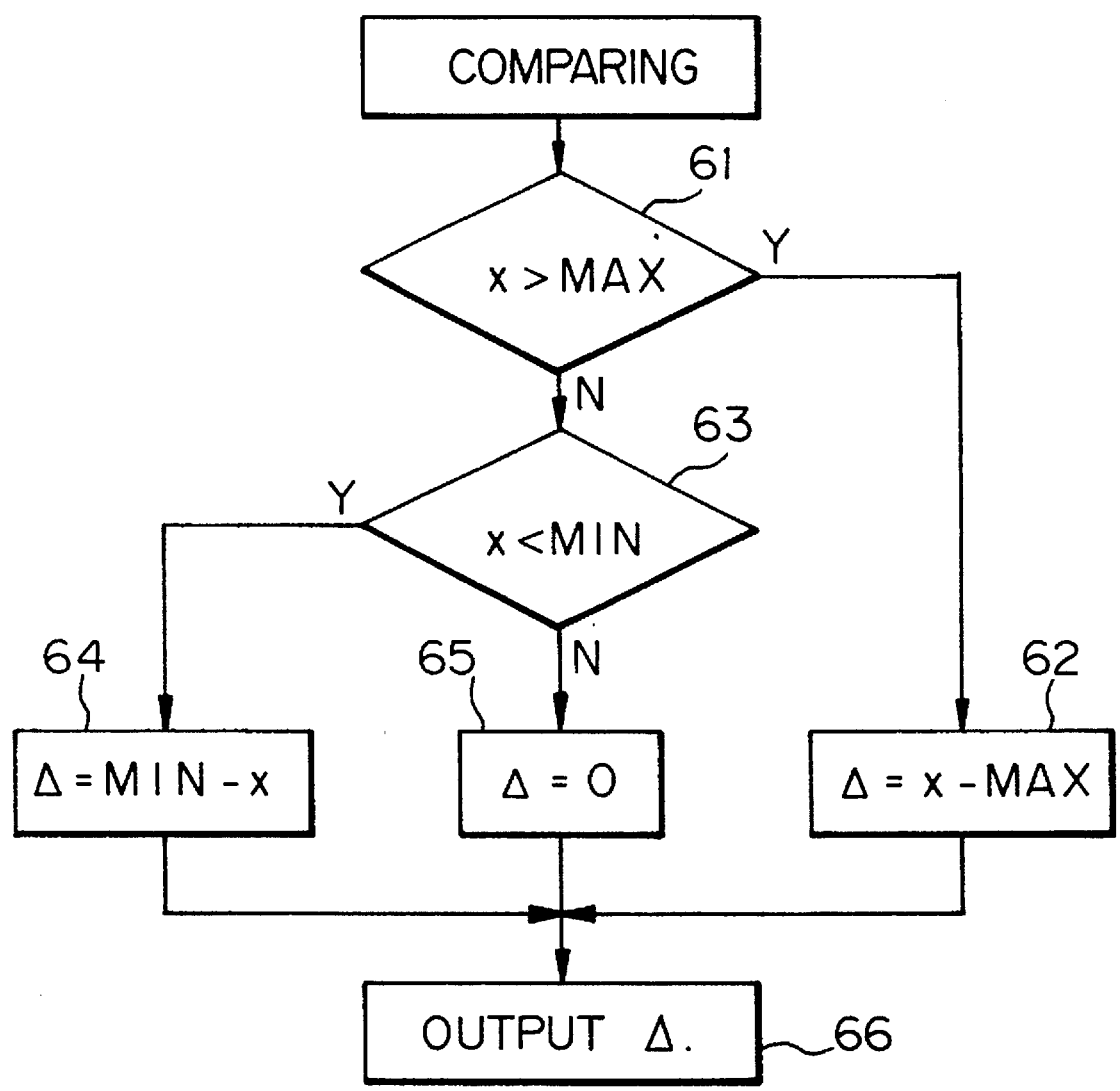
FIG. 13 is a flow chart showing a process for comparing the value of a representative pixel, the maximum value, and the minimum value and a process for generating an evaluated value.

The representative value x and the detected MAX and MIN are supplied to a comparing circuit 39 and an evaluated value calculating circuit 40. FIG. 13 is a flow chart showing software processes of the comparing circuit 39 and the evaluated value calculating circuit 40. When the comparing process is started, at step 61, it is determined whether or not x >MAX. When the determined result is (Y), the flow advances to step 62. At step 62, an evaluated value Δ =x−MAX is generated.

When the determined result at step 61 is (N), the flow advances to step 63. At step 63, it is determined whether or not x<MIN. When the determined result is (Y), Δ=MIN−x is generated. When the determined result at step 63 is (N) (namely, MIN≦x≦MAX), Δ=0 is set at step 65. At step 66, the evaluated value Δ is output.

Figure 14:
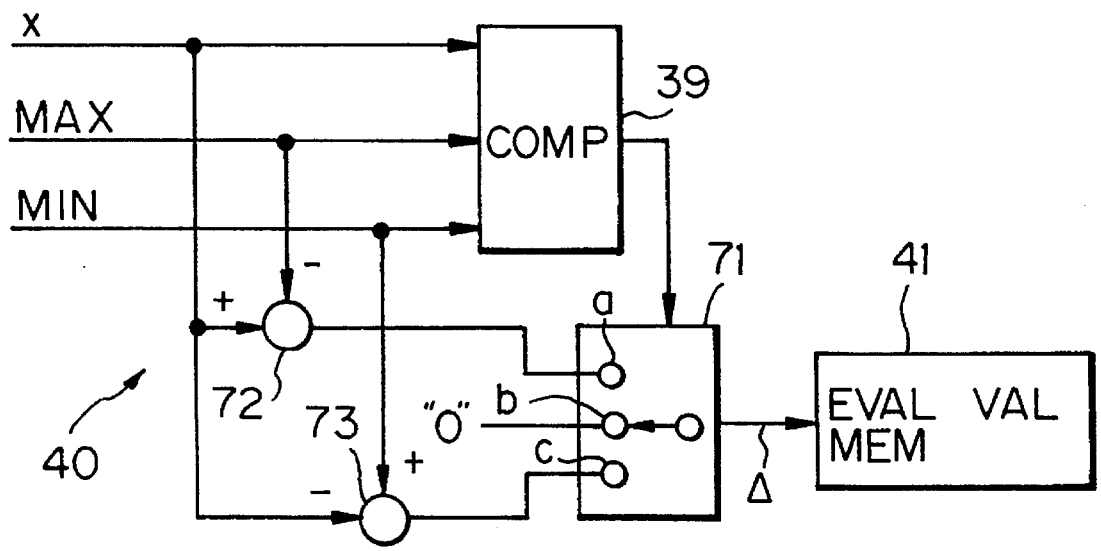
FIG. 14 is a block diagram showing a circuit for comparing the value of a representative value, the maximum value, and the minimum value and a circuit for generating an evaluated value.

FIG. 14 is a block diagram showing a hardware construction of the comparing circuit 39 and the evaluated value calculating circuit 40. The representative value x, the MAX, and the MIN are supplied to the comparing circuit 39. The comparing circuit 39 generales a 2-bit compared output. A selecting circuit 71 is controlled corresponding to the compared output. A subtracting circuit 72 supplies (x−MAX) to an input terminal a of the selecting circuit 71. Zero data is supplied to an input terminal b of the selecting circuit 71. (MIN−x) is supplied from a subtracting circuit 73 to an input circuit c of the selecting circuit 71.

The 2-bit output data of the comparing circuit 39 represents three relations of x>MAX, x<MIN, and MIN≦x≦MAX. The input terminals a, b, and c of the selecting circuit 71 are selected corresponding to these relations. Thus, the evaluated value Δ is generated. The evaluated value Δ generated by the evaluated value calculating circuit 40 is supplied to an evaluated value memory 41.

Figure 15A:
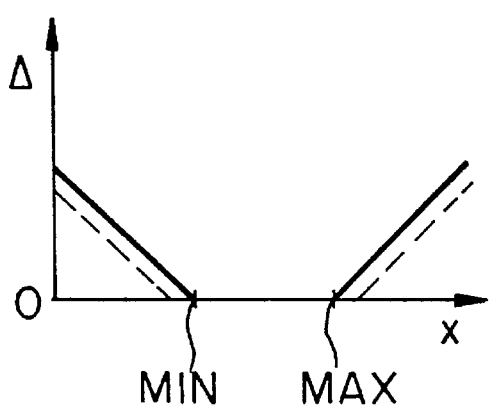
FIG. 15A and 15B are schematic diagrams for explaining the search range according to the first embodiment of the present invention.

As shown in FIG. 15A, when a representative value x is included in the range from the MIN to the MAX of a verification block, the evaluated value Δ is 0. When the representative value x is smaller than the MIN or larger than the MAX, the evaluated value Δ correspondingly increases. In reality, since there is noise, a noise margin is set so as to generate an evaluated value Δ that varies as a dashed line shown in FIG. 15A. The construction shown in FIG. 14 is an example of the present invention. In other words, by a combination of a gate circuit or a two-input selecting circuit, a variety of constructions can be formed. Alternatively, as an evaluated value, the absolute value of a difference, the n-th power value of the difference, and so forth may be used.

Figure 15B:
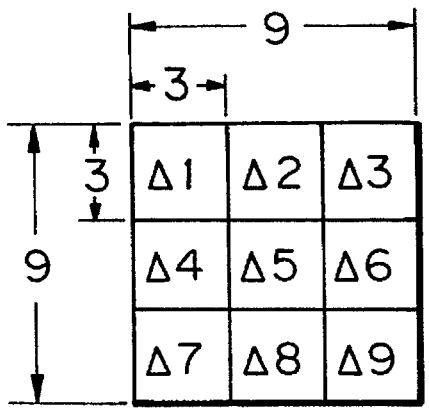

The evaluated values are calculated for the verification blocks corresponding to the representative pixels of the reference frame. The size of the search range is (3×3) base blocks and (3×3) verification blocks. Thus, the search range is (9×9) pixels. In this example, as shown in FIG. 15B, nine evaluated values Δ1 to Δ9 are obtained. The evaluated values are stored in the evaluated value memory 41. The position of the base block is at the center position of the search range (namely, the position of the evaluated value Δ5).

Returning to FIG. 10, the evaluated values are stored in the evaluated memory 41 under the control of the controller 35. The minimum value of the nine evaluated values Δ1 to Δ9 is detected by the minimum value detecting circuit 42. The position where the minimum value is present is a motion vector of the base block.

Figure 16:
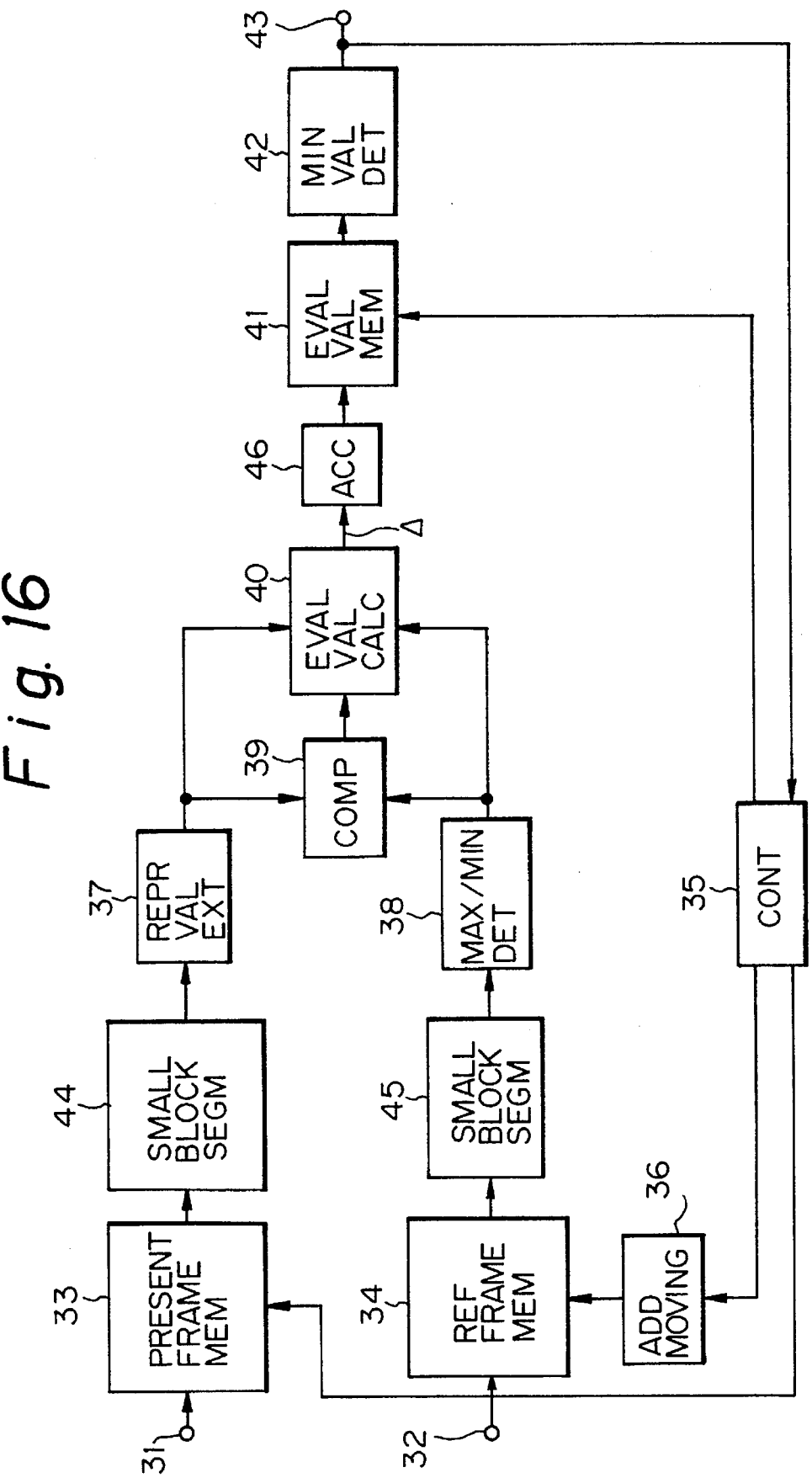
FIG. 16 is a block diagram showing the second embodiment of the present invention.

Next, another embodiment (hereinafter, referred to as the second embodiment) of the present invention will be described. FIG. 16 shows the construction according to the second embodiment of the present invention. The same portions as the first embodiment shown in FIG. 10 are denoted by the same reference numerals. In the construction shown in FIG. 10, small block segmenting circuits 44 and 45 are connected to the present frame memory 33 and the reference frame memory 34, respectively. In addition, a cumulating circuit 46 is connected to the evaluated value calculating circuit 40.

Figure 17:
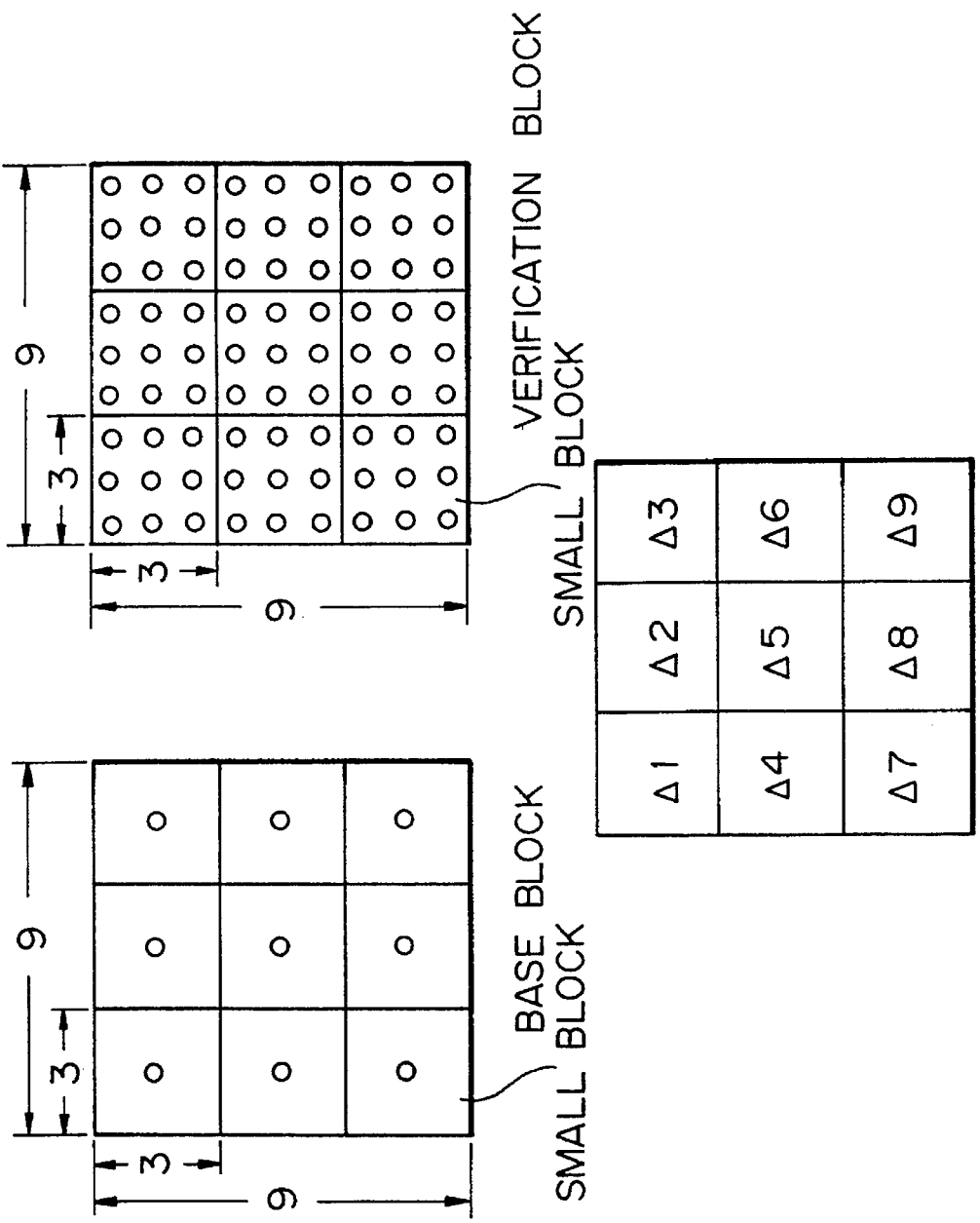
FIG. 17 is a schematic diagram for explaining a base block, a verification block, and an evaluated value according to the second embodiment of the present invention.

In the second embodiment, as shown in FIG. 17, an area of (3×3) pixels is treated as a small block. An area of (9×9) pixels in which (3×3) small blocks are disposed in vertical and horizontal directions is treated as a base block or a verification block. In FIG. 17, for the base block, only representative pixels at center positions of small blocks thereof are shown. A representative value of each small block of the base block is compared with the MAX and the MIN of each small block of the verification block. In the same manner as the first embodiment, an evaluated value Δ is calculated for each small block.

By comparing a base block with a verification block that is at a predetermined position and by calculating evaluated values, evaluated values Δ1 to Δ9 are obtained. The evaluated values are cumulated by the cumulating circuit 46. In other words, the cumulating circuit 46 performs a cumulation of ΣΔ=Δ1 +Δ2+ . . . +Δ9. The verification block is moved in the search range. At each search point, the cumulated value of the evaluated values is obtained. The minimum value of the cumulated evaluated values is detected by the minimum value detecting circuit 42. A motion vector that corresponds to the position of the verification block that generates the minimum value is obtained from the output terminal 43.

Figure 18:
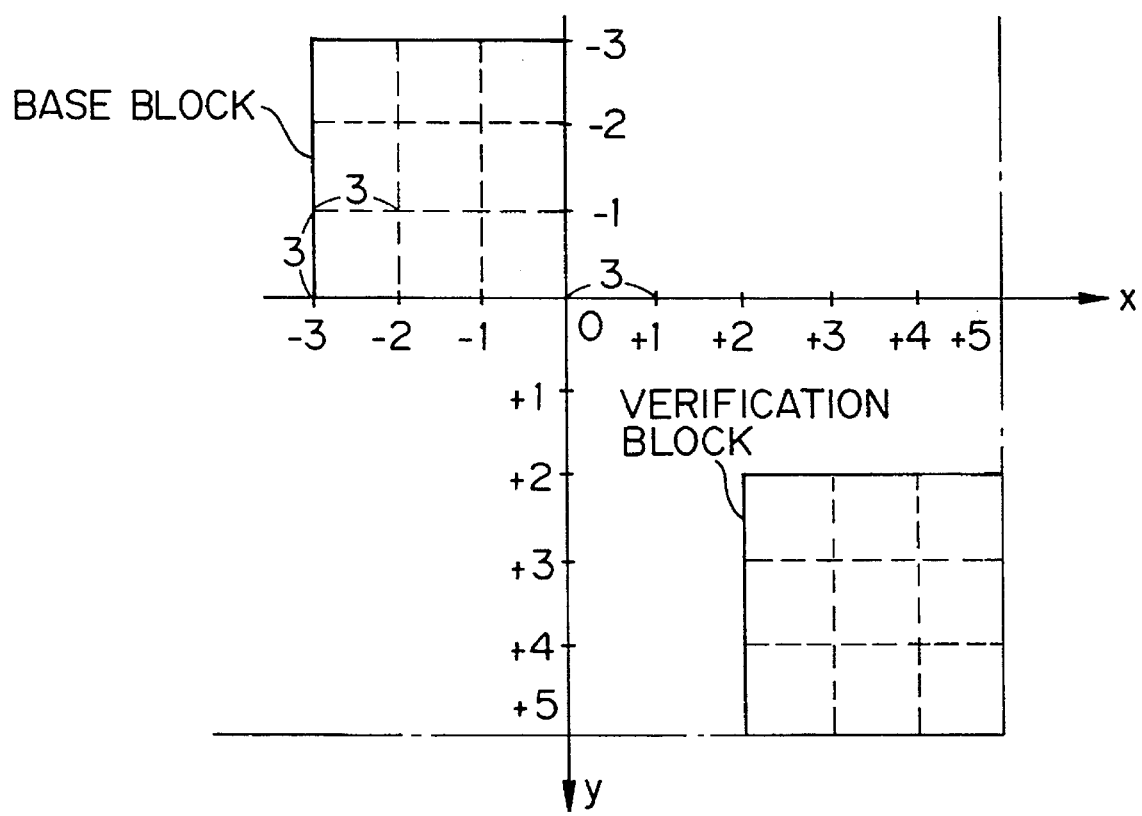
FIG. 18 is a schematic diagram showing part of the search range according to the second embodiment of the present invention.

FIG. 18 is a schematic diagram showing a part of a search range for ±5 pixels (denoted by dashed lines). Assuming that at the lower right corner of the base block is a base point, coordinate axes (x, y) that are sectioned every three pixels are shown. The base point is preferably disposed at a position as close to the center of the block as possible. When the verification block at the position (+5, +5) shown in FIG. 18 generates the minimum value of the cumulated evaluated values, a motion vector of (+15 (=5×3), +15 (=5×3)) is output.

In the present invention, a representative pixel of a base block is collated with a corresponding verification block (area). As amounts that represent all pixels a to i of the verification block, for example the maximum value thereof and the minimum value thereof are obtained. When the value x of the representative pixel is not included in the range, the representative pixel (x) cannot be collated with the verification block. Conventionally, when the number of search points is decreased, due to a phase deviation, an error may be detected. However, according to the present invention, when the number of search points is decreased to ⅓ (every three pixels), the same process as the full search operation can be performed. In other words, the collation can be performed without a phase deviation.

Figure 19:
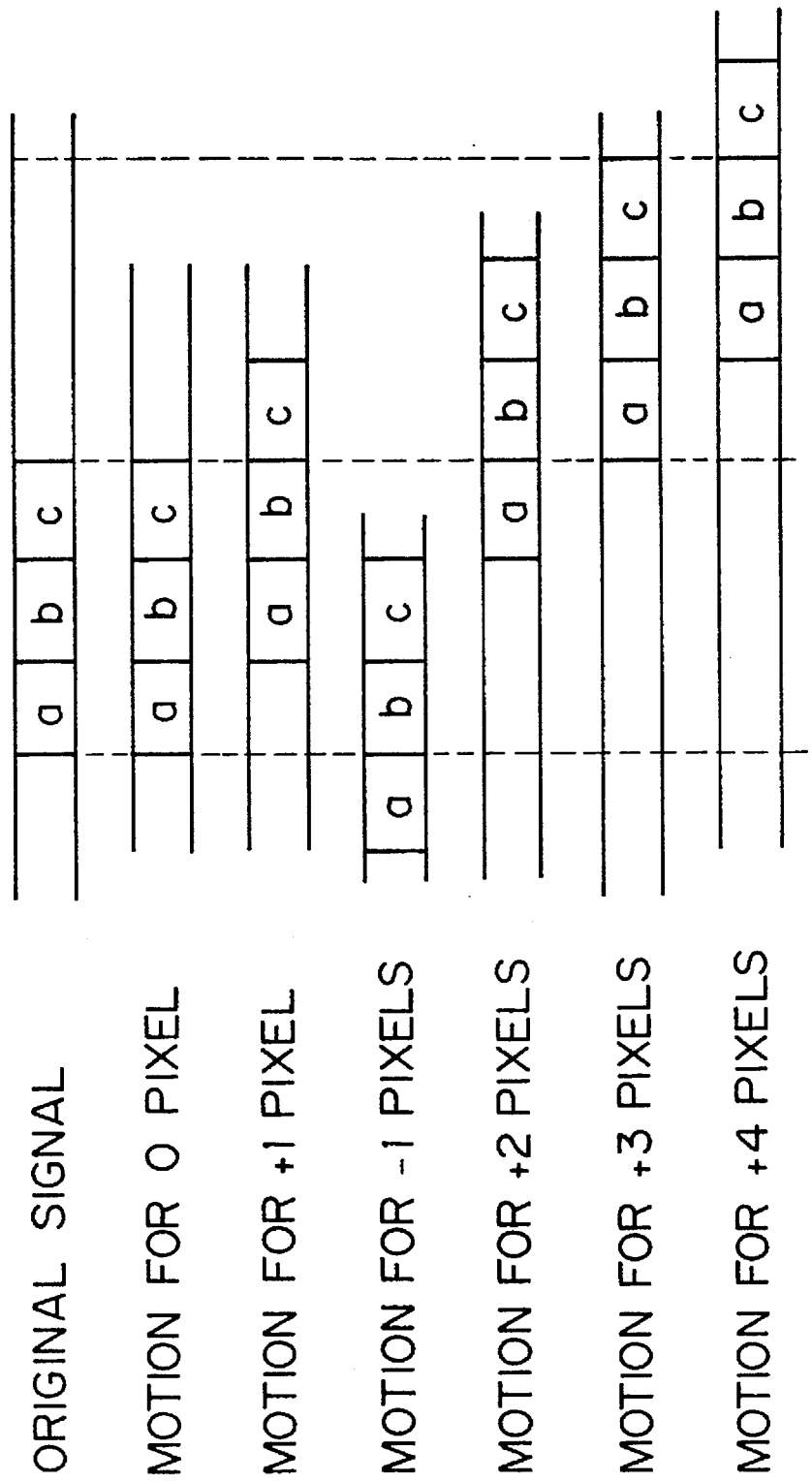
FIG. 19 is a schematic diagram for explaining a phase compensation according to the present invention.

FIG. 19 is a schematic diagram for explaining that no phase deviation takes place in the construction according to the present invention. For simplicity, assume a one-dimensional block composed of three pixels with values of a, b, and c. In FIG. 19, dashed lines are shown every three pixels. The one-dimensional block is considered as a base block. The value b of the center pixel is a representative value of the base block. In FIG. 19, motions of the base block for 0 pixel, +1 pixel, −1 pixel, +2 pixels, +3 pixels, and +4 pixels are shown.

As is clear from FIG. 19, when the base block is moved for ±1 pixel, the representative value b is present in the range of three pixels. Thus, when the base block is moved for ±1 pixel, it can be collated with the verification block and thereby the evaluated value Δ becomes 0. The motions of the base block for +2 pixels, +3 pixels, and +4 pixels can be detected by the collations with the next verification block. Thus, it is not necessary to overlap the range of the verification block (small blocks) with that of the base block. In the conventional simplifying method that decreases the number of the search points, only the motions of the base block for 0 pixel and any multiple of the length of the search point are precisely detected. However, according to the present invention, such a phase deviation can be compensated.

The real construction of the present invention may be modified in a variety of manners. For example, in addition to the above-described system, a system that considers a transient component can be used so as to prevent an error due to such a simplification. Moreover, when a motion vector is obtained, the accuracy thereof may be half pixel rather than one pixel.

According to the present invention, as well as simplification of search points, the number of calculations and the number of comparisons can be remarkably reduced. In addition, an error due to a phase deviation can be prevented.

Figure 20:
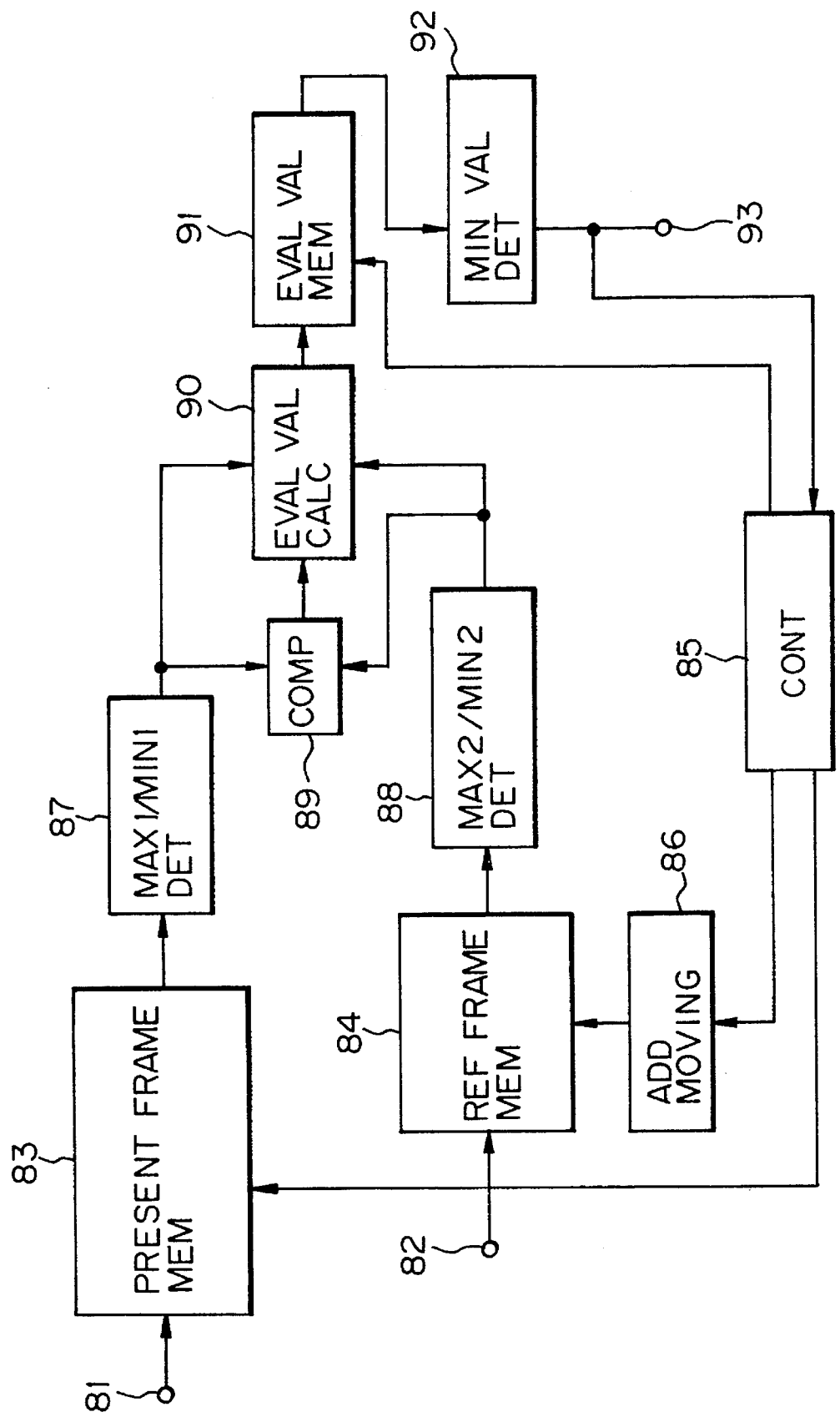
FIG. 20 is a block diagram showing the construction of the third embodiment of the present invention.

Next, with reference to the accompanying drawings, a motion vector detecting apparatus according to the third embodiment of the present invention will be described. FIG. 20 is a block diagram showing the embodiment. In FIG. 20, reference numeral 81 is an input terminal of image data of a present frame. Reference numeral 82 is an input terminal of image data of a reference frame. Reference numeral 83 is a present frame memory that stores image data of the present frame. Reference numeral 84 is a reference frame memory that stores image data of the reference frame. Reading operation and writing operation of the present frame memory 83 and the reference frame memory 84 are controlled by a controller 85. An address moving circuit 86 is provided in association with the reference frame memory 84. The address moving circuit 86 is controlled by the controller 85. Thus, the verification block is moved in the reference frame.

Figure 21:
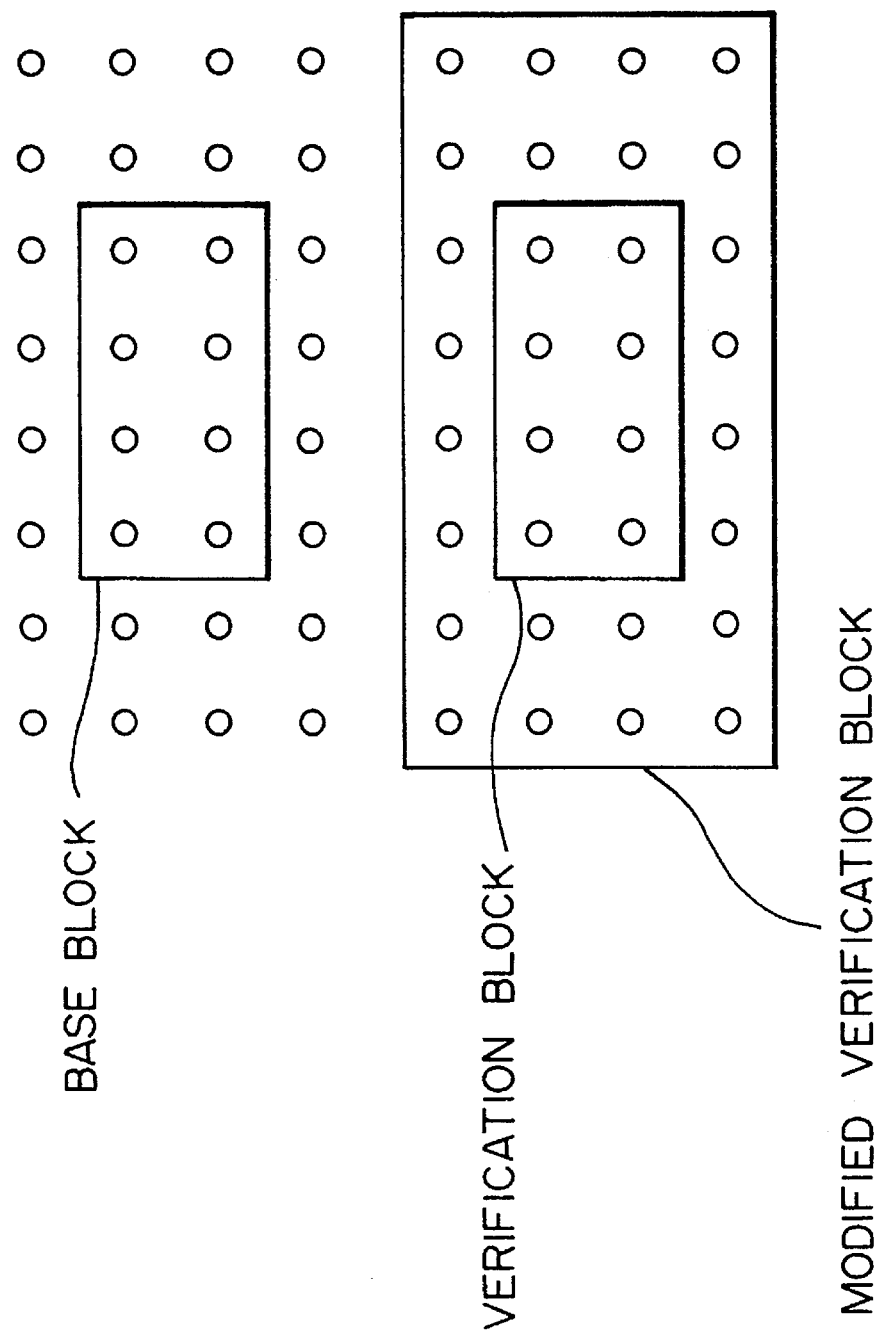
FIG. 21 is a schematic diagram showing the construction of blocks according to the third embodiment of the present invention.

The present frame memory 83 outputs base block data under the control of the controller 85. The base block data is supplied to a maximum value/minimum value (MAX 1/MIN 1) detecting circuit 87. The MAX 1/MIN 1 detecting circuit 87 extracts a maximum value MAX 1 and a minimum value MIN 1 as first feature amounts for each base block. Each base block is composed of for example (2×4) pixels as shown in FIG. 21. As the first feature amounts, two out of the MAX 1, the MIN 1, and the dynamic range DR 1 (=MAX 1–MIN 1) can be used. In addition, as the first feature amounts, Av1+Δ1 and Av1–Δ1 may be used, where Av1 is an average vale of the base block and σ1 is a standard deviation thereof.

The reference frame memory 84 outputs modified verification block data under the control of the controller 85. As with the base block, each verification block has a two-dimensional area that is composed of (2×4) pixels as shown in FIG. 21. The modified verification block is composed by adding a phase compensation range of ±1 line x ±2 pixels to the verification block. As shownin FIG. 21, the modified verification block data that is composed of (4×8) pixels is supplied to a maximum value/minimum value (MAX 2/MIN 2) detecting circuit 88. The MAX 2/MIN 2 detecting circuit 88 detects a maximum value MAX 2 and a minimum value MIN 2 as second feature amounts. As the second feature amounts, two out of the MAX 2, the MIN 2, and the dynamic range DR 2 (=MAX 2–MIN 2) can be used. In addition, as the second feature amounts, Av+Δ and Av–Δ A may be used, where Av2 is an average value of the verification block and σ2 is a standard deviation thereof.

An example of the MAX 1/MIN 1 detecting circuit 87 could be explained by referring to FIG. 12. When eight pixels of one base block are received by MAX 1/MIN 1 detecting circuit 87, the selecting circuit 53 outputs the maximum value MAX 1 of the verification block. The maximum value MAX 1 is latched by the latch 55. The minimum value MIN 1 of the base block is detected and supplied to the output terminal 60 in the same manner of the maximum value MAX 1. The construction of the MAX 2/MIN 2 detecting circuit 88 is the same as that shown in FIG. 12. The MAX 2/MIN 2 detecting circuit 88 detects a maximum value MAX 2 and a minimum value 2 of 32 pixels of the modified verification block.

Figure 22:
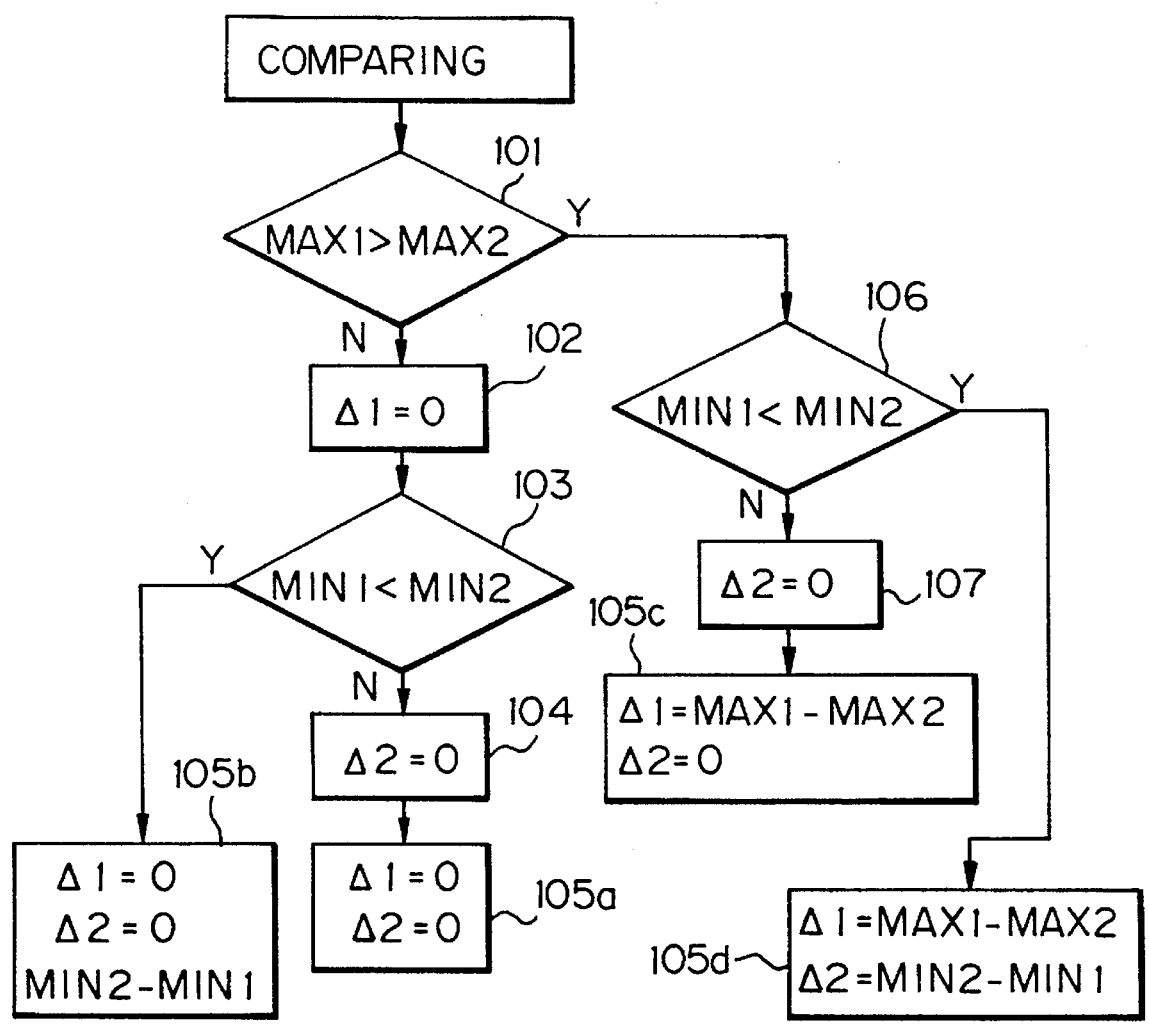
FIG. 22 is a flow chart showing a process for comparing the value of a representative pixel, the maximum value, and the minimum value and a process for generating an evaluated value.

The detected MAX 1, the MIN 1 the MAX 2, and the MIN 2 are supplied to a comparing circuit 89 and an evaluated value calculating circuit 90. FIG. 22 is a flow chart showing software processes of the comparing circuit 89 and the evaluated value calculating circuit 90. When the comparing process is started, at step 101, it is determined whether or not MAX 1 >MAX 2. When the determined result is (N) (namely, MAX 2≧MAX 1), the flow advances to step 102. At step 102, an evaluated value Δ1=0 is set. At step 103, it is determined whether or not MIN 1<MIN 2. When the determined result is (N) (namely, MIN 1≧MIN 2), the flow advances to step 104. At step 104, an evaluated value Δ2=0 is set. Thus, the evaluated values Δ1=0 and Δ2=0 are generated at step 105a. Thus, it is determined that the minimum value MIN 1 and the maximum value MAX 1 of the base block is included in the range from the minimum value MIN 2 to the maximum value MAX 2 of the modified verification block and that the base block has been collated with the verification block. When the determined result at step 103 is (Y), evaluated values Δ1=0 and Δ2=MIN 2–MIN 1 are generated at step 105b.

When the determined result at step 101 is (Y), the flow advances to step 106. At step 106, it is determined whether or not MIN 1<MIN 2. When the determined result at step 106 is (N) (namely, MIN 1≧MIN 2), an evaluated value Δ2=2 is set at step 107 and evaluated values Δ1=MAX 1–MAX 2 and Δ2=0 are generated at step 105c. When the determined result at step 106 is (Y), evaluated values Δ1=MAX 1–MAX 2 and Δ2=MIN 2–MIN 1 are generated at step 105d.

Figure 23:
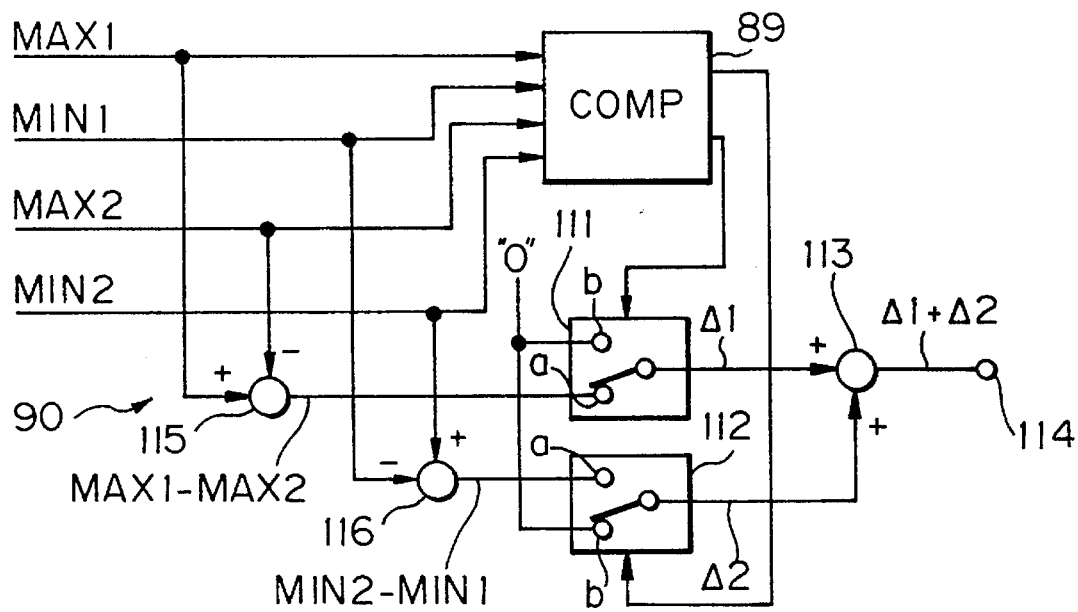
FIG. 23 is a block diagram showing a circuit for comparing the value of a representative value, the maximum value, and the minimum value and a circuit for generating an evaluated value.

FIG. 23 is a block diagram showing a hardware construction of the comparing circuit 89 and the evaluated value calculating circuit 90. The MAX 1 and the MIN 1 of the base block and the MAX 2 and the MIN 2 of the modified verification block are supplied to the comparing circuit 89. The comparing circuit 89 generates two compared outputs. Selecting circuits 111 and 112 are controlled corresponding to the compared outputs. Output data (MAX 1–MAX 2) of a subtracting circuit 115 is supplied to an input terminal a of the selecting circuit 111. Zero data is supplied to an input terminal b of the selecting circuit 111. Output data (MIN 2–MIN 1) of a subtracting circuit 116 is supplied to an input terminal a of the selecting circuit 112. Zero data is supplied to an input terminal b of the selecting circuit 112.

When MAX 1>MAX 2, one output (that is referred to as the first output) of the comparing circuit 89 causes the selecting circuit 111 to select the input terminal a (namely, MAX 1–MAX 2). When MAX 1<MAX 2, the first output of the comparing circuit 89 causes the selecting circuit 111 to select the input terminal b (namely, zero data). When MIN 1<MIN 2, the other output (that is referred to as the second output) of the comparing circuit 89 causes the selecting circuit 112 to select the input terminal a (namely, MIN 2–MIN 1). When MIN 1≧MIN 2, the second output of the comparing circuit 89 causes the selecting circuit 112 to select the input terminal b (namely, zero data). An evaluated value Δ1 obtained from the selecting circuit 111 and an evaluated value Δ2 obtained from the selecting circuit 112 are supplied to an adding circuit 113. An output (Δ1+Δ2) of the selecting circuit 113 is obtained from an output terminal 114. The evaluated value Δ generated in the evaluated value calculating circuit 90 is stored in the evaluated value memory 91.

Figure 24:
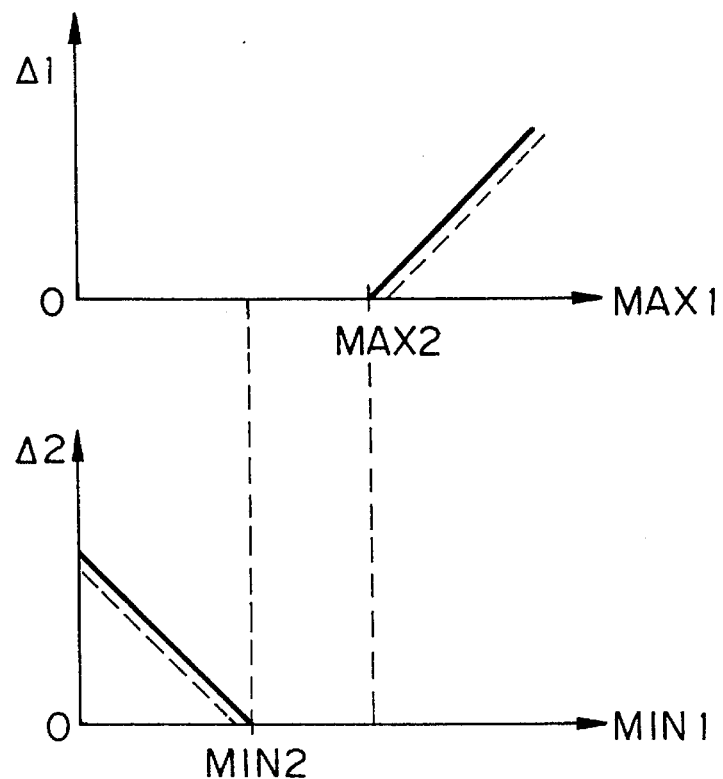
FIG. 24 is a schematic diagram for explaining an evaluated value.

The evaluated values Δ1 and Δ2 vary as shown in FIG. 24. When MAX 1<MAX 2, the evaluated value Δ1 is 0. As MAX 1>MAX 2, the evaluated value correspondingly increases. When MIN 1>MIN 2, the evaluated value Δ2 is 0. As MIN 1<MIN 2, the evaluated value Δ2 correspondingly increases. In reality, there is noise. A noise margin is set. Evaluated values Δ1 and Δ2 that vary as dashed lines of FIG. 24 may be generated. The construction shown in FIG. 23 is an example. By a combination of a gate circuit or a four-input selecting circuit, a verity of constructions may be used. As evaluated values, the absolute values of differences, the n-th power values thereof, and so forth may be used.

Figure 25:
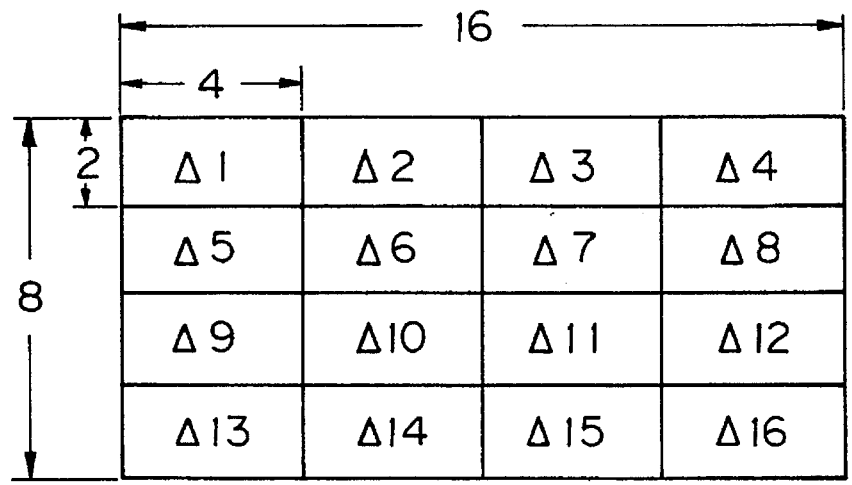
FIG. 25 is a schematic diagram for explaining a search range according to the third embodiment of the present invention.

The evaluated values are calculated for each verification block corresponding to the base block. The size of the search range is for example (4×4) base blocks or the verification blocks (composed of 8×16 pixels). The address moving circuit moves a read address which is from the reference frame memory 84 under the control of the controller 85. Therefore, the verification block is moved within the search range. In this example, as shown in FIG. 25, 16 evaluated values Δ1 to Δ16 are obtained. The evaluated values are stored in the evaluated value memory 91. The position of the base block is nearly at the center of the search range.

Returning to FIG. 20, the evaluated values are stored in the evaluated value memory 91 under the control of the controller 85. The minimum value of the 16 evaluated values Δ1 to Δ16 is detected by the minimum value detecting circuit 92. The position of the minimum value is a moving vector of the base block.

Next, another embodiment (hereinafter, referred to as the fourth embodiment) of the present invention will be described. FIG. 26 shows the construction according to the fourth embodiment of the present invention. The same portions as the third embodiment shown in FIG. 20 are denoted by the same reference numerals. In the construction shown in FIG. 20, small block segmenting circuits 94 and 95 are connected to the present frame memory 83 and the reference frame memory 84, respectively. In addition, a cumulating circuit 96 is connected to the evaluated value calculating circuit 90.

In the fourth embodiment, an area composed of (2×4) pixels that was described as the base block in the third embodiment is treated as a small block. An area composed of (4×4) small blocks (namely, 8×16 pixels) that was the search range of the first embodiment is treated as a base block and a verification block. A MAX 1 and a MIN 1 of each small block of the base block are compared with a MAX 2 and a MIN 2 of each small block of the verification block, respectively. In the same manner as the first embodiment, the evaluated values Δ1 and Δ2 are calculated for each small block.

By comparing the base block with the verification block that is at a predetermined positions and by calculating evaluated values, evaluated values Δ1 to Δ16 are obtained. The evaluated values are cumulated by the cumulating circuit 96. In other words, the cumulating circuit 96 performs a cumulation of ΣΔ=Δ1+Δ2+ . . . +Δ16. The verification block is moved in a predetermined search range. At each search point, the cumulated value of the evaluated values is obtained. The minimum value of the cumulated evaluated values is detected by the minimum vale detecting circuit 92. A motion vector that corresponds to the position of the verification block that generates the minimum value is obtained from the output terminal 93.

Figure 27:
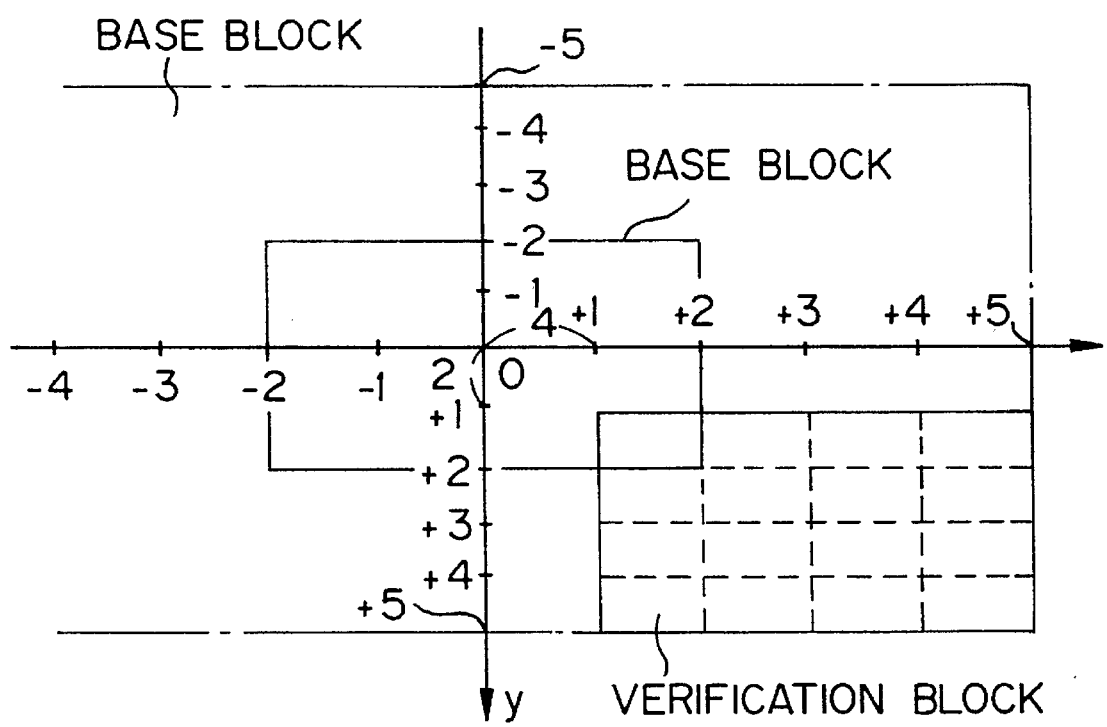
FIG. 27 is a schematic diagram showing part of a search range according to the fourth embodiment of the present invention.

FIG. 27 is a schematic diagram showing a part of a search range for ±5 pixels (denoted by dashed lines). Assuming that the center of the base block is a base point, and that a coordinate axis x that is sectioned every four pixels and a coordinate axis y that is sectioned every two pixels are shown. When the verification block at the position (+5, +5) shown in FIG. 27 generates the minimum value of the cumulated evaluated values, a motion vector of (+20 (=4×5), +10 (=2×5)) is output.

In the present invention, areas of the base block and the verification block are collated. As amounts that represent the range of all pixels of the verification block, for example the maximum value MAX 2 and the minimum value MIN 2 are obtained. When the MAX 1 and the MIN 1 of the base block are not present in the range, it is determined that the base block has not been collated with the verification block. Conventionally, when the number of search points is decreased for simplifying the collating process, due to a phase deviation, an error is detected. However, according to the present invention, even if the number of search points is decreased for example every several pixels, as with the full search of the search points, the collation can be performed without a phase deviation.

FIG. 28 is a schematic diagram for explaining that the collation of such areas does not cause a phase deviation. For simplicity, assume a one-dimensional block composed of four pixels with values a, b, c, and d. Dashed lines are shown every four pixels. The one-dimensional block is considered as a base block. In FIG. 28, the motions of the base block for +1 pixel, +2 pixels, +3 pixels, and +4 pixels are shown.

As is clear from FIG. 28, when areas are compared, if the size of the verification block is the same as the size of the base block and the base block is moved for +1 pixel, +2 pixels, +3 pixels, and +4 pixels, an error may takes place in the collation. However, when the size of the base block is four pixels, since the base block has an extended area for two pixels on the left and right thereof, an error can be prevented in the collation. When the base block is moved for +3 pixels or +4 pixels, the collation can be performed with the next base block. The extended area of the verification block depend on the size thereof. In the conventional simplifying method that decreases the number of search points, only the motions of the base block for 0 pixel and any multiple of the length of the search point are detected. However, according to the present invention, such a phase deviation can be compensated.

According to the present invention, as well as simplification of search points, the number of calculations and the number of comparisons can be remarkably reduced. In addition, an error due to a phase deviation can be prevented.

Figure 29:
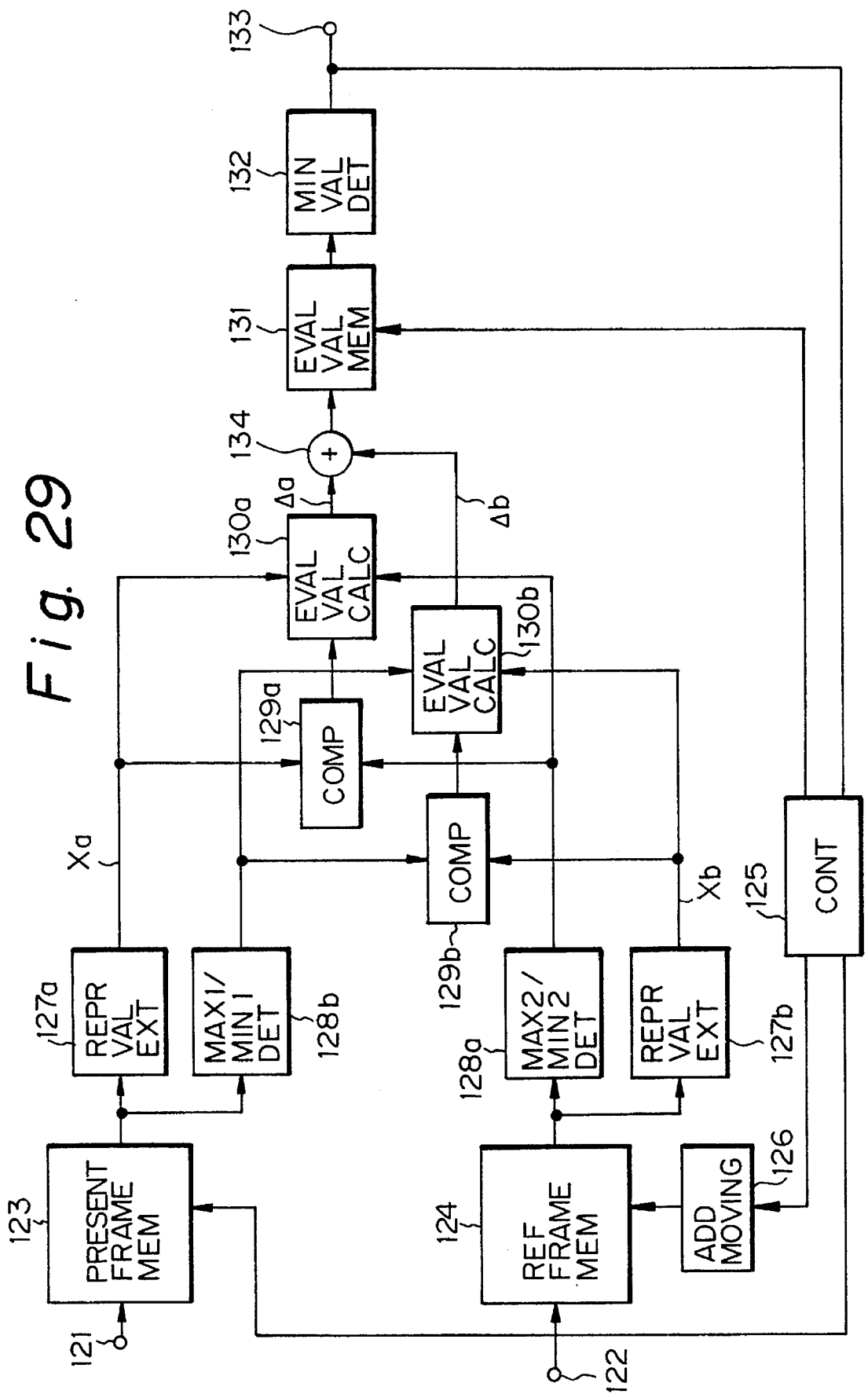
FIG. 29 is a block diagram according to the fifth embodiment of the the present invention.

Next, with reference to the accompanying drawings, a motion vector detecting apparatus according to the fifth embodiment of the present invention will be described. FIG. 29 is a block diagram showing the embodiment. In FIG. 29, reference numeral 121 is an input terminal of image data of a present frame. Reference numeral 122 is an input terminal of image data of a reference frame. Reference numeral 3 is a present frame memory that stores image data of the present frame. Reference numeral 124 is a reference frame memory that stores image data of the reference frame. Reading operation and writing operation of the present frame memory 123 and the reference frame memory 4 are controlled by a controller 125. An address moving circuit 126 is provided in association with the reference frame memory 124. The address moving circuit 6 is controlled by the controller 125. Thus, the verification block is moved in the reference frame.

FIG. 30 is a schematic diagram for explaining the construction of blocks corresponding to the embodiment. A base block is composed of (3×3) pixels. The construction of a verification block is the same as that of a base block. Forward collation is performed from the base block to the verification block. Backward collation is performed from the verification block to the base block.

The base block data is supplied to a representative value extracting circuit 127a and a MAX 1/MIN 1 (maximum value/minimum value) detecting circuit 128b. The representative value extracting circuit 127a extracts a representative value for each base block, the representative vale being for example a value $x_a$ of a pixel at the center position of each base block as shown in FIG. 30. The verification block data is supplied to a representative value extracting circuit 7b and a MAX 2/MIN 2 detecting circuit 128a. The representative value extracting circuit 127b extracts a representative value for each verification block, for example a value $x_b$ of a pixel at the center position of each verification block as shown in FIG. 30. As a representative pixel, a value of a pixel at another position of a block, the maximum value of the block, the minimum value thereof, or the extreme value thereof can be used.

The MAX 1/MIN 1 detecting circuit 128b detects a maximum value MAX 1 and a minimum value MIN 1 as feature amounts of the base block. The MAX 2/MIN 2 detecting circuit 128a detects a maximum value MAX 2 and a minimum value MIN 2 as feature amounts of the verification block. As the feature amounts, two values out of the MAX, the MIN, and the dynamic range DR (=MAX−MIN) can be used. Alternatively, the feature amounts may be (Av+σ) and (Av−σ), where Av is the average value of the block and G is the standard deviation thereof.

An example of the detecting circuits 8a and 8b is shown in FIG. 12. The MAX 1 and MAX 2 are simply denoted y MAX. The MIN 1 and MIN 2 are simply denoted by MIN. The software processes of the comparing circuits 129a and 129b and the evaluated value calculating circuits 130a and 130b is explained in FIG. 13.

The hardware construction of comparing circuits 129 (129a, 129b) and an evaluated value calculating circuit 130 (130a, 130b) is shown in FIG. 14.

As for the evaluated value Δ of the evaluated value memory 131, FIGS. 15A and 15B explain the evaluated value Δ.

Returning to FIG. 29, the totally evaluated values are stored in the evaluated memory 131 under the control of the controller 125. The totally evaluated values are obtained in the predetermined search range. The minimum value of the totally evaluated values is detected by the minimum value detecting circuit 132. The position where the minimum value is present is a motion vector of the base block.

Figure 31:
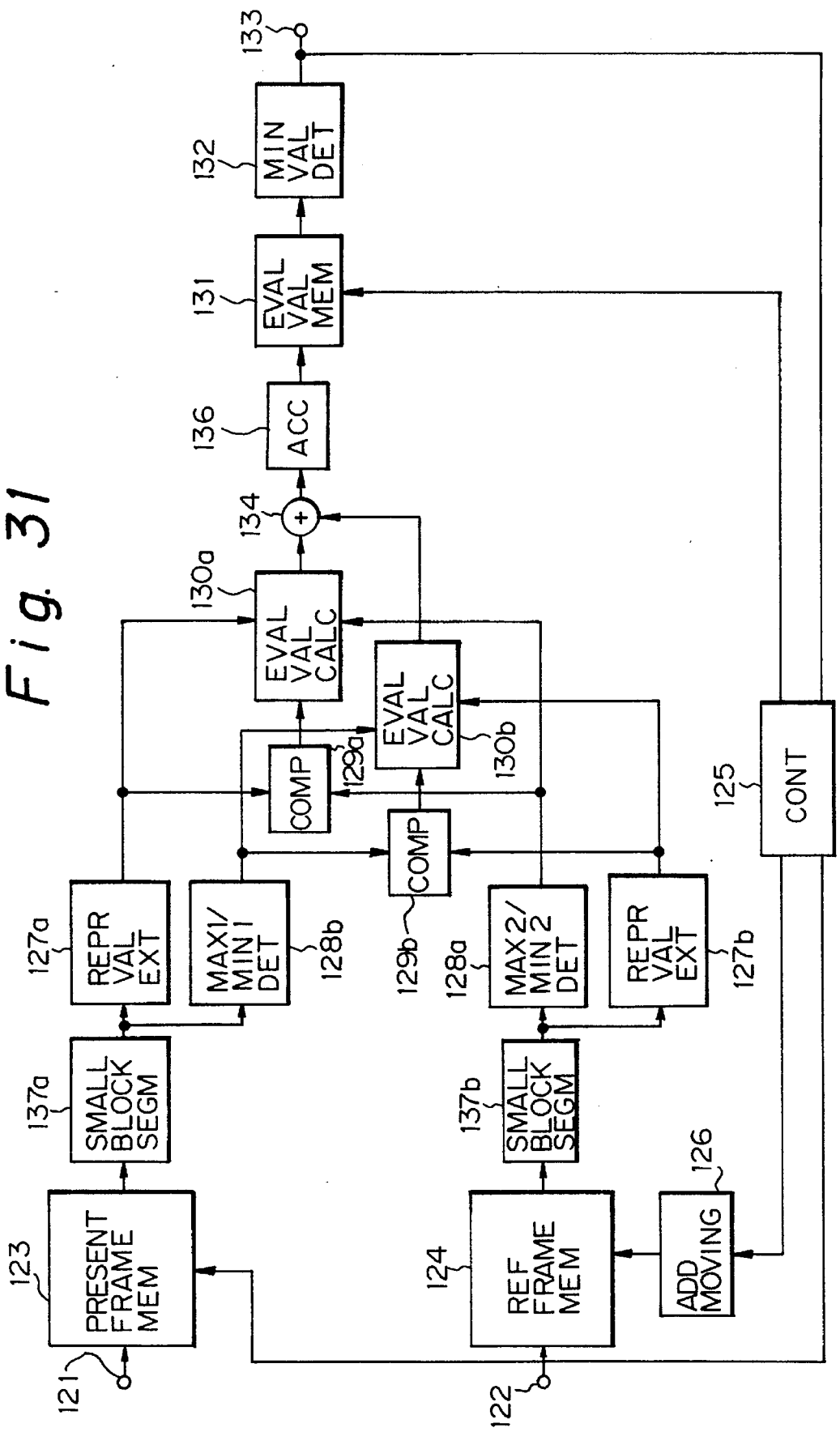
FIG. 31 is a schematic diagram showing the sixth embodiment of the of the present invention.

Next, another embodiment (hereinafter, referred to as the sixth embodiment) of the present invention will be described. FIG. 31 shows the construction according to the second embodiment of the present invention. The same portions as the fifth embodiment shown in FIG. 29 are denoted by the same reference numerals. In the construction shown in FIG. 29, small block segmenting circuits 137a and 137b are connected to the present frame memory 123 and the reference frame memory 124, respectively. In addition, a cumulating circuit 136 is connected to the adding circuit 134.

An explanation for the construction of FIG. 31 is done in FIG. 17 and 19.

Figure 32:
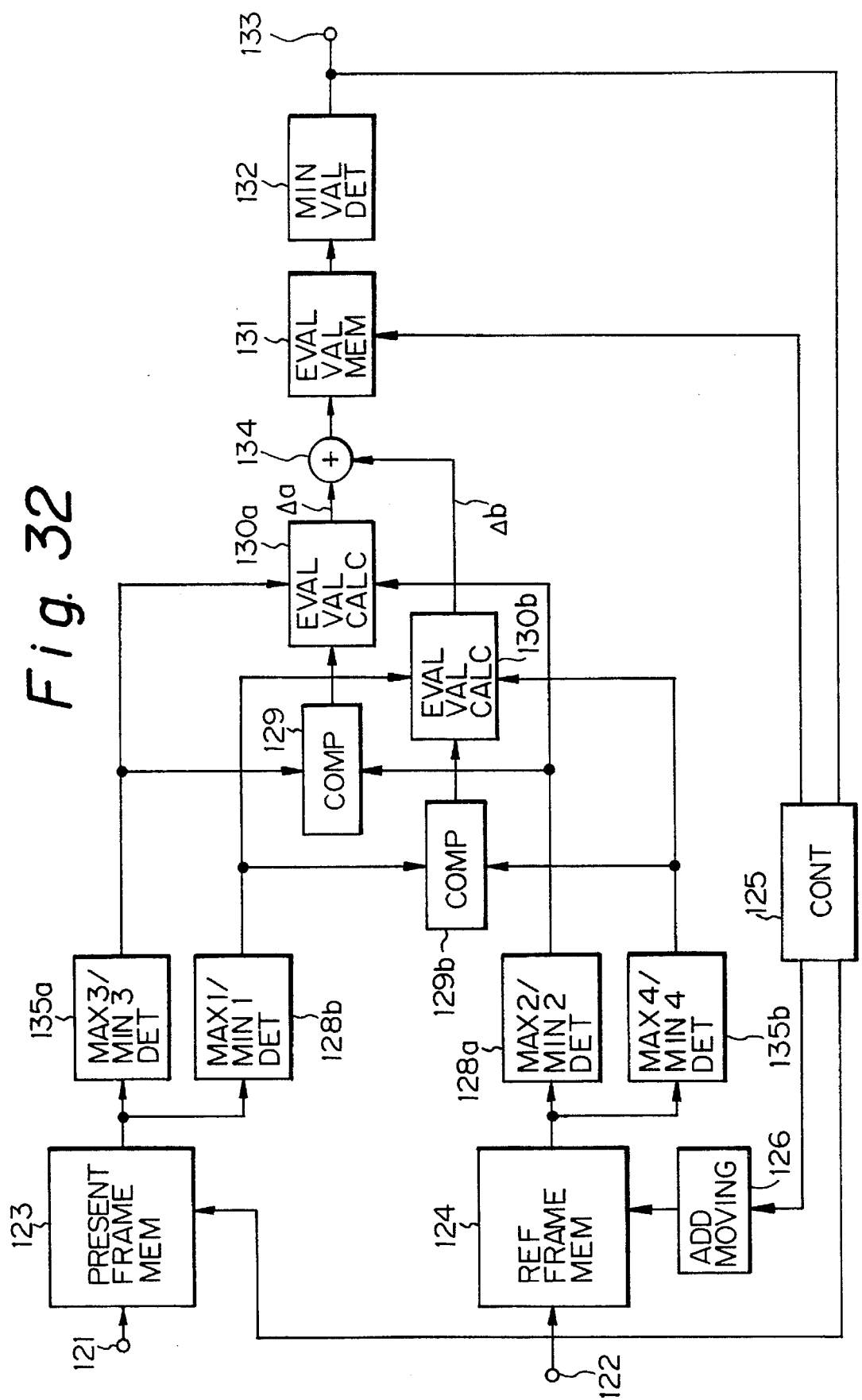
FIG. 32 is a block diagram showing the seventh embodiment of the present invention.

Next, another embodiments (seventh and eighth embodiments) of the present invention will be described. In the seventh and eighth embodiments that will be described in the following, when blocks are collated, areas thereof are compared. FIG. 32 is a schematic diagram showing the construction of blocks according to the seventh embodiment of the present invention. Referring to FIG. 32, a base block is composed of for example (2×4) pixels. As with the base block, a verification block is composed of (2×4) pixels. A modified verification block is composed by adding ±1 line and ±2 pixels as a phase compensation range to the verification block. When the forward collation is performed, the base block is collated with the modified verification block. When the backward collation is performed, as shown in FIG. 33, the verification block is collated with the modified base block.

Unlike with the fifth embodiment (see FIG. 29) and the sixth embodiment (see FIG. 31), which use the representative value extracting circuits 127a and 127b, according to the seventh embodiment, a MAX 3/MIN 3 detecting circuit 135a for pixel data of a base block and a MAX 4/MIN 4 detecting circuit 135b for pixel data of a verification block are provided. The MAX 2/MIN 2 detecting circuit 128a detects a maximum value MAX 2 and a minimum value MIN 2 as features amounts for each modified verification block. The MAX 1/MIN 1 detecting circuit 128b detects a maximum value MAX 1 and a minimum value MIN 1 as feature amounts for each modified base block.

Figure 34:
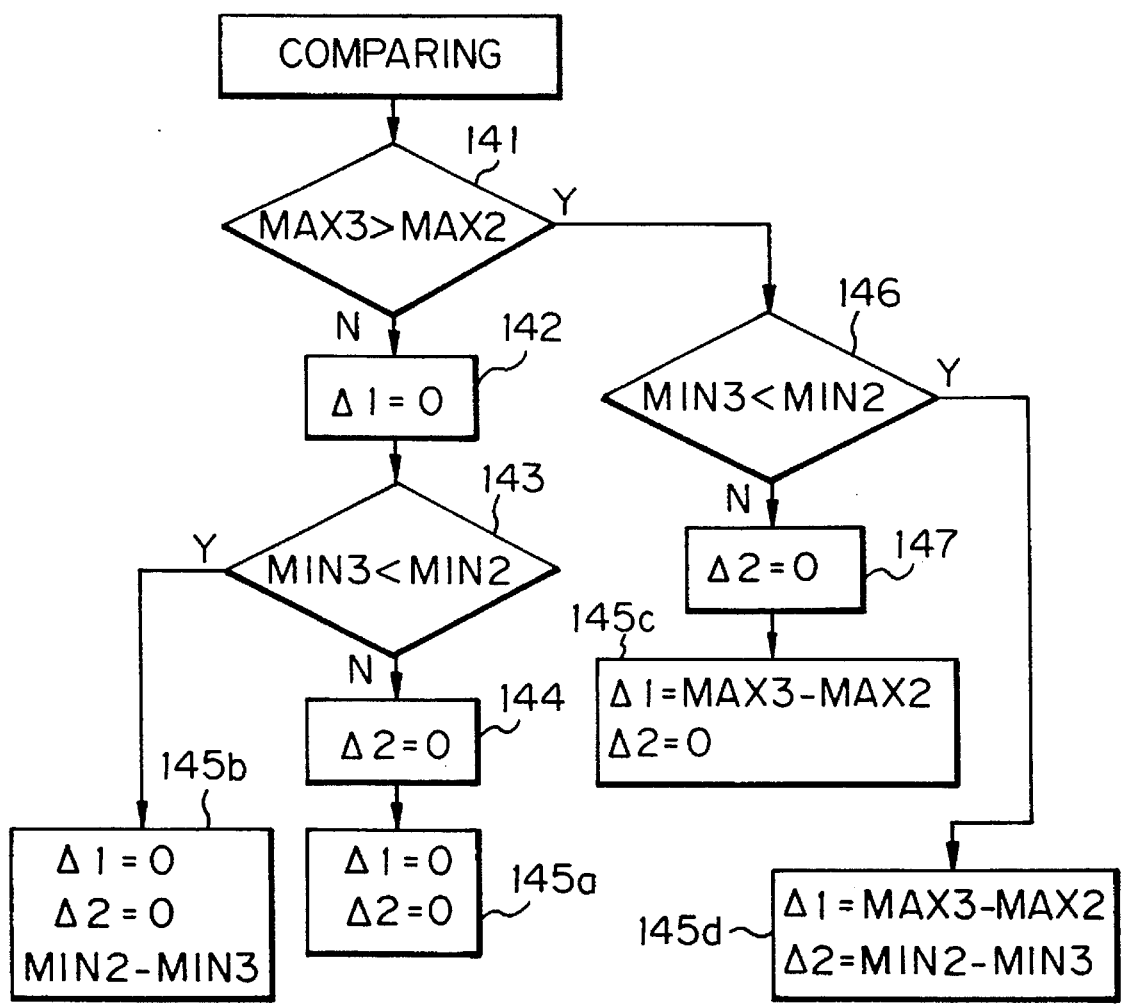
FIG. 34 is a flow chart for explaining the generation of an evaluated value according to the seventh embodiment of the present invention.

The MAX 3 and the MIN 3 detected by the MAX 3/MIN 3 detecting circuit 135a and the MAX 2 and the MIN 2 detected by the MAX 2/MIN 2 detecting circuit 128a are supplied to a comparing circuit 129a and an evaluated value calculating circuit 130a. Likewise, the MAX 1, the MIN 1 the MAX 4, and the MIN 4 are supplied to a comparing circuit 129b and an evaluated vale calculating circuit 130b. FIG. 34 is a flow chart showing software processes of the comparing circuit 129a and the evaluated value calculating circuit 130a.

When the comparing process is started, at step 141, it is determined whether or not MAX 3>MAX 2. When the determined result is (N) (namely, MAX 2≧MAX 3), the flow advances to step 142. At step 142, an evaluated value Δ1=0 is set. Thereafter, at step 143, it is determined whether or not MIN 3<MIN 2. When the determined result at step 143 is (N) (namely, MIN 3≧MIN 2), the flow advances to step 144. At step 144, an evaluated value Δ2=2 is set. Thus, the evaluated values Δ1=0 and Δ2=2 are generated at step 145a. This means that the minimum value MIN 3 and the maximum value MAX 3 of the base block are included in the range from the minimum value MIN 2 and the maximum value MAX 2 of the modified verification block and thereby it is determined that the base block has been collated with the verification block. When the determined result at step 143 is (Y), evaluated values Δ1=0 and Δ2=MIN 2−MIN 3 are generated at step 145b.

When the determined result at step 141 is (Y), the flow advances to step 146. At step 146, it is determined whether or not MIN 3<MIN 2. When the determined result at step 146 is (N) (namely, MIN 3≧MIN 2), Δ2=0 is set at step 147 and evaluated values Δ1=MAX 3−MAX 2 and Δ2=0 are generated at step 145c. When the determined result at 146 is (Y), evaluates values Δ1=MAX 3–MAX 2 and Δ2=MIN 2 MIN 3 are generated at step 145d.

Figure 35:
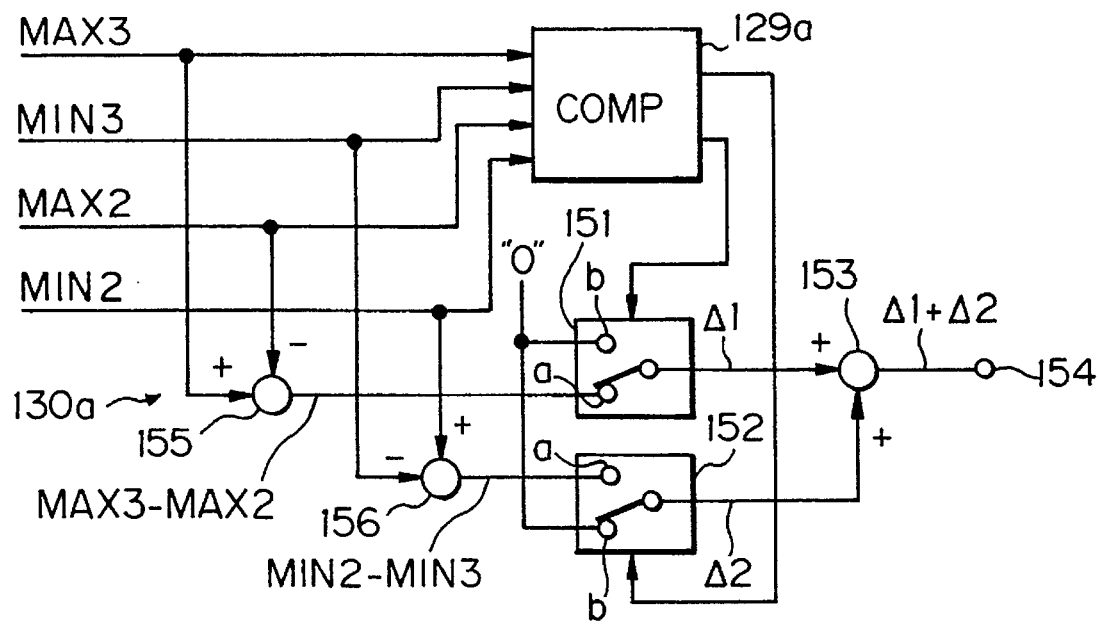
FIG. 35 is a block diagram showing a construction for generating an evaluated value according to the seventh embodiment of the present invention.

FIG. 35 is a block diagram showing a hardware construction of the comparing circuit 129a and the evaluated value calculating circuit 130a. The MAX 3 and the MIN 3 of the base block and the MAX 2 and the MIN 2 of the modified verification block are supplied to the comparing circuit 129a. The comparing circuit 129a generates two compared outputs. Selecting circuits 151 and 152 are controlled corresponding to the compared outputs. A subtracting circuit 155 supplies (MAX 3–MAX 2) to an input terminal a of the selecting circuit 151. Zero data is supplied to an input terminal of the selecting circuit 151. A subtracting circuit 156 supplies (MIN 2–MIN 3 ) to an input terminal a of the selecting circuit 152. Zero data is supplied to an input terminal b of the selecting circuit 152.

When MAX 3>MAX 2, one of the outputs (this output is referred to as the first output) of the comparing circuit 129 causes the selecting circuit 151 to select the input terminal a (namely, MAX 3–MAX 2). When MAX 3<MAX 2, the first output of the comparing circuit 129 causes the selecting circuit 151 to select the input terminal b (namely, zero data). When MIN 3<MIN 2, the other output (this output is referred to as the second output) of the comparing circuit 129 causes the selecting circuit 152 to select the input terminal a (namely, MIN 2–MIN 3 ). When MIN 3≧MIN 2, the second output of the comparing circuit 129 causes the selecting circuit 152 to select the input terminal b (namely, zero data). The evaluated value Δ1 of the selecting circuit 151 and the evaluated value Δ2 of the selecting circuit 153 are supplied to an adding circuit 153. An output of (Δ1+Δ2) of the adding circuit 153 is obtained from an output terminal 154.

Figure 36:
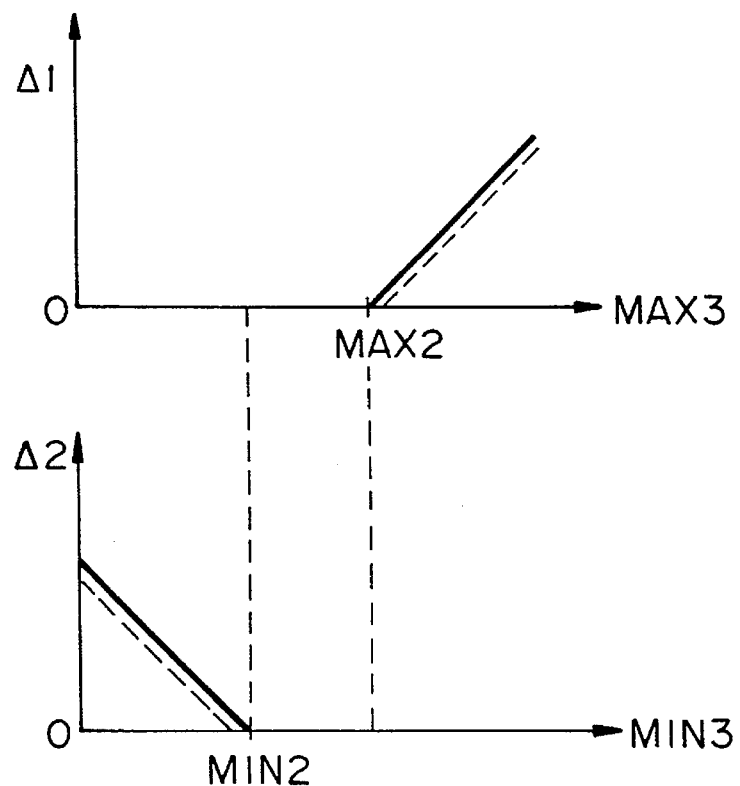
FIG. 36 is a schematic diagram for explaining the evaluated value according to the seventh embodiment of the present invention.

The evaluated values Δ1 and Δ2 vary as shown in FIG. 36. When MAX 3<MAX 2, the evaluated value Δ1 is 0. As MAX 3>MAX 2, the evaluated value Δ1 correspondingly increases. When MIN 3>MIN 2, the evaluated value Δ2 is 0. As MIN 3<MIN 2, the evaluated value Δ2 correspondingly increases. In reality, there is noise. A noise margin is set. Thus, evaluated values Δ1 and Δ2 that vary as denoted by dashed lines of FIG. 36 may be generated. The construction shown in FIG. 35 is an example of the present invention. Instead, a variety of constructions may be used. As evaluated values, absolute values of differences, the n-th power values thereof, and so forth may be used.

The constructions of the comparing circuit 129b and the evaluated value calculating circuit 130b are the same as those of the comparing circuit 129a and the evaluated value calculating circuit 130a, which are used for the forward collation. The evaluated value calculating circuit 130b generates evaluated values as results of the backward collation. An adding circuit 134 generates totally evaluated values. The totally evaluated values are stored in an evaluated value memory 131. The minimum value of the totally evaluated values is detected by a minimum value detecting circuit 132. A motion vector corresponding to the position of the minimum value of the totally evaluated values is obtained from an output terminal 133.

Figure 37:
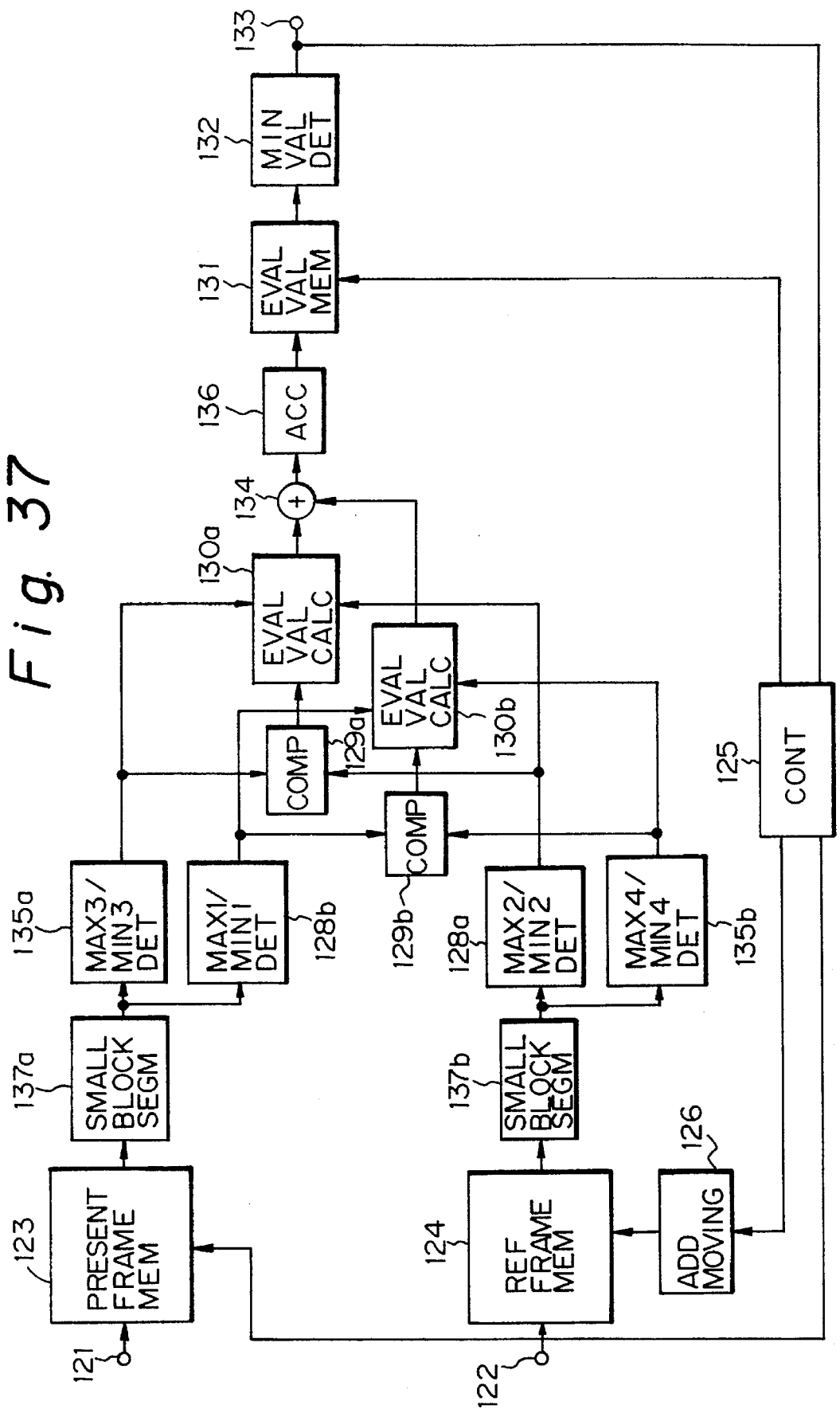
FIG. 37 is a schematic diagram showing the construction of blocks according to the eighth embodiment of the present invention.

Next, another embodiment (eighth embodiment) of the present invention will be described. FIG. 37 shows the construction of the fourth embodiment of the present invention. In FIG. 31, the same portions as the above-described embodiment (see FIG. 31) are denoted by the same reference numerals. In FIG. 37, the present frame memory 123 and the reference frame memory 124 are connected to a small block segmenting circuit 137a and 137b, respectively. In addition, a cumulating circuit 136 is connected to the adding circuit 134.

In the eighth embodiment, the area composed of (2×4) pixels that was treated as the base block in the sixth embodiment is treated as a small block. An area composed of (8×16) pixels, namely (4×4) small blocks are disposed in horizontal and vertical directions, is treated as a base block or a verification block. In the sixth embodiment, the area composed of (8×16) pixel was described as the search range. When the forward collation is performed, the MAX 3 and the MIN 3 of small blocks of the base block are compared with the MAX 2 and the MIN 2 of modified small blocks of the verification block. In the same manner as the first embodiment, evaluated values are calculated for each small block.

On the other hand, when the backward collation is performed, the MAX 4 and the MIN 4 of small blocks of the verification block are compared with the MAX 1 and the MIN 1 of modified small blocks of the verification block and evaluated values are calculated for each small block. The evaluated values for each small block in the forward and backward collations are added by the adding circuit 134. The added results are cumulated by the cumulating circuit 136. The cumulating circuit 136 generates a totally evaluated value for each block. In the construction that (4×4) small blocks are disposed in vertical and horizontal directions, evaluated values Δ1 to Δ16 are generated for each small block. By cumulating Δ1 to Δ16, a totally evaluated value is generated.

The verification block is moved in a predetermined search range. At each search pint, a totally evaluated value is obtained. The minimum value of the totally evaluated values is detected by the minimum value detecting circuit 132. A motion vector corresponding to the position of the verification block that generates the minimum value is obtained from an output terminal 133.

In the seventh and eighth embodiments of the present invention, areas of the base block and the verification block are collated. As amounts that represent the range of all pixels of the verification block, for example the maximum value MAX 2 and the minimum value MIN 2 are obtained. When the MAX 3 and the MIN 3 of the base block are not present in the range, it is determined that the base block has not been collated with the verification block. Conventionally, when the number of search points is decreased for simplifying the collating process, due to a phase deviation, an error is detected. However, according to the present invention, even if the number of search points is decreased for example every several pixels, as with the full search of the search points, the collation can be performed without a phase deviation. This is explained in FIG. 28.

According to the present invention, as well as simplification of search points, the number of calculations and the number of comparisons can be remarkably reduced. In addition, an error due to a phase deviation can be prevented. Moreover, according to the present invention, since forward and backward collations are performed and evaluated values are generated corresponding to the results of these collations, the detecting accuracy of images can be improved.

Figure 38:
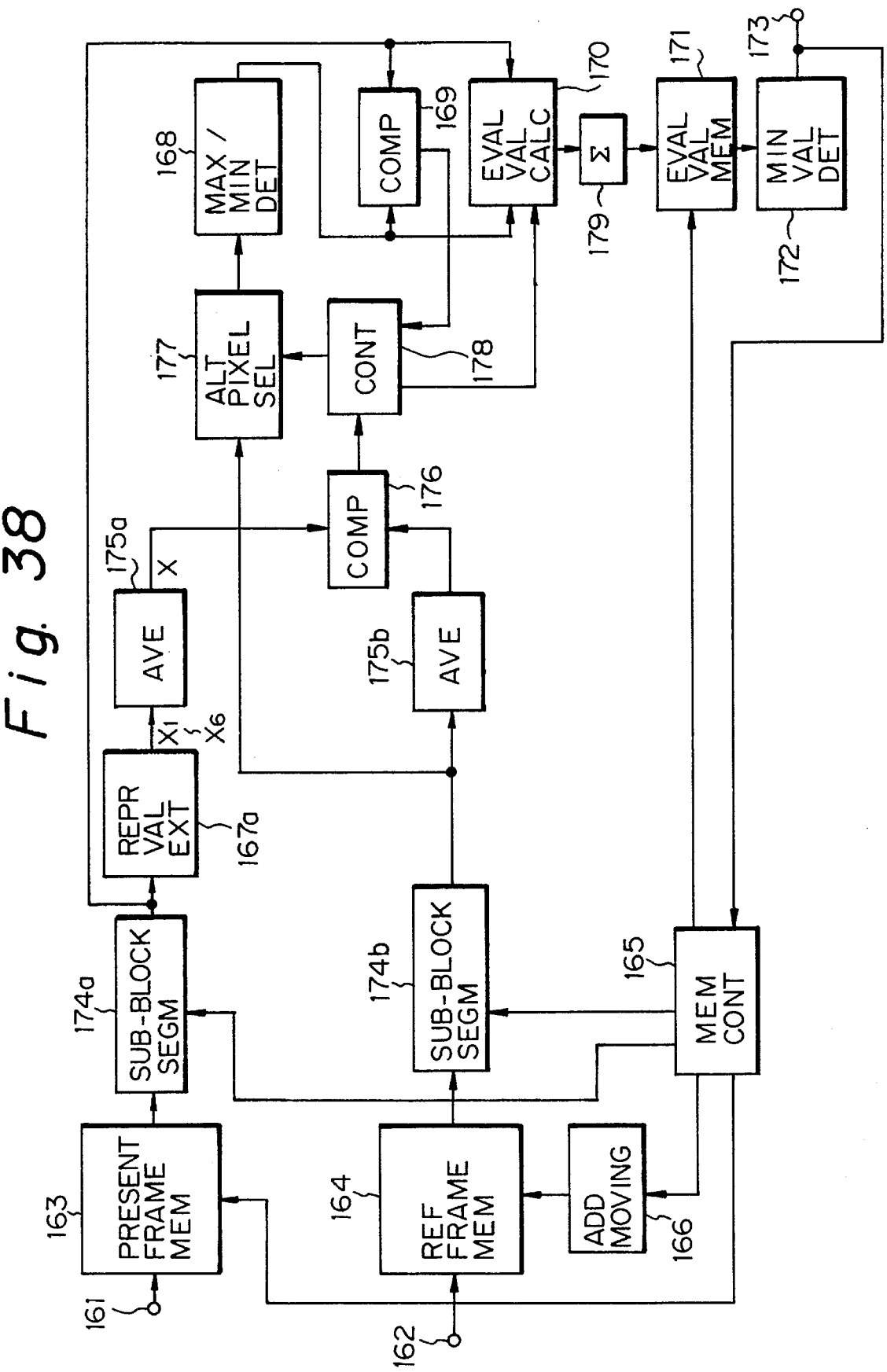
FIG. 38 is a block diagram showing the construction of the ninth embodiment of the present invention.

Next, with reference to the accompanying drawings, a motion vector detecting apparatus according to a ninth embodiment of the present invention will be described. FIG. 38 is a block diagram showing the embodiment. In FIG. 38, reference numeral 161 is an input terminal of image data of a present frame. Reference numeral 162 is an input terminal of image data of a reference frame. Reference numeral 163 is a present frame memory that stores image data of the present frame. Reference numeral 164 is a reference frame memory that stores image data of the reference frame. Reading operation and writing operation of the present frame memory 163 and the reference frame memory 4 are controlled by a controller 165. An address moving circuit 166 is provided in association with the reference frame memory 164. The address moving circuit 6 is controlled by the controller 165. Thus, the verification block is moved in the reference frame.

Sub-block segmenting circuits 174a and 174b are connected to the present frame memory 163 and the reference frame memory 164, respectively. The sub-block segmenting circuits 174a and 174b are controlled by the controller 165. The sub-block segmenting circuits 174a and 174b output base sub-block data and verification sub-block data, respectively. FIG. 39 is a schematic diagram for explaining a block construction according to the embodiment of the present invention. The base block is composed of (2×3) sub-blocks. Each of the sub-blocks is composed of (3×3) pixels. The block construction of the verification block is the same as the block construction of the base block.

The base sub-block data is supplied to a representative value extracting circuit 167a and an averaging circuit 175a. The representative value extracting circuit 167a extracts a representative value for each base sub-block. The representative value represents the value of a representative pixel. For example, as shown in FIG. 39, the representative values are values $x_1$ to $x_6$ of the pixels at the center positions of the base sub-blocks. Alternatively, values of pixels at other positions of the base sub-blocks, the maximum values thereof, the minimum values thereof, and the extreme values thereof may be used as the representative values. The averaging circuit 15a generates an average value X of a representative pixel group $x_1$ to $x_6$ (where $X=(x_1+x_2+x_3+x_4+x_5+x_6)/6$). The average value X is first representing data.

The verification sub-block data is supplied from the sub-block segmenting circuit 174b to an averaging circuit 175b and an alternative pixel selecting circuit 177. The averaging circuit 175b generates an average value of pixel data at positions corresponding to six verification sub-blocks. As shown in FIG. 39, pixels are denoted by a, b, c, ..., and i in the order from the upper left corner of the sub-block to the lower right corner thereof. The six sub-blocks are distinguished with suffix numerals 1, 2, 3, ..., and 6.

The averaging circuit 175b generates the following average values for the positions of the six pixels.

$$A = (a_1 + a_2 + a_3 + a_4 + a_5 + a_6) / 6$$
$$B = (b_1 + b_2 + b_3 + b_4 + b_5 + b_6) / 6$$
$$C = (c_1 + c_2 + c_3 + c_4 + c_5 + c_6) / 6$$
$$\ldots$$
$$\ldots$$
$$I = (i_1 + i_2 + i_3 + i_4 + i_5 + i_6) / 6$$

The average values A to I are second representing data.

The average values are supplied from the averaging circuits 175a and 175b to a comparing circuit 176. The comparing circuit 176 compares the average value X with the average values A to I. For example, the comparing circuit 16 calculates the absolute value of the difference between the average value X and each of the average values A to I (namely, |X-A|, |X-B|, |X-C|, ..., |X-I|) and compares the absolute value of each difference with a predetermined threshold value. A pixel group that results in an absolute value smaller than the threshold value is determined as alternative pixel data. For example |X-A|, |X-B|, |X-D|, |X-G|, |X-H| are smaller than the threshold value, $a_1, a_2, \ldots a_6, b_1, b_2, \ldots b_6, D_1, D_2, \ldots D_6, G_1, G_2, \ldots G_6, H_1, H_2, \ldots H_6$ are determined by the alternative pixel data and the controller 178. The compared result of the comparing circuit 176 is supplied to a controller 178. The controller 178 selectively outputs alternative pixel data of the each verification sub-blocks supplied from the sub-block segmenting circuit 174b.

The selection of the alternative pixel data is based on the rigid body assumption. In other words, it is assumed that when a base block is moved, all pixels thereof are moved in parallel (not rotated). Since the size of each block is small, such an assumption is practical. In other words, after one frame, the positions of representative pixel data $x_1$ to $x_6$ are one of $a_1$ to $a_6$, one of $b_1$ to $b_6$, ..., $i_1$ to $i_6$, respectively. Thus, if a base block with an average value largely differs from an average value x that represents a representative pixel data group, since the base block is in violation to such an assumption, before the collation is performed, the base block is removed. Thus, the accuracy of the collation can be improved. As the representing data, not only the average value, but the maximum value MAX, the minimum value MIN, the dynamic range DR (=MAX−MIN), the standard deviation, and so forth may be used.

The alternative pixel data in each verification sub-block which is selected by the alternative pixel selecting circuit 177 is supplied to a maximum value/minimum value (MAX/MIN) detecting circuit 168. The MAX/MIN detecting circuit 168 detects a maximum value MAX and a minimum value MIN as feature amounts of each verification sub block. As the feature amounts, two values out of the MAX, the MIN, and the dynamic range DR (=MAX−MIN) may be used. Alternatively, the feature amounts may be (Av+σ) and (Av−σ), where Av is the average value of the verification sub-block and σ is the standard deviation thereof.

The MAX/MIN detecting circuit 168 is realized in FIG. 12.

Software processes of the comparing circuit 169 and the evaluated value calculating circuit 170 is explained in the flowchart of FIG. 13.

FIG. 14 can be applied to the explanation for a hardware construction of a comparing circuit 169 and an evaluated value calculating circuit 170.

The characteristics of the evaluated value Δ is the same with FIG. 15A. When the representative value is smaller than the MIN or larger than the MAX, the evaluated value Δ correspondingly increases. In reality, since there is noise, a noise margin is set so as to generate an evaluated value Δ that varies as a dashed line shown in FIG. 15A.

Figure 40:
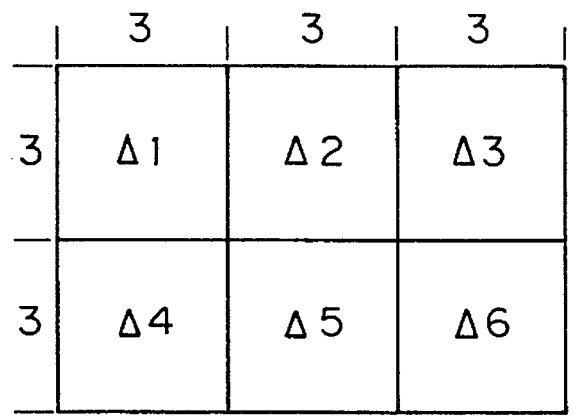
FIG. 40 is a schematic diagram for explaining the generation of a totally evaluated value.

The evaluated values are calculated for each of verification sub-blocks at a position corresponding to the representative pixel of each of base sub-blocks. Thus, as shown in FIG. 40, six evaluated values Δ1 to Δ6 corresponding to six sub-blocks are generated. The evaluated values Δ1 to Δ6 are cumulated by the cumulating circuit 179 (namely, Δ1+Δ2+Δ3+...+Δ6). The cumulated result (totally evaluated value) is stored in an evaluated value memory 171.

Returning to FIG. 38, the totally evaluated values are stored in the evaluated memory 171 under the control of the controller 165. The totally evaluated values are obtained in the predetermined search range. The minimum value of the totally evaluated values is detected by the minimum value detecting circuit 172. The position where the minimum value is present is a motion vector of the base block.

Figure 41:
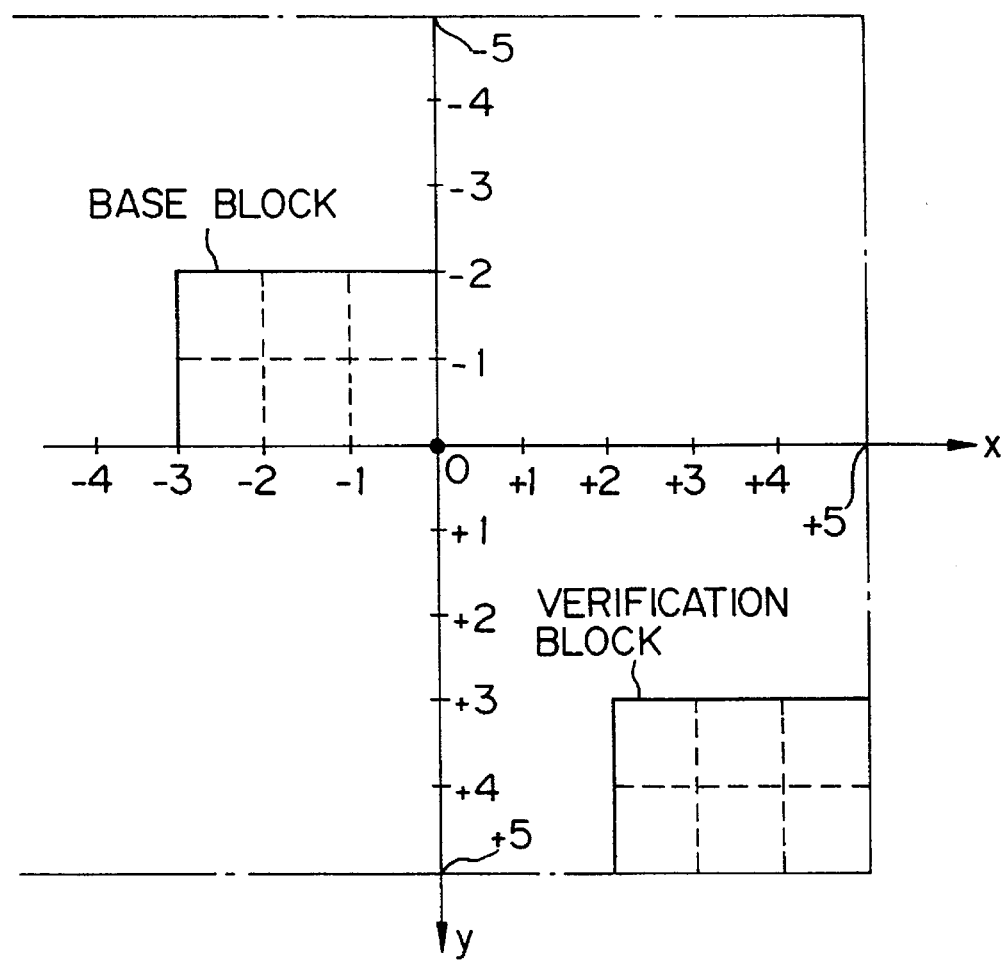
FIG. 41 is a schematic diagram showing part of a search range according to the ninth embodiment of the present invention.

FIG. 41 is a schematic diagram showing a part of a search range for ±5 pixels (denoted by dashed lines). Assuming that the lower right corner of the base block is a base point, coordinate axes (x, y) that are sectioned every three pixels are shown. The reference point is preferably disposed at a position as close to the center of the block as possible. When the verification block at the position (+5, +5) shown in FIG. 41 generates the minimum value of the cumulated evaluated values, a motion vector of (+15 (=5×3), 15 (=5×3)) is output.

In the embodiment, a representative pixel of a base sub-block is collated with a verification sub-block (area). As an amount that represents all alternative pixels of the verification sub-block, for example the maximum value MAX thereof and the minimum value MIN thereof are obtained. When the value of the representative pixel is not present in the range, the base sub-block is not collated with the verification sub-block. With the rigid body assumption, the accuracy of the collation can be improved. Conventionally, when the number of search points is decreased, due to a phase deviation, an error may be detected. However, when the number of search points is decreased to ⅓ (every three pixels), the same process as the full search operation can be performed. In other words, the collation can be performed without a phase deviation.

FIG. 19 explains that no phase deviation takes place in the construction according to the present invention.

Figure 42:
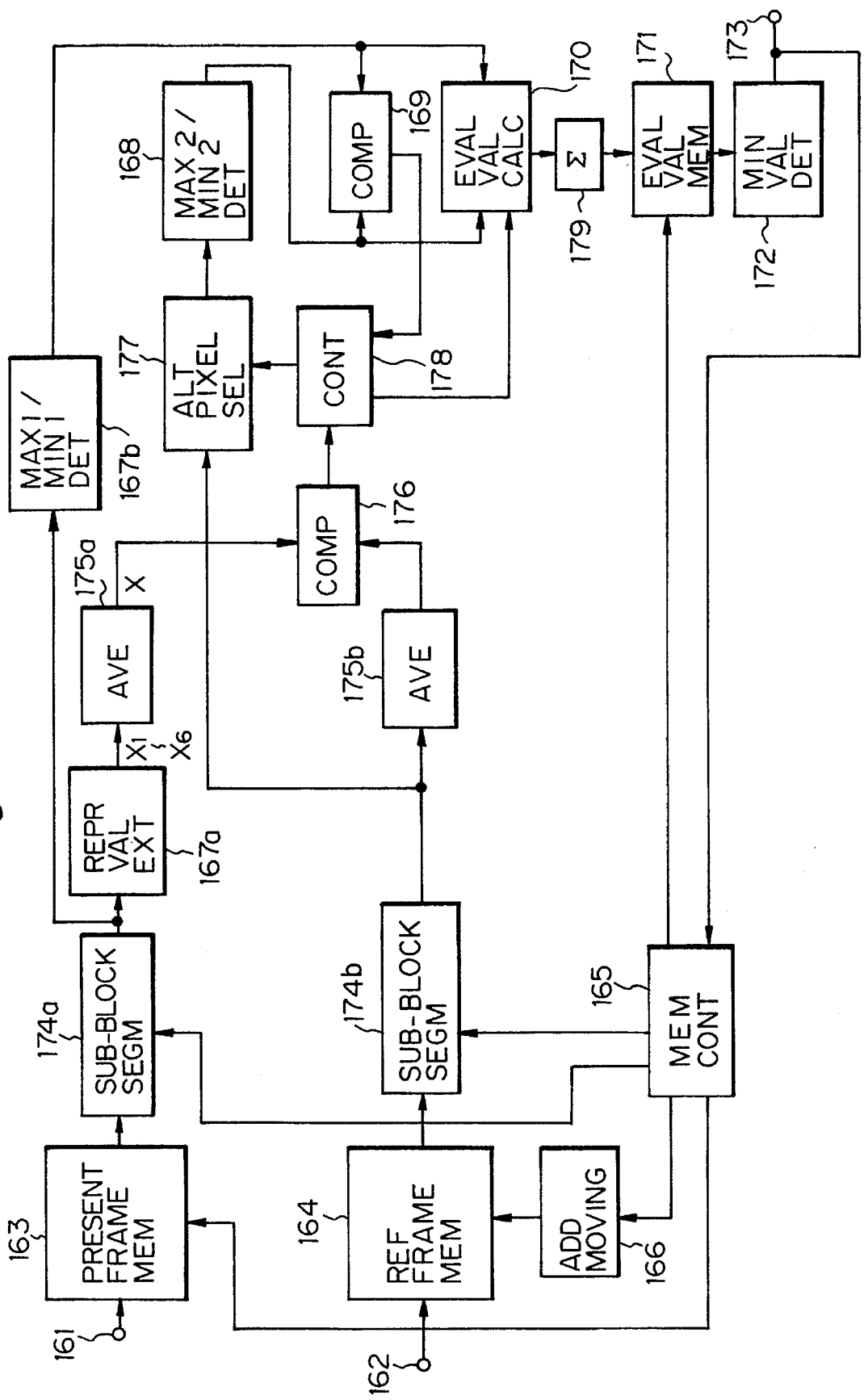
FIG. 42 is a block diagram of the tenth embodiment of the present invention.

Next, a tenth embodiment of the present invention will be described. In the tenth embodiment, when sub-blocks are collated, areas thereof are compared. An alternative pixel of a verification sub-block is selected in the same manner as the ninth embodiment. FIG. 42 shows the construction of the tenth embodiment. Referring to FIG. 42, a representative value extracting circuit 167a, averaging circuits 175a and 175b, a comparing circuit 176, and an alternative pixel selecting circuit 177 are the same as those of the ninth embodiment.

FIG. 21 can be applied to the explanation of the tenth embodiment.

A sub-block segmenting circuit 174a supplies pixel data of a base sub-block to a maximum value/minimum value (MAX 1/MIN 1) detecting circuit 167b. The MAX 1/MIN 1 detecting circuit 167b detects a maximum value MAX 1 and a minimum value MIN 1 as first feature amounts for each base sub-block. As the first feature amounts, two out of the MAX 1, the MIN 1 and the dynamic range DR 1 (=MAX 1−MIN 1) can be used. In addition, as the first feature amounts, Av1 +Δ1 and Av1−Δ1 may be used, where Av1 is an average vale of the base block and σ1 is a standard deviation thereof.

A sub-block segmenting circuit 174b supplies modified verification sub-block data to an alternative pixel selecting circuit 177. The selected pixel data is supplied to a maximum value/minimum value (MAX 2/MIN 2) detecting circuit 168. The MAX 2/MIN 2 detecting circuit 168 detects a maximum value MAX 2 and a minimum value MIN 2 as second feature amounts. As the second feature amounts, two out of the MAX 2, the MIN 2, and the dynamic range DR 2 (=MAX 2−MIN 2) can be used. In addition, as the second feature amounts, Av+Δ and Av−Δ may be used, where Av2 is an average value of the verification block and σ2 is a standard deviation thereof.

The constructions of the MAX/MIN detecting circuits 167b and 168 are the same as those shown in FIG. 12. The MAX 1, the MIN 1 the MAX 2, and the MIN 2 detected by the MAX/MIN detecting circuits 167b and 168 are supplied to a comparing circuit 169 and an evaluated value calculating circuit 170. Software processes of the comparing circuit 169 and the evaluated value calculating circuit 170 can be explained in FIG. 22.

A hardware construction of the comparing circuit 169 and the evaluated value calculating circuit 170 is shown in FIG. 23.

The evaluated values Δ1 and Δ2 vary as shown in FIG. 24.

In the tenth embodiment of the present invention, areas of the base sub-block and the verification sub-block are collated. As amounts that represent the range of selected pixels of the modified verification sub-block, for example the maximum value MAX 2 and the minimum value MIN 2 are obtained. When the MAX 1 and the MIN 1 of the base sub-block are not present in the range, it is determined that the base sub-block has not been collated with the verification sub-block. When alternative pixels are selected corresponding to the rigid body assumption, the accuracy of the detection can be improved. Conventionally, when the number of search points is decreased for simplifying the collating process, due to a phase deviation, an error is detected. However, according to the present invention, even if the number of search points is decreased for example every several pixels, as with the full search of the search points, the collation can be performed without a phase deviation.

FIG. 28 explains that the collation of such areas does not cause a phase deviation.

According to the present invention, as well as simplification of search points, the number of calculations and the number of comparisons can be remarkably reduced. In addition, an error due to a phase deviation can be prevented. Moreover, according to the present invention, since alternative pixels are selected for a pre-process of the collation based on the rigid body assumption, the detecting accuracy of images can be improved.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An image collating method, comprising the steps of:

segmenting first image data into a plurality of base blocks;

segmenting second pixel data into a plurality of verification blocks;

extracting representative pixel data from each of the base blocks;

extracting feature amount data from each of the verification blocks that contains pixel data corresponding to the representative pixel data, the feature amount data representing a feature amount of the verification block; and comparing the representative pixel data with the feature amount data and partially collating the base block with the verification block.

2. An image collating apparatus, comprising:

means for segmenting first image data into a plurality of base blocks;

means for segmenting second pixel data into a plurality of verification blocks;

means for extracting representative pixel data from each of the base blocks;

means for extracting feature amount data from each of the verification blocks that contains pixel data corresponding to the representative pixel data, the feature amount data representing a feature amount of the verification block; and means for comparing the representative pixel data with the feature amount data and partially collating the base block with the verification block.

3. A motion vector detecting method, comprising the steps of:

segmenting first image data into a plurality of base blocks;

segmenting second pixel data into a plurality of verification blocks;

extracting representative pixel data from each of the base blocks;

extracting feature amount data from each of the verification blocks that contains pixel data corresponding to the representative pixel data, the feature amount data representing a feature amount of the verification block;

comparing the representative pixel data with the feature amount data and generating an evaluated value that represents a matching degree of the base block and the verification block corresponding to the compared result; and detecting a motion vector corresponding to the position of the verification block that most accords with the base block based on the evaluated value that is generated by moving the verification block in a predetermined search range.

4. A motion vector detecting apparatus, comprising:

means for segmenting first image data into a plurality of base blocks;

means for segmenting second pixel data into a plurality of verification blocks;

means for extracting representative pixel data from each of the base blocks;

means for extracting feature amount data from each of the verification blocks that contains pixel data corresponding to the representative pixel data, the feature amount data representing a feature amount of the verification block;

means for comparing the representative pixel data with the feature amount data and generating an evaluated value that represents a matching degree of the base block and the verification block corresponding to the compared result; and means for detecting a motion vector corresponding to the position of the verification block that most accords with the base block based on the evaluated value that is generated by moving the verification block in a predetermined search range.

5. The method or the apparatus as set forth in claim 1, 2, 3, or 4, wherein the representative pixel data is pixel data nearly at the center position of the base block.

6. The method or the apparatus as set forth in claim 1, 2, 3, or 4, wherein the feature amount data is two out of the maximum value, the small value, and the dynamic range of a plurality of pixels of the verification block.

7. The method or the apparatus as set forth in claim 1, 2, 3, or 4, wherein the feature amount data is the average value and the standard deviation of a plurality of pixels of the verification block.

8. The method or the apparatus as set forth in claim 1, 2, 3, or 4, wherein the feature amount data is two out of the maximum value, the small value, and the dynamic range of a plurality of pixels of the verification block, and wherein said evaluated value generating step or means is adapted for outputting nearly 0 as an evaluated value when the value of the representative pixel data is included in the range from the maximum value to the minimum value and for outputting the difference between the representative pixel data and the maximum value and the difference between the representative pixel data and the minimum value as evaluated values when the value of the representative pixel data is not included in the range from the maximum value to the minimum value.

9. The method or the apparatus as set forth in claim 1, 2, 3, or 4, wherein the feature amount data is the average value and the standard deviation of a plurality of pixels of the verification block, and wherein said evaluated value generating step or means is adapted for outputting nearly 0 as an evaluated value when the representative pixel data is included in the range between the sum value and the difference value of the average value and the standard deviation and for outputting the difference between the representative pixel data and the sum value and the difference between the representative pixel data and the difference value as evaluated values when the representative pixel data is not included in the range between the sum value and the difference value of the average value and the standard deviation.

10. The method or the apparatus as set forth in claim 1, 2, 3, or 4, wherein the base block and the verification block are composed of a plurality of small blocks, the representative pixel data and the feature amount being extracted for each of the small blocks, the evaluated value being generated for each of the small blocks, the evaluated value being cumulated, the base block and the verification block being partially collated corresponding to the cumulated value.

11. An image collating method, comprising the steps of:

segmenting first image data into a plurality of base blocks;

segmenting second image data into a plurality of verification blocks and generating a modified verification block containing pixels in the vicinity of each of the verification blocks necessary for a phase compensation;

extracting first feature amount data from each of the base blocks, the first feature amount data representing the feature amount data of all pixels thereof;

extracting second feature amount data from the modified verification block, the second feature amount data representing the feature amount data of all pixels of the modified verification block; and comparing the first feature amount data with the second feature amount data and to partially collating the base block with the verification block.

12. An image collating apparatus, comprising:

means for segmenting first image data into a plurality of base blocks;

means for segmenting second image data into a plurality of verification blocks and generating a modified verification block containing pixels in the vicinity of each of the verification blocks necessary for a phase compensation;

means for extracting first feature amount data from each of the base blocks, the first feature amount data representing the feature amount of all pixels thereof;

means for extracting second feature amount data from the modified verification block, the second feature amount data representing the feature amount of all pixels of the modified verification block; and means for comparing the first feature amount data with the second feature amount data and to partially collating the base block with the verification block.

13. A motion vector detecting method, comprising the steps of:

segmenting first image data into a plurality of base blocks;

segmenting second image data into a plurality of verification blocks and generating a modified verification block containing pixels in the vicinity of each of the verification blocks necessary for a phase compensation;

extracting first feature amount data from each of the base blocks, the first feature amount data representing the feature amount of all pixels thereof;

extracting second feature amount data from the modified verification block, the second feature amount data representing the feature amount of all pixels of the modified verification block;

comparing the first feature amount data with the second feature amount data and generating an evaluated value representing a matching degree of the base block and the verification block corresponding to the compared result; and detecting a motion vector corresponding to the position of the verification block that most accords with the base block based on the evaluated value, the evaluated value being generated by moving the verification block in a predetermined search range.

14. A motion vector detecting apparatus, comprising:

means for segmenting first image data into a plurality of base blocks;

means for segmenting second image data into a plurality of verification blocks and a generating modified verification block containing pixels in the vicinity of each of the verification blocks necessary for a phase compensation;

means for extracting first feature amount data from each of the base blocks, the first feature amount data representing the feature amount of all pixels thereof;

means for extracting second feature amount data from the modified verification block, the second feature amount representing the feature amount of all pixels of the modified verification block;

means for comparing the first feature amount data with the second feature amount data and generating an evaluated value representing a matching degree of the base block and the verification block corresponding to the compared result; and means for detecting a motion vector corresponding to the position of the verification block that most accords with the base block based on the evaluated value, the evaluated value being generated by moving the verification block in a predetermined search range.

15. The method or the apparatus as set forth in claim 11, 12, 13, or 14, wherein the first feature amount data and the second feature amount data are two out of the maximum value, the minimum value, and the dynamic range of a plurality of pixels of the base block and the modified verification block.

16. The method or the apparatus as set forth in claim 11, 12, 13, or 14, wherein the first feature amount data and the second feature amount data are the average value and the standard deviation of a plurality of pixels of the base block and the modified verification block.

17. The method or the apparatus as set forth in claim 11, 12, 13, or 14, wherein the first feature amount data and the second feature amount data are two out of the maximum value, the minimum value, and the dynamic range of a plurality of pixels of the base block and the modified verification block, and wherein said evaluated value generating step or means is adapted for outputting nearly 0 as an evaluated value when the maximum value and the minimum value of the first feature amount data are included in the range from the maximum value to the minimum value of the second feature amount data and for outputting the difference between the difference between the maximum values of the first feature amount data and the second feature amount data and the difference between the minimum values thereof as the evaluated values when the maximum value and the minimum value of the first feature amount data are not included in the range from the maximum value to the minimum value of the second feature amount data.

18. The method or the apparatus as set forth in claim 11, 12, 13, or 14, wherein the first feature amount data and the second feature amount data are the average value and the standard deviation of a plurality of pixels of the base block and the modified verification block, and wherein said evaluated value generating step or means is adapted for generating the sum and the difference of the average value and the standard deviation, for outputting nearly 0 as an evaluated value when the sum and the difference of the average value and the standard deviation of the first feature amount data are included in the range between the sum and the difference of the average value and the standard deviation of the second feature amount data, and for outputting the difference between the sums of the average values and the standard deviations of the first feature amount data and the second feature amount data and the differences thereof as evaluated values when the sum and the difference of the average value and the standard deviation of the first feature amount data are not included in the range between the sum and the difference of the average value and the standard deviation of the second feature amount data.

19. The method or the apparatus as set forth in claim 11, 12, 13, or 14, wherein the base block and the verification block are composed of a plurality of small blocks, the first feature amount and the second feature amount being extracted for each of the small blocks, the evaluated value being generated for each of the small blocks, the generated evaluated values being cumulated, the base block and the verification block being partially collated corresponding to the cumulated value.

20. An image collating method, comprising the steps of:

segmenting first image data into a plurality of base blocks;

segmenting second image data into a plurality of verification blocks;

extracting first representative pixel data from each of the base blocks;

extracting first feature amount data from each of the verification blocks containing pixel data corresponding to the first representative data, the first feature amount representing a feature amount of the verification block;

comparing the first representative pixel data with the first feature amount data so as to generate a first evaluated value corresponding to the base block;

extracting second representative pixel data from the verification block;

extracting second feature amount data from the base block containing pixel data corresponding to the second representative data, the second feature amount representing a feature amount of the base block;

comparing the second representative pixel data with the second feature amount data so as to generate a second evaluated value corresponding to the verification block; and generating a totally evaluated value corresponding to the first evaluated value and the second evaluated value and partially collating the first image data with the second image data corresponding to the totally evaluated value.

21. An image collating apparatus, comprising:

means for segmenting first image data into a plurality of base blocks;

means for segmenting second image data into a plurality of verification blocks;

means for extracting first representative pixel data from each of the base blocks;

means for extracting first feature amount data from each of the verification blocks containing pixel data corresponding to the first representative data, the first feature amount representing a feature amount of the verification block;

means for comparing the first representative pixel data with the first feature amount data so as to generate a first evaluated value corresponding to the base block;

means for extracting second representative pixel data from the verification block;

means for extracting second feature amount data from the base block containing pixel data corresponding to the second representative data, the second feature amount representing a feature amount of the base block;

means for comparing the second representative pixel data with the second feature amount data so as to generate a second evaluated value corresponding to the verification block; and means for generating a totally evaluated value corresponding to the first evaluated value and the second evaluated value and partially collating the first image data with the second image data corresponding to the totally evaluated value.

22. An image collating method, comprising the steps of:

segmenting first image data into a plurality of base blocks;

segmenting second image data into a plurality of verification blocks and generating a modified verification block containing pixels in the vicinity of the verification block necessary for a phase compensation;

extracting first feature amount data from the base block, the first feature amount data representing the range of all pixels thereof;

extracting second feature amount data from the modified verification block, the second feature amount representing the range of all pixels thereof;

comparing the first feature among data with the second feature amount data so as to generate a first evaluated value corresponding to the base block;

generating a modified base block containing pixels in the vicinity of the base block necessary for a phase compensation;

extracting third feature amount data from the verification block, the third feature amount data representing the range of all pixels thereof;

extracting fourth feature amount data from the modified base block, the fourth feature amount data representing the range of all pixels thereof;

comparing the third feature amount data with the fourth feature amount data so as to generate a second evaluated value corresponding to the verification block; and generating a totally evaluated value corresponding to the first evaluated value and the second evaluated value and partially collating the first image data with the second image data corresponding to the totally evaluated value.

23. An image collating apparatus, comprising:

means for segmenting first image data into a plurality of base blocks;

means for segmenting second image data into a plurality of verification blocks and generating a modified verification block containing pixels in the vicinity of the verification block necessary for a phase compensation;

means for extracting first feature amount data from the base block, the first feature amount data representing the range of all pixels thereof;

means for extracting second feature amount data from the modified verification block, the second feature amount representing the range of all pixels thereof;

means for comparing the first feature among data with the second feature amount data so as to generate a first evaluated value corresponding to the base block;

means for generating a modified base block containing pixels in the vicinity of the base blocks necessary for a phase compensation;

means for extracting third feature amount data from the verification block, the third feature amount data representing the range of all pixels thereof;

means for extracting fourth feature amount data from the modified base block, the fourth feature amount data representing the range of all pixels thereof;

means for comparing the third feature amount data with the fourth feature amount data so as to generate a second evaluated value corresponding to the verification block; and means for generating a totally evaluated value corresponding to the first evaluated value and the second evaluated value and partially collating the first image data with the second image data corresponding to the totally evaluated value.

24. An image collating method for compensating a phase difference that takes place due to simplification in partially collating first image data with second image data, comprising the steps of:

generating a first evaluated value corresponding to a base block, the first evaluated value representing a collating degree of the base block and a verification block;

generating a second evaluated value corresponding to the verification block, the second evaluated value representing a collating degree of the verification block and the base block; and generating a totally evaluated value corresponding to the first evaluated value and the second evaluated value and partially collating the first image data with the second image data corresponding to the totally evaluated value.

25. An image collating apparatus for compensating a phase difference that takes place due to simplification in partially collating first image data with second image data, comprising:

means for generating a first evaluated value corresponding to a base block, the first evaluated value representing a collating degree of the base block and a verification block;

means for generating a second evaluated value corresponding to the verification block, the second evaluated value representing a collating degree of the verification block and the base block; and means for generating a totally evaluated value corresponding to the first evaluated value and the second evaluated value and partially collating the first image data with the second image data corresponding to the totally evaluated value.

26. A motion vector detecting method, comprising the steps of:

segmenting first image data into a plurality of base blocks;

segmenting second image data into a plurality of verification blocks;

extracting first representative pixel data from each of the base blocks;

extracting first feature amount data from each of the verification blocks containing pixel data corresponding to the first representative data, the first feature amount representing a feature amount of the verification block;

comparing the first representative pixel data with the first feature amount data so as to generate a first evaluated value corresponding to the base block;

extracting second representative pixel data from the verification block;

extracting second feature amount data from the base block containing pixel data corresponding to the second representative data, the second feature amount representing a feature amount of the base block;

comparing the second representative pixel data with the second feature amount data so as to generate a second evaluated value corresponding to the verification block; and generating a totally evaluated value corresponding to the first evaluated value and the second evaluated value and detecting a motion vector corresponding to the position of the verification block that most accords with the base block based on the totally evaluated value that is generated by moving the verification block in a predetermined search range.

27. A motion vector detecting apparatus, comprising:

means for segmenting first image data into a plurality of base blocks;

means for segmenting second image data into a plurality of verification blocks;

means for extracting first representative pixel data from each of the base blocks;

means for extracting first feature amount data from each of the verification blocks containing pixel data corresponding to the first representative data, the first feature amount representing a feature amount of the verification block;

means for comparing the first representative pixel data with the first feature amount data so as to generate a first evaluated value corresponding to the base block;

means for extracting second representative pixel data from the verification block;

means for extracting second feature amount data from the base block containing pixel data corresponding to the second representative data, the second feature amount representing a feature amount of the base block;

means for comparing the second representative pixel data with the second feature amount data so as to generate a second evaluated value corresponding to the verification block; and means for generating a totally evaluated value corresponding to the first evaluated value and the second evaluated value and detecting a motion vector corresponding to the position of the verification block that most accords with the base block based on the totally evaluated value that is generated by moving the verification block in a predetermined search range.

28. A motion vector detecting method, comprising the steps of:

segmenting first image data into a plurality of base blocks;

segmenting second image data into a plurality of verification blocks and generating a modified verification block containing pixels in the vicinity of each of the verification blocks necessary for a phase compensation;

extracting first feature amount data from the base block, the first feature amount data representing the range of all pixels thereof;

extracting second feature amount data from the modified verification block, the second feature amount representing the range of all pixels thereof;

comparing the first feature among data with the second feature amount data so as to generate a first evaluated value corresponding to the base block;

generating a modified base block containing pixels in the vicinity of the base block necessary for a phase compensation;

extracting third feature amount data from the verification block, the third feature amount data representing the range of all pixels thereof;

extracting fourth feature amount data from the modified base block, the fourth feature amount data representing the range of all pixels thereof;

comparing the third feature amount data with the fourth feature amount data so as to generate a second evaluated value corresponding to the verification block; and generating a totally evaluated value corresponding to the first evaluated value and the second evaluated value and detecting a motion vector corresponding to the position of the verification block that most accords with the base block based on the totally evaluated value.

29. A motion vector detecting apparatus, comprising:

means for segmenting first image data into a plurality of base blocks;

means for segmenting second image data into a plurality of verification blocks and generating a modified verification block containing pixels in the vicinity of each of the verification blocks necessary for a phase compensation;

means for extracting first feature amount data from each of the base blocks, the first feature amount data representing the range of all pixels thereof;

means for extracting second feature amount data from the modified verification block, the second feature amount representing the range of all pixels thereof;

means for comparing the first feature among data with the second feature amount data so as to generate a first evaluated value corresponding to the base block;

means for generating a modified base block containing pixels in the vicinity of the base block necessary for a phase compensation;

means for extracting third feature amount data from the verification block, the third feature amount data representing the range of all pixels thereof;

means for extracting fourth feature amount data from the modified base block, the fourth feature amount data representing the range of all pixels thereof;

means for comparing the third feature amount data with the fourth feature amount data so as to generate a second evaluated value corresponding to the verification block; and means for generating a totally evaluated value corresponding to the first evaluated value and the second evaluated value and detecting a motion vector corresponding to the position of the verification block that most accords with the base block based on the totally evaluated value.

30. The method or the apparatus as set forth in claim 20, 21, 26, or 27, wherein the first representative pixel data and the second representative pixel data are pixel data nearly at the center position of the block.

31. The method or the apparatus as set forth in claim 20, 21, 26, or 27, wherein the first feature amount data and the second feature amount data are two out of the maximum value, the minimum value, and the dynamic range of a plurality of pixels of the block.

32. The method or the apparatus as set forth in claim 20, 21, 26, or 27, wherein the first feature amount data and the second feature amount data are the average value and the standard deviation of a plurality of pixels of the block.

33. The method or the apparatus as set forth in claim 20, 21, 26, or 27, wherein the first feature amount data and the second feature amount data are two out of the maximum value, the minimum value, and the dynamic range of a plurality of pixels of the block, and wherein said evaluated value generating step or means is adapted for outputting nearly 0 as the first evaluated value and the second evaluated value when the values of the first representative pixel data and the second representative pixel data are included in the range from the maximum value to the minimum value and for outputting the difference between the first representative pixel data and the minimum value and the difference between the second representative pixel data and the minimum data as the first evaluation value and the second evaluation data, respectively, when the values of the first representative pixel data and the second representative pixel data are not included in the range from the maximum value to the minimum value.

34. The method or the apparatus as set forth in claim 20, 21, 26, or 27, wherein the first feature amount data and the second feature amount data are the average value and the standard deviation of a plurality of pixels of the block, and wherein said first evaluated value generating means or step and said second evaluated value generating means or step are adapted for outputting nearly 0 when the first representative pixel data and the second representative pixel data are included in the range between the sum and the difference of the average value and the standard deviation and for outputting the difference between the sum and the difference of the first representative pixel data and the second representative pixel data as evaluated values when the first representative pixel data and the second representative pixel data are not included in the range between the sum and the difference of the average value and the standard deviation.

35. The method or the apparatus as set forth in claim 20, 21 26, or 27, wherein the base block and the verification block are composed of a plurality of small blocks, the first representative pixel data, the second representative pixel data, the first feature amount, and the second feature amount being extracted for each of the small blocks, and wherein the first evaluated value and the second evaluated value are generated for each of the small blocks, the first evaluated value and the second evaluated values being cumulated as a first cumulative value and a second cumulative value, respectively, the base block and the verification block being partially collated corresponding to the first cumulative value and the second cumulative value.

36. The method or the apparatus as set forth in claim 22, 23, 28, or 29, wherein the first feature amount data, the second feature amount data, the third feature amount data, and the fourth feature amount data are two out of the maximum value, the minimum value, and the dynamic range of a plurality of pixels of the block.

37. The method or the apparatus as set forth in claim 22, 23, 28, or 29, wherein the first feature amount data, the second feature amount data, the third feature amount data, and the fourth feature amount data are the average value and the standard deviation of a plurality of pixels of the block.

38. The method or the apparatus as set forth in claim 22, 23, 28, or 29, wherein the first feature amount data, the second feature amount data, the third feature amount data, and the fourth feature amount data are two out of the maximum value, the minimum value, and the dynamic range of a plurality of pixels of the block, wherein said first evaluated value generating step or means is adapted for outputting nearly 0 as the first evaluated value when the maximum value and the minimum value of the first feature amount data are included in the range from the maximum value to the minimum value of the second feature amount data and for outputting the difference between the difference between the maximum values of the first feature amount data and the second feature amount data and the difference between the minimum values thereof as the first evaluated value when the maximum value and the minimum value of the first feature amount data are not included in the range from the maximum value to the minimum value of the second feature amount data, and wherein said second evaluated value generating step or means is adapted for outputting nearly 0 as the second evaluated value when the maximum value and the minimum value of the third feature amount data are included in the range from the maximum value to the minimum value of the fourth feature amount data and for outputting the difference between the difference between the maximum values of the third feature amount data and the fourth feature amount data and the difference between the minimum values thereof as the second evaluated value when the maximum value and the minimum value of the third feature amount data are not included in the range from the maximum value to the minimum value of the fourth feature amount data.

39. The method or the apparatus as set forth in claim 22, 23, 28, or 29, wherein the first feature amount data, the second feature amount data, the third feature amount data, and the fourth feature amount data are the average value and the standard deviation of a plurality of pixels of the base block and the modified verification block, wherein said first evaluated value generating step or means is adapted for generating the sum and the difference of the average value and the standard deviation, for outputting nearly 0 as the first evaluated value when the sum and the difference of the average value and the standard deviation of the first feature amount data are included in the range between the sum and the difference of the average value and the standard deviation of the second feature amount data, and for outputting the difference between the sums of the average values and the standard deviations of the first feature amount data and the second feature amount data and the differences thereof as the first evaluated value when the sum and the difference of the average value and the standard deviation of the first feature amount data are not included in the range between the sum and the difference of the average value and the standard deviation of the second feature amount data, and wherein said second evaluated value generating step or means is adapted for generating the sum and the difference of the average value and the standard deviation, for outputting nearly 0 as the second evaluated value when the sum and the difference of the average value and the standard deviation of the third feature amount data are included in the range between the sum and the difference of the average value and the standard deviation of the fourth feature amount data, and for outputting the difference between the sums of the average values and the standard deviations of the third feature amount data and the fourth feature amount data and the differences thereof as the second evaluated value when the sum and the difference of the average value and the standard deviation of the third feature amount data are not included in the range between the sum and the difference of the average value and the standard deviation of the fourth feature amount data.

40. The method or the apparatus as set forth in claim 22, 23, 28, or 29, wherein the base block and the verification block are composed of a plurality of small blocks, the first feature amount, the second feature amount, the third feature amount, and the fourth feature amount being extracted for each of the small blocks, the first evaluated value and the second evaluated value being generated for each of the small blocks, the first evaluated values and the second evaluated values being independently cumulated, the base block and the verification block being partially collated corresponding to the first cumulated value and the second cumulated value, respectively.

41. An image collating method, comprising the steps of:

segmenting first image data into a plurality of base blocks and segmenting each of the base blocks into a plurality of base sub-blocks;

segmenting second image data into a plurality of verification blocks and segmenting each of the verification blocks into a plurality of verification sub-blocks;

extracting first representative pixel data from each of the base sub-blocks;

generating first representing data that represents first representative pixel data group of the base sub-block and second representing data that represents a pixel group at a position corresponding to each of the verification sub-block, comparing the first representing data with the second representing data, and selecting pixel data used for the collation;

extracting feature amount data that represents the range of the selected pixels of the verification sub-block;

extracting second representative pixel data from the base sub-block; and comparing the second representative pixel data with the feature amount data, generating an evaluated value for the sub-block, generating a totally evaluated value corresponding to the evaluated value for the sub-block, and partially collating the first image data with the second image data corresponding to the totally evaluated value.

42. An image collating apparatus, comprising:

means for segmenting first image data into a plurality of base blocks and segmenting each of the base blocks into a plurality of base sub-blocks;

means for segmenting second image data into a plurality of verification blocks and segmenting each of the verification blocks into a plurality of verification sub-blocks;

means for extracting first representative pixel data from each of the base sub-blocks;

means for generating first representing data that represents first representative pixel data group of the base sub-block and second representing data that represents a pixel group at a position corresponding to each of the verification sub-blocks, comparing the first representing data with the second representing data, and selecting pixel data used for the collation;

means for extracting feature amount data that represents the range of the selected pixels of the verification sub-block;

means for extracting second representative pixel data from the base sub-block; and means for comparing the second representative pixel data with the feature amount data, generating an evaluated value for the sub-block, generating a totally evaluated value corresponding to the evaluated value for the sub-block, and partially collating the first image data with the second image data corresponding to the totally evaluated value.

43. An image collating method, comprising the steps of:

segmenting first image data into a plurality of base blocks and segmenting each of the base blocks into a plurality of base sub-blocks;

segmenting second image data into a plurality of verification blocks, segmenting each of the verification blocks into a plurality of verification sub-blocks, and generating a modified verification sub-block that contains pixels in the vicinity of the verification sub-block necessary for a phase compensation;

extracting first representative pixel data from the base sub-block;

generating first representing data that represents first representative pixel data group of the base sub-block and second representing data that represents a pixel group at a position corresponding to the verification sub-block, comparing the first representing data with the second representing data, and selecting pixel data used for the collation;

extracting first feature amount data from the base sub-block, the first feature amount data representing the range of all pixels thereof;

extracting second feature amount data from the modified verification sub-block, the second feature amount data representing the range of all pixels of the modified verification sub-block, the all pixels being selected pixels; and comparing the first feature amount data with the second feature amount data, generating an evaluated value for the sub-block, generating a totally evaluated value corresponding to the evaluated value for the sub-block, and partially collating the first image data with the second image data corresponding to the totally evaluated value.

44. An image collating apparatus, comprising:

means for segmenting first image data into a plurality of base blocks and segmenting each of the base blocks into a plurality of base sub-blocks;

means for segmenting second image data into a plurality of verification blocks, segmenting each of the verification blocks into a plurality of verification sub-blocks, and generating a modified verification sub-block that contains pixels in the vicinity of the verification sub-block necessary for a phase compensation;

means for extracting first representative pixel data from the base sub-block;

means for generating first representing data that represents first representative pixel data group of the base sub-block and second representing data that represents a pixel group at a position corresponding to the verification sub-block, comparing the first representing data with the second representing data, and selecting pixel data used for the collation;

means for extracting first feature amount data from the base sub-block, the first feature amount data representing the range of all pixels thereof;

means for extracting second feature amount data from the modified verification sub-block, the second feature amount data representing the range of all pixels of the modified verification sub-block, the all pixels being selected pixels; and means for comparing the first feature amount data with the second feature amount data, generating an evaluated value for the sub-block, generating a totally evaluated value corresponding to the evaluated value for the sub-block, and partially collating the first image data with the second image data corresponding to the totally evaluated value.

45. An image collating method for compensating a phase difference that takes place due to simplification in partially collating first image data with second image data, comprising the steps of:

segmenting a base block and a verification block into base sub-blocks and verification sub-blocks, respectively;

selecting pixel data used for the collation on the assumption of rigid body;

generating an evaluated value for each of the verification sub-blocks and the base sub-blocks, the evaluated value representing a collating degree of selected pixels of the verification sub-block and the base sub-block; and generating a totally evaluated value for the block corresponding to the evaluated value for the sub-block and partially collating the first image data with the second image data corresponding to the totally evaluated value.

46. An image collating apparatus for compensating a phase difference that takes place due to simplification in partially collating first image data with second image data, comprising:

means for segmenting a base block and a verification block into base sub-blocks and verification sub-blocks, respectively;

means for selecting pixel data used for the collation on the assumption of rigid body;

means for generating an evaluated value for the verification sub-block and the base sub-block, the evaluated value representing a collating degree of selected pixels of the verification sub-block and the base sub-block; and means for generating a totally evaluated value for the block corresponding to the evaluated value for the sub-block and partially collating the first image data with the second image data corresponding to the totally evaluated value.

47. A motion vector detecting method, comprising the steps of:

segmenting first image data into a plurality of base blocks and segmenting each of the base blocks into a plurality of base sub-blocks;

segmenting second image data into a plurality of verification blocks and segmenting each of the verification blocks into a plurality of verification sub-blocks;

extracting first representative pixel data from each of the base sub-blocks;

generating first representing data that represents first representative pixel data group of the base sub-block and second representing data that represents a pixel group at a position corresponding to each of the verification sub-blocks, comparing the first representing data with the second representing data, and selecting pixel data used for the collation;

extracting feature amount data that represents the range of the selected pixels of the verification sub-block;

extracting second representative pixel data from the base sub-block; and comparing the second representative pixel data with the feature amount data, generating an evaluated value for the sub-block, generating a totally evaluated value corresponding to the evaluated value for the sub-block, and detecting a motion vector corresponding to the position of the verification block that most accords with the base block based on the totally evaluated value that is generated by moving the verification block in a predetermined search range.

48. A motion vector detecting apparatus, comprising:

means for segmenting first image data into a plurality of base blocks and segmenting each of the base blocks into a plurality of base sub-blocks;

means for segmenting second image data into a plurality of verification blocks and segmenting each of the verification blocks into a plurality of verification sub-blocks;

means for extracting first representative pixel data from each of the base sub-blocks;

means for generating first representing data that represents first representative pixel data group of each of the base sub-blocks and second representing data that represents a pixel group at a position corresponding to each of the verification sub-blocks, comparing the first representing data with the second representing data, and selecting pixel data used for the collation;

means for extracting feature amount data that represents the range of the selected pixels of the verification sub-block;

means for extracting second representative pixel data from the base sub-block; and means for comparing the second representative pixel data with the feature amount data, generating an evaluated value for the sub-block, generating a totally evaluated value corresponding to the evaluated value for the sub-block, and detecting a motion vector corresponding to the position of the verification block that most accords with the base block based on the totally evaluated value that is generated by moving the verification block in a predetermined search range.

49. A motion vector detecting method, comprising the steps of:

segmenting first image data into a plurality of base blocks and segmenting each of the base blocks into a plurality of base sub-blocks;

segmenting second image data into a plurality of verification blocks, segmenting each of the verification blocks into a plurality of verification sub-blocks, and generating a modified verification sub-block that contains pixels in the vicinity of each of the verification sub-blocks necessary for a phase compensation;

extracting first representative pixel data from each of the base sub-blocks;

generating first representing data that represents first representative pixel data group of the base sub-block and second representing data that represents a pixel group at a position corresponding to the verification sub-block, comparing the first representing data with the second representing data, and selecting pixel data used for the collation;

extracting first feature amount data from the base sub-block, the first feature amount data representing the range of all pixels thereof;

extracting second feature amount data from the modified verification sub-block, the second feature amount data representing the range of all pixels of the modified verification sub-block, the all pixels being selected pixels; and comparing the first feature amount data with the second feature amount data, generating an evaluated value for the sub-block, generating a totally evaluated value corresponding to the evaluated value for the sub-block, and detecting a motion vector corresponding to the position of the verification block that most accords with the base block based on the totally evaluated value that is generated by moving the verification block in a predetermined search range.

50. A motion vector detecting apparatus, comprising:

means for segmenting first image data into a plurality of base blocks and segmenting each of the base blocks into a plurality of base sub-blocks;

means for segmenting second image data into a plurality of verification blocks, segmenting each of the verification blocks into a plurality of verification sub-blocks, and generating a modified verification sub-block that contains pixels in the vicinity of each of the verification sub-blocks necessary for a phase compensation;

means for extracting first representative pixel data from each of the base sub-blocks;

means for generating first representing data that represents first representative pixel data group of the base sub-block and second representing data that represents a pixel group at a position corresponding to the verification sub-block, comparing the first representing data with the second representing data, and selecting pixel data used for the collation;

means for extracting first feature amount data from the base sub-block, the first feature amount data representing the range of all pixels thereof;

means for extracting second feature amount data from the modified verification sub-block, the second feature amount data representing the range of all pixels of the modified verification sub-block, the all pixels being selected pixels; and means for comparing the first feature amount data with the second feature amount data, generating an evaluated value for the sub-block, generating a totally evaluated value corresponding to the evaluated value for the sub-block, and detecting a motion vector corresponding to the position of the verification block that most accords with the base block based on the totally evaluated value that is generated by moving the verification block in a predetermined search range.

51. The method or the apparatus as set forth in claim 41, 42, 47, or 48, wherein the first representative pixel data and the second representative pixel data are pixel data nearly at the center potions of the respective blocks.

52. The method or the apparatus as set forth in claim 41, 42, 47, or 48, wherein the feature amount data is two out of the maximum value, the minimum value, and the dynamic range of a plurality of pixels of the block.

53. The method or the apparatus as set forth in claim 41, 42, 47, or 48, wherein the feature amount data is the average value and the standard deviation of a plurality of pixels of the block.

54. The method or the apparatus as set forth in claim 41, 42, 47, or 48, wherein the feature amount data is two out of the maximum value, the minimum value, and the dynamic range of a plurality of pixels of the block, and wherein said evaluated value generating step or means is adapted for outputting nearly 0 as an evaluated value for the sub-block when the value the second representative pixel data is included in the range from the maximum value to the minimum value and for outputting the difference between the second representative pixel data and the maximum value and the difference between the second representative pixel data and the minimum value as evaluated values for the sub-block when the value of the second representative pixel data is not included in the range from the maximum value to the minimum value.

55. The method or the apparatus as set forth in claim 41, 42, 47, or 48, wherein the feature amount data is the average value and the standard deviation of a plurality of pixels of the block, and wherein said evaluated value generating step or means is adapted for outputting nearly 0 as an evaluated value for the sub-block when the first representative pixel data and the second representative pixel data are included in the range between the sum value and the difference value of the average value and the standard deviation and for outputting the difference between the second representative pixel data and the sum value and the difference between the second representative pixel data and the difference value as evaluated values for the sub-block when the first representative pixel data and the second representative pixel data are not included in the range between the sum value and the difference value of the average value and the standard deviation.

56. The method or the apparatus as set forth in claim 43, 44, 49, or 50, wherein the first feature amount data and second feature amount data are two out of the maximum value, the minimum value, and the dynamic range of a plurality of pixels of the block.

57. The method or the apparatus as set forth in claim 43, 44, 49, or 50, wherein the first feature amount data and the second feature amount data are the average value and the standard deviation of a plurality of pixels of the block.

58. The method or the apparatus as set forth in claim 43, 44, 49, or 50, wherein the first feature amount data and second feature amount data are two out of the maximum value, the minimum value, and the dynamic range of a plurality of pixels of the block, and wherein said evaluated value generating means is adapted for outputting nearly 0 as an evaluated value for the sub-block when the maximum value and the minimum value of the first feature amount data are included in the range from the maximum value to the minimum value of the second feature amount data and for outputting the difference between the maximum values of the first feature amount data and the second feature amount data and the difference between the minimum values thereof as evaluated values for the sub-block when the maximum value and the minimum value of the first feature amount data are not included in the range from the maximum value to the minimum value of the second feature amount data.

59. The method or the apparatus as set forth in claim 43, 44, 49, or 50, wherein the first feature amount data and the second feature amount data are the average value and the standard deviation of a plurality of pixels of the base block and the verification block, and wherein said evaluated value generating step or means is adapted for generating the sum value and the differential value of the average value and the standard deviation, for outputting nearly 0 as an evaluated value for each of sub-blocks when the sum value and the difference value of the average value and the standard deviation are included in the range from the sum value to the difference value of the average value and the standard deviation of the second feature amount data, and for outputting the difference between the sum values of the average values and the standard deviations of the first feature amount data and the second feature amount data and the difference between the difference values of the average values and the standard deviations of the first feature amount data and the second feature amount data as evaluated values for the sub-block when the sum value and the difference value of the average value and the standard deviation of the first feature amount data are not included in the range from the sum value to the difference value of the average value and the standard deviation of the second feature amount data.

60. The method or the apparatus as set forth in claim 41, 42, 43, 44, 47, 48, 49, or 50, wherein the first representing data and the second representing data are average values.

* * * * *